United States Patent
Rosenberger et al.

(10) Patent No.: US 12,481,098 B2
(45) Date of Patent: Nov. 25, 2025

(54) ANTI-RESONANCE PREFORM WITH TWO CONTACT POINTS

(71) Applicant: Heraeus Quarzglas GmbH & Co. KG, Hanau (DE)

(72) Inventors: Manuel Rosenberger, Hanau (DE); Jaqueline Plass, Hanau (DE); Kay Schuster, Bitterfeld-Wolfen (DE); Enrico Ehrentraut, Hanau (DE); Tobias Tiess, Bitterfeld-Wolfen (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 256 days.

(21) Appl. No.: 18/261,225

(22) PCT Filed: Jan. 19, 2022

(86) PCT No.: PCT/EP2022/051097
§ 371 (c)(1),
(2) Date: Jul. 12, 2023

(87) PCT Pub. No.: WO2022/157179
PCT Pub. Date: Jul. 28, 2022

(65) Prior Publication Data
US 2025/0076570 A1    Mar. 6, 2025

(30) Foreign Application Priority Data
Jan. 19, 2021   (EP) .................................... 21152283

(51) Int. Cl.
*G02B 6/032* (2006.01)
*C03B 37/012* (2006.01)

(52) U.S. Cl.
CPC .......... *G02B 6/032* (2013.01); *C03B 37/0122* (2013.01); *C03B 37/01245* (2013.01)

(58) Field of Classification Search
None
See application file for complete search history.

(56) References Cited

U.S. PATENT DOCUMENTS

| | | | |
|---|---|---|---|
| 2018/0267235 A1* | 9/2018 | Russell | G02B 6/02342 |
| 2019/0101695 A1* | 4/2019 | Poletti | H01S 3/1618 |
| 2020/0241200 A1* | 7/2020 | Wang | G02B 6/02328 |

FOREIGN PATENT DOCUMENTS

| | | |
|---|---|---|
| CN | 105807363 B | 1/2019 |
| EP | 3136143 A1 | 3/2017 |
| EP | 3152607 A1 | 4/2017 |
| GB | 2566466 A | 3/2019 |

(Continued)

*Primary Examiner* — Chris H Chu
(74) *Attorney, Agent, or Firm* — Panitch Schwarze Belisario & Nadel LLP

(57) ABSTRACT

An anti-resonance element preform for producing an anti-resonant hollow-core fiber, comprising a first longitudinal axis, an ARE outer element designed in a circular arc-like manner, and an ARE inner element, wherein the ARE outer element and the ARE inner element are connected to one another along two connecting lines, which are arranged essentially in parallel to the first longitudinal axis. It is provided that the ARE outer element has an inner space, which is at least partially limited by an ARE outer wall and into which the ARE inner element, designed in a circular arc-like manner, protrudes at least partially.

10 Claims, 23 Drawing Sheets

(56) References Cited

FOREIGN PATENT DOCUMENTS

| | | | |
|---|---|---|---|
| GB | 2583352 | A | 10/2020 |
| JP | 2018150184 | A | 9/2018 |
| WO | 2015185761 | A1 | 12/2015 |
| WO | 2017108061 | A1 | 6/2017 |
| WO | 2018169487 | A1 | 9/2018 |
| WO | 2020030894 | A1 | 2/2020 |

\* cited by examiner

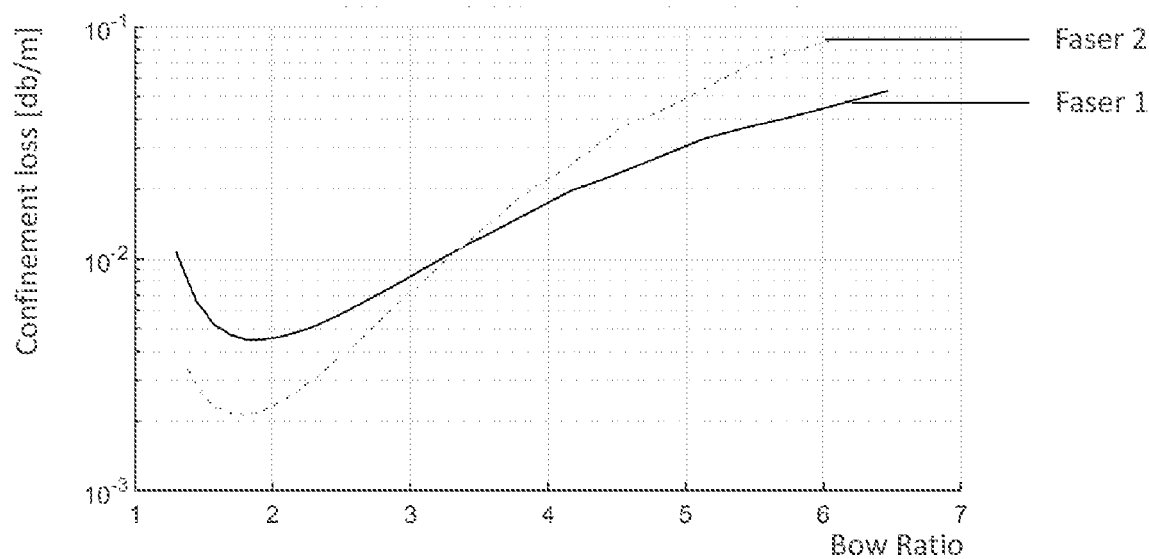
Figur 29

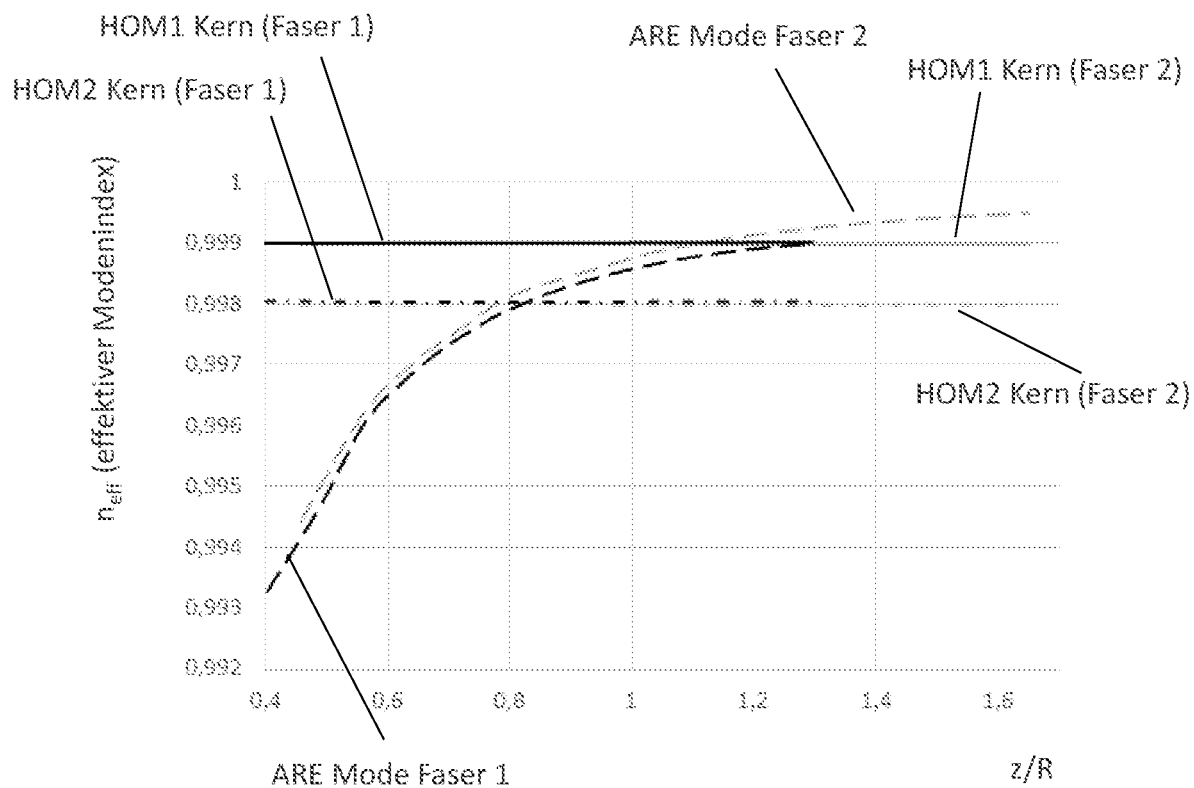
Figur 30

ANTI-RESONANCE PREFORM WITH TWO CONTACT POINTS

BACKGROUND OF THE INVENTION

The invention relates to an anti-resonance element preform for producing an anti-resonant hollow-core fiber.

PRIOR ART

Hollow-core fibers have a core with an evacuated cavity, which is filled with gas or liquid. In hollow-core fibers, the interaction of the light with the glass is smaller than in solid core fibers. The refractive index of the core is smaller than that of the cladding, so that a light guidance by means of total reflection is not possible. Depending on the physical mechanism of the light guidance, the hollow-core fibers are divided into "photonic bandgap fibers" and "anti-resonance reflection fibers".

In the case of "photonic bandgap fibers", the hollow core region is surrounded by a cladding, in which small hollow ducts are arranged periodically. The periodic structure in the cladding causes the effect, which with a reference to the semiconductor technology is referred to as "photonic bandgap", according to which light of certain wavelength ranges scattered at the cladding structures interferes constructively due to Bragg reflection in the central cavity and cannot propagate transversely in the cladding.

In the case of the embodiment of the hollow-core fiber, which is referred to as "anti-resonant hollow-core fiber" (ARHCF), the hollow core region is surrounded by an inner cladding region, in which so-called "anti-resonance elements" (also "anti-resonant elements" or also "AREs") are arranged. The evenly distributed around the hollow core walls of the anti-resonance elements can act as Fabry-Perot cavities, which are operated in anti-resonance and reflect the incident light guiding it through the fiber core.

This technology promises a fiber with low optical attenuation, a very broad transmission spectrum (also in the UV or IR wavelength range), and a small latency during the data transmission.

An anti-resonant hollow-core fiber is known from WO 2020 030 894 A1, wherein the core is surrounded by an inner cladding comprising non-resonant elements (also referred to as "ARE"). These non-resonant elements serve to attenuate the higher order modes and have an ARE outer element and an ARE inner element inserted therein. The shown ARE inner element is designed in a plate-like manner. In the case of this design, there is a risk that during the elongating of the preform, the ARE inner element comes to rest on an inner wall of the cladding tube inner bore, and thus only the ARE outer element ensures the attenuation of the higher order modes, which increases the attenuation as a whole.

A further anti-resonant hollow-core fiber is known from EP 3 152 607 A1, in which the ARE outer element as well as the ARE inner element are designed in a tubular manner. The nested installed ARE outer elements and ARE inner elements are in each case connected to one another and to the cladding tube along a connecting line. Therefore, there is a risk that the ARE elements perform a rotatory movement during the elongating, and the evenly distributed arrangement of the ARE elements at the cladding tube inner wall is thus disturbed, which is reflected in an increased attenuation.

Further aspects, such as, for example, production methods for AREs, are described in the following documents: CN 105807363 B, WO 2015 185761 A1, WO 2017 108061 A1, WO 2018 169487 A1, JP 2018 150184 A, EP 3 136 143 A1.

TECHNICAL OBJECT

Preforms whose size makes it possible to create several hundred kilometers of fibers are needed for the industrial use of anti-resonant hollow-core fibers. This is the only way to make the costs for the anti-resonant hollow-core fibers more reasonable. To that extent, there are preforms, which do produce good results on a laboratory scale, but which cannot be used for the industrial production.

Anti-resonant hollow-core fibers and in particular those comprising nested structural elements furthermore have complex inner geometries, which makes more difficult their exact and reproducible production. This applies all the more, because only dimensional deviations below the magnitude of the working wavelength of the light to be guided can be tolerated in order to adhere to the resonance or the anti-resonance conditions, respectively. The configuration of the fiber preform can be the cause of deviations from the target geometry, and they can also occur due to unwanted deformations during the fiber drawing process, which are not to scale.

It is a goal of the invention to provide an anti-resonance element preform, which can be positioned precisely into a preform of an anti-resonant hollow-core fiber, in particular into a preform with a length of more than 1 m and an outer diameter of more than 40 mm, in particular more than 90 mm.

In particular, it is a goal of the invention to provide a preform of an anti-resonant hollow-core fiber, which, in spite of a large volume, can be produced in an exact and reproducible manner, in particular with a length of more than 1 m and an outer diameter of more than 40 mm, in particular more than 90 mm.

In particular, it is a goal of the invention to provide a preform of an anti-resonant hollow-core fiber, which can be produced in an exact and reproducible manner and which additionally has a low attenuation. In particular, the goal of the invention is to provide a preform of an anti-resonant hollow-core fiber, which efficiently attenuates higher order modes in the core and which simultaneously has a low attenuation of the base mode.

It is a goal of the invention to specify an anti-resonant hollow-core fiber, which can be produced in an exact and reproducible manner and in addition has a low attenuation.

In particular, it is a goal of the invention to provide an anti-resonant hollow-core fiber, which efficiently attenuates higher order modes.

Preferred Embodiments of the Invention

The features of the independent claims contribute to at least partially fulfilling at least one of the above-mentioned objects. The dependent claims provide preferred embodiments, which contribute to at least partially fulfilling at least one of the objects.

/1./ An anti-resonance element preform for producing an anti-resonant hollow-core fiber,
comprising
a first longitudinal axis,
an ARE outer element designed in a circular arc-like manner, and an ARE inner element,
wherein the ARE outer element and the ARE inner element are connected to one another along two connecting lines, which are arranged essentially in parallel to the first longitudinal axis,
characterized in that
the ARE outer element has an inner space that is at least partially limited by an ARE outer wall and into which the ARE inner element designed in a circular arc-like manner protrudes at least partially.

/2./ The anti-resonance element preform according to embodiment 1, characterized in that
the ARE outer element has a first circle radius R_outer and
the ARE inner element has a second circle radius R_inner.

/3./ The anti-resonance element preform according to any one of the preceding embodiments, characterized in that
the ARE outer element has a first center angle α_outer and
the ARE inner element has a second center angle α_inner.

/4./ The anti-resonance element preform according to any one of the preceding embodiments 2 or 3, characterized in that
the first circle radius R_outer and the second circle radius R_inner are essentially of identical length (R_outer=R_inner)
and the anti-resonance element preform has at least one of the following features:
R_outer and R_inner smaller than 12 mm, in particular smaller than 8 mm, in particular smaller than 5 mm; and
R_outer and R_inner larger than 0.5 mm, in particular larger than 1 mm, in particular larger than 2 mm,
in particular the first circle radius R_outer and the second circle radius R_inner are essentially of identical length (R_outer=R_inner) and the anti-resonance element preform has at least one of the following features:
R_outer and R_inner smaller than 7 mm, in particular smaller than 6 mm; and
R_outer and R_inner larger than 3 mm, in particular larger than 4 mm.

/5./ The anti-resonance element preform according to any one of the preceding embodiments 2 to 4, characterized in that
the first circle radius R_outer and the second circle radius R_inner are essentially of identical length (R_outer=R_inner)
and the anti-resonance element preform has at least one of the following features:
α_outer smaller than 350°, in particular smaller than 345°, in particular smaller than 340°;
α_outer larger than 275°, in particular larger than 295°, in particular larger than 3200;
α_inner smaller than 195°, in particular smaller than 180°, in particular smaller than 150°; and
α_inner larger than 30°, in particular larger than 40°, in particular larger than 500,
in particular the at least one anti-resonance element has at least one of the following features:
β_outer smaller than 275°, in particular smaller than 260°, in particular smaller than 250°;
β_outer larger than 210°, in particular larger than 215°, in particular larger than 220°;
wherein
the sum of β_outer and β_inner has a value of 360°.

/6./ The anti-resonance element preform according to any one of the preceding embodiments 3 to 5, characterized in that the anti-resonance element preform has a preform bow ratio
larger than 1.1, in particular larger than 1.5, in particular larger than 1.6, in particular larger than 1.7; and
smaller than 5.5, in particular smaller than 5, in particular smaller than 4, in particular smaller than 3, in particular smaller than 2.8, in particular smaller than 2.5.

/7./ The anti-resonance element preform according to any one of the preceding embodiments 4 to 6, characterized in that an amount of a deviation of the first circle radius R_outer from the second circle radius R_inner is smaller than 5% of the first circle radius R_outer, in particular smaller than 3%, in particular smaller than 2%, in particular smaller than 1.5%, in particular smaller than 1%.

/8./ The anti-resonance element preform according to any one of the preceding embodiments 1 to 3, characterized in that
the first circle radius R_outer is larger than the second circle radius R_inner (R_outer>R_inner)
and the anti-resonance element preform has at least one of the following features:
R_outer smaller than 12 mm, in particular smaller than 8 mm, in particular smaller than 5 mm;
R_outer larger than 0.5 mm, in particular larger than 1 mm, in particular larger than 2 mm;
R_inner smaller than 8 mm, in particular smaller than 5 mm, in particular smaller than 3 mm; and
R_inner larger than 0.5 mm, in particular larger than 0.75 mm, in particular larger than 1 mm.

/9./ The anti-resonance element preform according to any one of the preceding embodiments 1 to 3 or 8, characterized in that
the first circle radius R_outer is larger than the second circle radius R_inner (R_outer>R_inner)
and the anti-resonance element preform has at least one of the following features:
α_outer smaller than 350°, in particular smaller than 345°, in particular smaller than 340°;
α_outer larger than 275°, in particular larger than 295°, in particular larger than 3200;
α_inner smaller than 300°, in particular smaller than 285°, in particular smaller than 230°; and
α_inner larger than 100°, in particular larger than 120°, in particular larger than 1500.

/10./ The anti-resonance element preform according to any one of the preceding embodiments 1 to 3, characterized in that
the first circle radius R_outer is smaller than the second circle radius R_inner (R_outer<R_inner)
and the anti-resonance element preform has at least one of the following features:
R_outer smaller than 12 mm, in particular smaller than 8 mm, in particular smaller than 5 mm;
R_outer larger than 0.5 mm, in particular larger than 1 mm, in particular larger than 2 mm;
R_inner smaller than 20 mm, in particular smaller than 10 mm, in particular smaller than 8 mm; and
R_inner larger than 1 mm, in particular larger than 2 mm, in particular larger than 3 mm /11./ The anti-resonance element preform according to any one of the preceding embodiments 1 to 3 or 10, characterized in that
the first circle radius R_outer is smaller than the second circle radius R_inner (R_outer<R_inner)
and the anti-resonance element preform has at least one of the following features:
α_outer smaller than 340°, in particular smaller than 315°, in particular smaller than 305°;
α_outer larger than 200°, in particular larger than 220°, in particular larger than 250°;
α_inner smaller than 195°, in particular smaller than 180°, in particular smaller than 150°; and
α_inner larger than 30°, in particular larger than 40°, in particular larger than 500.

/12./ The anti-resonance element preform according to any one of the preceding embodiments 3 to 11, characterized in that
the first center angle α_outer and/or the second center angle α_inner is smaller than 3400.

/13./ The anti-resonance element preform according to any one of the preceding embodiments, characterized in that
the ARE outer element has a first segment height H_outer and
the ARE inner element has a second segment height H_inner, wherein what in particular applies is that:
the ratio of the first segment height H_outer to the second segment height H_inner (H_outer/H_inner) is smaller than 30, in particular smaller than 14, in particular lies between 1 and 6,
wherein what in particular applies is that:
H_outer/H_inner smaller than 15, in particular smaller than 14, in particular smaller than 10, in particular smaller than 6.5, in particular smaller than 4, in particular smaller than 3.2, and
H_outer/H_inner larger than 1.7, in particular larger than 1.75, in particular larger than 1.85.

/14./ The anti-resonance element preform according to any one of the preceding embodiments, characterized in that an ARE arc element is arranged in the inner space of the ARE outer element, in particular that the ARE arc element is arranged at the ARE inner element.

/15./ The anti-resonance element preform according to embodiment 14, characterized in that the ARE arc element comprises an amorphous solid body, in particular a glass, in particular quartz glass, in particular consists of an amorphous solid body, in particular a glass, in particular quartz glass, in particular that the ARE arc element and the ARE outer element are made of identical material.

/16./ The anti-resonance element preform according to any one of the preceding embodiments 14 or 15, characterized in that the ARE arc element is designed in a circular arc-shaped manner and has a fifth circle radius R_arc and a fifth center angle α_arc, and
the ARE arc element is connected to the ARE outer element and/or the ARE inner element along two contact lines.

/17./ The anti-resonance element preform according to any one of the preceding embodiments 14 or 15, characterized in that the ARE arc element is designed in a circular manner and has a radius R_circle, and
the ARE arc element is connected to the ARE inner element along a contact line.

/18./ A preform of an anti-resonant hollow-core fiber, comprising
a cladding tube, which has a cladding tube inner bore and a cladding tube longitudinal axis, along which a cladding tube wall, which is limited by an inner side and an outer side, extends,
a number of anti-resonance element preforms, wherein the anti-resonance element preforms are arranged spaced apart from one another and in a contact-free manner at target positions on the inner side of the cladding tube wall,
characterized in that
at least one of the anti-resonance element preforms is designed according to any one of the preceding embodiments 1 to 16.

/19./ The preform according to embodiment 18, characterized in that the anti-resonance element preform has a preform bow ratio
larger than 1.1, in particular larger than 1.5, in particular larger than 1.6, in particular larger than 1.7; and
smaller than 5.5, in particular smaller than 5, in particular smaller than 4, in particular smaller than 3, in particular smaller than 2.8, in particular smaller than 2.5.

/20./ The preform according to the embodiment 18 or 19, characterized in that a ratio z/R_preform is
larger than 0.1, in particular larger than 0.2, in particular larger than 0.25, and
smaller than 1, in particular smaller than 0.8, in particular smaller than 0.5.

/21./ The preform according to any one of the preceding embodiments 18 to 20, characterized in that for each anti-resonance element preform an amount of a deviation of the first circle radius R_outer from the second circle radius R_inner is smaller than 5% of the first circle radius R_outer, in particular smaller than 3%, in particular smaller than 2%, in particular smaller than 1.5%, in particular smaller than 1%.

/22./ A method for producing a preform of an anti-resonant hollow-core fiber, comprising the steps:
a) providing a cladding tube having a cladding tube inner bore and a cladding tube longitudinal axis, along which a cladding tube wall extends that is limited by an inner side and an outer side,
b) preparing a number of anti-resonance element preforms, each comprising an ARE outer element and an ARE inner element that is inserted therein,
c) arranging the anti-resonance element preforms at target positions in the cladding tube inner bore,
d) processing by means of a hot-forming process an assembly comprising the cladding tube and the anti-resonance element preforms selected from at least one of the elongating and collapsing,
characterized in that
a relative inner pressure in the range of between −10 to −300 mbar, in particular −50 to −250 mbar, is set in the cladding tube inner bore in step d) "processing",
the ARE outer element and the ARE inner element are designed in a circular arc-like manner in at least one anti-resonance element preform, and
the ARE outer element and the ARE inner element are connected to one another and to the cladding tube inner bore along two connecting lines.

/23./ The method according to embodiment 22, characterized in that the ARE outer element has an inner space, which is at least partially limited by an ARE outer wall and into which the ARE inner element designed in a circular arc-like manner protrudes.

/24./ The method according to any one of the preceding embodiments 22 or 23, characterized in that the ARE outer element has a first center angle α_outer and the ARE inner element has a second center angle α_inner, wherein
the first center angle α_outer and/or the second center angle α_inner are larger than 340°.

/25. / The method according to any one of the preceding embodiments 22 to 24, characterized in that the anti-resonance element preforms are thermally fixed in a flame-free manner to the cladding tube wall in step d) "processing".

/26./ The method according to any one of the preceding embodiments 22 to 25, characterized in that the cladding tube has an outer diameter in the range of 65 to 300 mm, in particular of 90 to 250 mm, and in particular a length of at least 1 m.

/27. / A method for producing a secondary preform, from which an anti-resonant hollow-core fiber can be drawn, from a preform, produced according to any one of the preceding embodiments 18 to 21, having the step of
further processing the preform into the secondary preform, wherein the further processing comprises a one-time or repeated performing of one or several of the following hot-forming processes:
  i.) elongating,
  ii.) collapsing,
  iii.) collapsing and simultaneous elongating,
  iv.) adding additional cladding material,
  v.) adding additional cladding material and subsequent elongating,
  vi.) adding additional cladding material and simultaneous elongating.

/28. / The method according to any one of the preceding embodiments 22 to 27, characterized in that at least one of the anti-resonance element preforms is designed according to any one of the preceding embodiments 1 to 17.

/29./ An anti-resonant hollow-core fiber, comprising
a cladding, which has a cladding inner bore and a cladding longitudinal axis, along which a cladding wall extends that is limited by a cladding inner side and a cladding outer side,
a number of anti-resonance elements, each comprising an ARE outer unit and an ARE inner unit, wherein the ARE outer unit, which is designed in a circular arc-like manner, and the ARE inner unit are connected to one another along two seam lines,
wherein the anti-resonance elements are arranged spaced apart from one another and in a contact-free manner at target positions on the cladding inner side of the cladding wall,
characterized in that
the ARE outer unit has an inner space that is at least partially limited by an ARE outer wall and into which the ARE inner unit, which is designed in a circular arc-like manner, protrudes at least partially.

/30. / The anti-resonant hollow-core fiber according to embodiment 29, characterized in that the anti-resonant hollow-core fiber has three, four, five, six, seven, or eight anti-resonance elements, in particular that the anti-resonant hollow-core fiber has an odd number of anti-resonance elements.

/31. / The anti-resonant hollow-core fiber according to any one of the preceding embodiments 29 or 30, characterized in that the anti-resonant hollow-core fiber has at least one of the following features:
the anti-resonance elements are arranged symmetrically on the cladding inner side of the cladding wall,
at least one of the ARE outer units and/or ARE inner units is constructed of an amorphous solid body, in particular glass, in particular quartz glass, in particular constructed of glass with a refractive index of at least 1.4, in particular 1.4 to 3, in particular 1.4 to 2.8, and
a wall thickness of the ARE outer units and of the ARE inner units is essentially identical.

/32. / The anti-resonant hollow-core fiber according to any one of the preceding embodiments 29 to 31, characterized in that the anti-resonant hollow-core fiber has at least one of the following features:
a fundamental attenuation of less than 0.15 dB/km at a transported wavelength of between 1.0 µm and 2.5 µm, and
a fundamental attenuation of less than 1 dB/km at a transported wavelength of up to 0.8 µm.

/33. / The anti-resonant hollow-core fiber according to any one of the preceding embodiments 29 to 32, characterized in that the anti-resonance elements form a core with a core radius, whereby the core radius is smaller than 50 µm, in particular smaller than 40 µm, in particular smaller than 30 µm, in particular smaller than 25 µm, in particular smaller than 20 µm, in particular smaller than 15 µm, in particular smaller than 13 µm.

/34. / The anti-resonant hollow-core fiber according to any one of the preceding embodiments 29 to 33, characterized in that the anti-resonant hollow-core fiber has at least one of the following features:
the ARE outer unit comprises a third circle radius FB_outer,
the ARE inner unit comprises a fourth circle radius FB_inner,
the ARE outer unit comprises a third center angle β_outer, and
the ARE inner unit comprises a fourth center angle β_inner.

/35. / The anti-resonant hollow-core fiber according to embodiment 34, characterized in that
the third circle radius FB_outer and the fourth circle radius FB_inner are essentially of identical length (FB_outer=FB_inner)
and at least one anti-resonance element has at least one of the following features:
FB_outer smaller than 30 µm, in particular smaller than 25 µm, in particular smaller than 15 µm;
FB_outer larger than 5 µm, in particular larger than 10 µm, in particular larger than 12 µm;
FB_inner smaller than 30 µm, in particular smaller than 25 µm, in particular smaller than 15 µm;
and
FB_inner larger than 5 µm, in particular larger than 10 µm, in particular larger than 12 µm.

/36. / The anti-resonant hollow-core fiber according to embodiment 34 or 35, characterized in that
the third circle radius FB_outer and the fourth circle radius FB_inner are essentially of identical length (FB_outer=FB_inner)
and at least one anti-resonance element has at least one of the following features:
FB_outer smaller than 25 µm, in particular smaller than 22 µm, in particular smaller than 17 µm, in particular smaller than 16 µm;

FB_outer larger than 5 µm, in particular larger than 7 µm, in particular larger than 10 µm, in particular larger than 12 µm FB_inner smaller than 25 µm, in particular smaller than 22 µm, in particular smaller than 20 µm, in particular smaller than 17 µm, in particular smaller than 16 µm; and FB_inner larger than 5 µm, in particular larger than 7 µm, in particular larger than 10 µm, in particular larger than 12 µm.

/37./ The anti-resonant hollow-core fiber according to any one of embodiments 34 to 36, characterized in that the third circle radius FB_outer and the fourth circle radius FB_inner are essentially of identical length (FB_outer=FB_inner)

and the anti-resonance elements have the following features:

FB_outer smaller than or equal to 16.5 µm, in particular smaller than or equal to 15.75 µm;

FB_outer larger than or equal to 11.5 µm, in particular larger than or equal to 12.25 µm;

FB_inner smaller than or equal to 16.5 µm, in particular smaller than or equal to 15.75 µm;

FB_inner larger than or equal to 11.5 µm, in particular larger than or equal to 12.25 µm.

/38./ The anti-resonant hollow-core fiber according to any one of the preceding embodiments 34 to 37, characterized in that the third circle radius FB_outer and the fourth circle radius FB_inner are essentially of identical length (FB_outer=FB_inner)

and at least one anti-resonance element has at least one of the following features:

$\beta$_outer smaller than 350°, in particular smaller than 345°, in particular smaller than 340°;

$\beta$_outer larger than 275°, in particular larger than 295°, in particular larger than 3200;

$\beta$_inner smaller than 195°, in particular smaller than 180°, in particular smaller than 150°; and $\beta$_inner larger than 30°, in particular larger than 40°, in particular larger than 500.

/39./ The anti-resonant hollow-core fiber according to any one of the preceding embodiments 34 to 38, characterized in that at least one anti-resonance element has at least one of the following features:

$\beta$_outer smaller than 275°, in particular smaller than 260°, in particular smaller than 250°;

$\beta$_outer larger than 210°, in particular larger than 215°, in particular larger than 220°;

wherein the sum of $\beta$_outer and $\beta$_inner has a value of 360°.

/40./ The anti-resonant hollow-core fiber according to any one of the preceding embodiments 29 to 39, characterized in that at least one anti-resonance element has at least one of the following features:

a bow ratio larger than 1.5, in particular larger than 1.55, in particular larger than 1.6;

a bow ratio smaller than 3.2, in particular smaller than 2.8, in particular smaller than 2.5, wherein in particular a confinement loss of the base mode is less than 10E-2 db/m.

/41./ The anti-resonant hollow-core fiber according to any one of the preceding embodiments 29 to 40, characterized in that a ratio z/R is larger than 0.6, in particular larger than 0.7, in particular larger than 0.8, and smaller than 1.4, in particular smaller than 1.3, in particular smaller than 1.2.

/42./ The anti-resonant hollow-core fiber according to any one of the preceding embodiments 35 to 41, characterized in that an amount of a deviation of the third circle radius FB_outer from the fourth circle radius is smaller than 5% of the third circle radius FB_outer, in particular smaller than 3%, in particular smaller than 2%, in particular smaller than 1.5%, in particular smaller than 1%.

/43./ The anti-resonant hollow-core fiber according to embodiment 29, characterized in that FB_outer>FB_inner and at least one anti-resonance element has at least one of the following features:

FB_outer smaller than 30 µm, in particular smaller than 25 µm, in particular smaller than 15 µm;

FB_outer larger than 5 µm, in particular larger than 10 µm, in particular larger than 12 µm;

FB_inner smaller than 20 µm, in particular smaller than 15 µm, in particular smaller than 11 µm; and FB_inner larger than 2 µm, in particular larger than 4 µm, in particular larger than 6 µm.

/44./ The anti-resonant hollow-core fiber according to any one of the preceding embodiments 29 or 43, characterized in that FB_outer>FB_inner and at least one anti-resonance element has at least one of the following features:

$\beta$_outer smaller than 350°, in particular smaller than 345°, in particular smaller than 340°;

$\beta$_outer larger than 275°, in particular larger than 295°, in particular larger than 3200;

$\beta$_inner smaller than 195°, in particular smaller than 180°, in particular smaller than 150°; and $\beta$_inner larger than 30°, in particular larger than 40°, in particular larger than 500.

/45./ The anti-resonant hollow-core fiber according to embodiment 29, characterized in that FB_outer<FB_inner and at least one anti-resonance element has at least one of the following features:

FB_outer smaller than 30 µm, in particular smaller than 25 µm, in particular smaller than 15 µm;

FB_outer larger than 5 µm, in particular larger than 10 µm, in particular larger than 12 µm;

FB_inner smaller than 20 µm, in particular smaller than 15 µm, in particular smaller than 11 µm; and FB_inner larger than 2 µm, in particular larger than 4 µm, in particular larger than 6 µm.

/46./ The anti-resonant hollow-core fiber according to any one of the preceding embodiments 29 or 45, characterized in that FB_outer<FB_inner and at least one anti-resonance element has at least one of the following features:

$\beta$_outer smaller than 340°, in particular smaller than 315°, in particular smaller than 305°;

$\beta$_outer larger than 200°, in particular larger than 220°, in particular larger than 2500;

$\beta$_inner smaller than 195°, in particular smaller than 180°, in particular smaller than 150°; and $\beta$_inner larger than 30°, in particular larger than 40°, in particular larger than 500.

/47./ The anti-resonant hollow-core fiber according to any one of the preceding embodiments 34 to 46, characterized in that the third center angle β_outer and/or the fourth center angle β_inner are larger than 340°.

/48./ The anti-resonant hollow-core fiber according to any one of the preceding embodiments 29 to 47, characterized in that the ARE outer unit has a third segment height HF_outer and the ARE inner unit has a fourth segment height H_inner, wherein what in particular applies is that:
HF_outer/HF_inner<30.

/49./ The anti-resonant hollow-core fiber according to embodiment 48, characterized in that at least one anti-resonance element has at least one of the following features:
HF_outer/HF_inner smaller than 6.5, in particular smaller than 4, in particular smaller than 3.2;
HF_outer/HF_inner larger than 1.7, in particular larger than 1.75, in particular larger than 1.85.

/50./ The anti-resonant hollow-core fiber according to any one of the preceding embodiments 29 to 49, characterized in that an ARE arc unit is arranged in the ARE outer unit.

/51./ The anti-resonant hollow-core fiber according to any one of the preceding embodiments 29 to 50, characterized in that a fundamental attenuation difference between a straight anti-resonant hollow-core fiber and an anti-resonant hollow-core fiber, which is wound to a diameter of 10 mm, is smaller by two orders of magnitude, in particular smaller by one order of magnitude, in particular smaller than half of an order of magnitude.

/52./ The anti-resonant hollow-core fiber according to any one of the preceding embodiments 29 to 51, characterized in that a wall thickness of the ARE outer unit and/or ARE inner unit is between 0.25 µm and 0.75 µm, in particular between 0.35 µm and 0.65 µm, in particular 0.5 µm, in particular that the wall thickness of the ARE outer unit and/or ARE inner unit at a signal wavelength of 1550 nm in the first transmission window is between 0.35 µm and 0.65 µm, in particular between 0.4 µm and 0.6 µm, in particular 0.5 µm, in particular that the wall thickness of the ARE outer unit and/or ARE inner unit at a signal wavelength of 1550 nm in the second transmission window is between 1.25 µm and 0.75 µm, in particular between 1.1 µm and 0.9 µm, in particular 1 µm.

/53./ The anti-resonant hollow-core fiber according to any one of the preceding embodiments 29 to 52, characterized in that the anti-resonant hollow-core fiber is produced from a preform according to any one of the preceding embodiments 18 to 21.

/54./ The anti-resonant hollow-core fiber according to any one of the preceding embodiments 29 to 53, characterized in that the anti-resonant hollow-core fiber is produced according to a method according to any one of the preceding embodiments 22 to 28.

/55./ A method for producing an anti-resonant hollow-core fiber from a preform according to any one of the preceding embodiments 18 to 21, in particular produced according to a method according to any one of 22 to 28, having the step of
further processing the preform into the anti-resonant hollow-core fiber,
wherein the further processing comprises a one-time or repeated performance of one or several of the following hot-forming processes:
i.) elongating,
ii.) collapsing,
iii.) collapsing and simultaneous elongating,
iv.) adding additional cladding material,
v.) adding additional cladding material and subsequent elongating,
vi.) adding additional cladding material and simultaneous elongating.

/56./ The method according to embodiment 56, characterized in that a relative inner pressure in the range of between 0.05 mbar-20 mbar is set in the core region in the step "further processing" as part of the elongating of the preform into an anti-resonant hollow-core fiber.

DETAILED DESCRIPTION

Some of the described features are linked with the term "essentially". The term "essentially" is to be understood in such a way that under real conditions and manufacturing techniques a mathematically exact interpretation of terms, such as "overlapping" "perpendicular", "diameter", or "parallelism" can never be provided exactly, but only within certain manufacturing-related error tolerances. For example, "essentially parallel axes" draw an angle of −5 degrees to 5 degrees to one another, and "essentially identical volumes" comprise a deviation of up to 5% by volume. For example, a "device essentially consisting of quartz glass" comprises a quartz glass portion of ≥95 to ≤100% by weight. Furthermore, "essentially at a right angle" includes an angle of 85 degrees to 95 degrees. A further clarification of the term "essentially" will be made below for some features.

The above-mentioned objects are solved by means of an anti-resonance element preform for producing an anti-resonant hollow-core fiber, comprising a first longitudinal axis, an ARE outer element designed in a circular arc-like manner, and an ARE inner element, wherein the ARE outer element and the ARE inner element are connected to one another along two connecting lines arranged essentially in parallel to the first longitudinal axis. According to the invention, it is provided that the ARE outer element has an inner space that is at least partially limited by an ARE outer wall into which the ARE inner element designed in a circular arc-like manner protrudes at least partially.

An anti-resonance element preform designed in this way and the use thereof in preforms for anti-resonant hollow-core fibers has the advantage that a further degree of freedom is gained by means of the circular arc-like design of the ARE inner element compared to known anti-resonance element preforms: There is no longer a limitation when selecting the radii of the ARE inner element, the radius of the ARE inner element can in particular be larger than the radius of the ARE outer element.

An anti-resonance element preform constructed in this way can be produced separately from further components for producing an anti-resonant hollow-core fiber, which is advantageous from a production-related aspect. Anti-resonance element preforms, which differ from the ideal structure, for example during the production thereof, can thus be disposed of relatively cost-efficiently without also having to dispose of further components for producing the anti-resonant hollow-core fiber. By means of a pre-production of the anti-resonance element preforms, a uniformity can additionally be attained over an entire production batch, which advantageously affects the symmetry of the preforms produced with the anti-resonance element preforms, and ultimately also of the anti-resonant hollow-core fibers. An increased symmetry has a positive impact on the optical properties of the hollow-core fiber.

Compared to anti-resonance element preforms from the prior art, the anti-resonance element preform according to the invention is characterized in that:
- the ARE outer element as well as the ARE inner element have a negative curvature, which has a positive impact on the attenuation, and
- virtually any combinations for the radii of the ARE inner element and of the ARE outer element are possible thanks to the option that is provided according to the invention.

This additional degree of freedom provides for an improved mode adaptation in the later anti-resonant hollow-core fiber.

In the context of the invention, the term "circular arc" is understood to be a partial piece of a circumference. Two points on a circle divide the circumference into two circular arcs. The direct connection of the said two points produces a line segment, which is referred to as a chord. By connecting the said two points by means of a line segment each to the center of the circle, two circle sections (also referred to as sectors) result, which are separated from one another. One sector is thus quasi cut out of a circle by two radii. The part of the circumference, which belongs to a sector, is referred to as circular arc, and the angle between the two radii is referred to as center angle. There is exactly one center angle for each circular arc. The sum of all center angles in a circle adds up to 360°.

In the context of the invention, the term for an ARE outer element and/or ARE inner element designed in a circular arc-like manner is understood to be a tubularly designed element, which has a cross section that corresponds to a circular arc, along its respective longitudinal axis.

In the context of the invention, the term for the inner space of the ARE outer element, which is designed in a circular arc-like manner, refers to the space that is enclosed by the circular arc and the chord.

In the context of the invention, the statement that the ARE inner element, which is designed in a circular arc-like manner, protrudes into the inner space of the ARE outer element, is understood that the circular arc of the ARE inner element runs essentially above the chord of the ARE outer element.

The term "essentially parallel" is to be understood in such a way that under real conditions and manufacturing techniques, a mathematically exact parallelism cannot be reached, but can only be provided within certain manufacturing-related error tolerances. The term "essentially parallel" is therefore understood to be for an angle between two axes of −5 degrees to 5 degrees to one another In an embodiment, the connecting lines and the first longitudinal axis are designed to be parallel in such a way that at least one connecting line and the first longitudinal axis, in particular both connecting lines and the first longitudinal axis, have an angle of −1.5 degrees to 1.5 degrees, preferably of −0.85 degrees to 0.85 degrees, preferably of −0.42 degrees to 0.42 degrees to one another. This parallelism ensures that the anti-resonance element preforms attenuate the higher order modes efficiently and additionally ensure the adherence to the resonance or anti-resonance conditions, respectively, in the later hollow-core fiber.

In an embodiment, the anti-resonance element preform comprises or consists of a material, which is transparent for a work light of the optical fiber, for example glass, in particular doped or undoped quartz glass (SiO2). A doping provides for the adaptation of physical properties, such as, for example, the thermal expansion coefficient and/or the viscosity. Fluorine, chlorine and/or hydroxyl groups are preferably used as doping agents, which lower the quartz glass viscosity.

Based on the circular arc-like design, the ARE outer element and the ARE inner element are connected to one another along two connecting lines which are arranged essentially in parallel to the first longitudinal axis.

In the two-dimensional illustration, the bond for a connecting line in each case takes place between
- a first end point of an ARE outer wall of the ARE outer element, and
- a second end point of a wall of the ARE inner element.

During the assembly of the anti-resonance element preform at target positions in the cladding tube inner bore (see step c) "arranging" and/or step d) "processing), a substance-to-substance bond of these connecting lines to the inner side of the cladding tube wall takes place. Viewed in the cross section, the anti-resonance element preform is connected to the cladding tube inner bore at two points. On the one hand, due to the connection at two points—viewed in the cross section—the precision in the assembly of the anti-resonance element preforms in the cladding tube is increased. On the other hand, the risk of a rotatory movement of the anti-resonance element preform—and/or of the ARE outer element and/or of the ARE inner element—during an elongating and/or collapsing is reduced. This increases the precision of the preform and of the anti-resonant hollow-core fiber, which is created by the preform and thus has a lower attenuation.

Due to the fact that in the case of preforms from the prior art the ARE inner element is designed in a plate-like manner, there is a risk that during the elongating into the ARE inner unit in the anti-resonant hollow-core fiber the ARE inner element places itself against the inner wall of the cladding tube inner bore, and only the ARE outer unit thus ensures the anti-resonant behavior, which increases the attenuation. In the case of the embodiments described here, the design of the ARE inner element reduces the risk that the ARE inner element deforms during a collapsing and/or elongating, and this results in particular in variations in the wall thickness of the ARE inner element and/or of the ARE inner unit, which leads to an increased attenuation in the later anti-resonant hollow-core fiber. Therefore, an anti-resonance element and/or ARE inner unit and/or anti-resonant hollow-core fiber designed in this way reaches an improved mode adaptation.

An embodiment of the anti-resonance element preform is characterized in that the ARE outer element has a first circle radius R_outer and the ARE inner element has a second circle radius R_inner.

An embodiment of the anti-resonance element preform is characterized in that the ARE outer element has a first center angle $\alpha\_outer$ and the ARE inner element has a second center angle $\alpha\_inner$.

An embodiment of the anti-resonance element preform is characterized in that
  the first circle radius R_outer and the second circle radius R_inner are essentially of identical length (R_outer=R_inner)
and the anti-resonance element preform has at least one of the following features:
  R_outer and R_inner smaller than 12 mm, in particular smaller than 8 mm, in particular smaller than 5 mm; and
  R_outer and R_inner larger than 0.5 mm, in particular larger than 1 mm, in particular larger than 2 mm.

In this embodiment alternative, the degree of freedom, which is gained according to the invention, is used in such a way that the first circle radius R_outer of the ARE outer element and the second circle radius R_inner of the ARE inner element are essentially of identical length.

An embodiment of the anti-resonance element preform is characterized in that
the first circle radius R_outer and the second circle radius R_inner are essentially of identical length (R_outer=R_inner)
and the anti-resonance element preform has at least one of the following features:
R_outer and R_inner smaller than 7 mm, in particular smaller than 6 mm; and
R_outer and R_inner larger than 3 mm, in particular larger than 4 mm.

In the context of the invention, the statement that two lengths—such as, for instance, the first circle radius R_outer and the second circle radius R_inner—are "essentially" of identical length, is understood as such that the said lengths are identical within the manufacturing-related tolerances, in particular that the said lengths differ by less than 5%, in particular by less than 3%, in particular by less than 2% in length. An embodiment is thus characterized in that an amount of a deviation of the first circle radius R_outer from the second circle radius R_inner is smaller than 5% of the first circle radius R_outer, in particular smaller than 3%, in particular smaller than 2%, in particular smaller than 1.5%, in particular smaller than 1%, in particular smaller than 0.5%.

Due to the identical lengths of the first circle radius R_outer and of the second circle radius R_inner, the ARE outer element and the ARE inner element have essentially the same negative curvature, which positively influences the attenuation on fiber lengths larger than 20 km in the anti-resonant hollow-core fiber. In particular, a particularly precise and consistent production of industrially usable preforms, in particular with a length of more than 1 m and an outer diameter of more than 40 mm, in particular more than 90 mm, is possible.

An embodiment of the anti-resonance element preform is characterized in that
the first circle radius R_outer and the second circle radius R_inner are essentially of identical length (R_outer=R_inner)
and the anti-resonance element preform has at least one of the following features:
$\alpha$_outer smaller than 350°, in particular smaller than 345°, in particular smaller than 340°;
$\alpha$_outer larger than 275°, in particular larger than 295°, in particular larger than 3200;
$\alpha$_inner smaller than 195°, in particular smaller than 180°, in particular smaller than 150°; and
$\alpha$_inner larger than 30°, in particular larger than 40°, in particular larger than 500.

An embodiment of the anti-resonance element preform is characterized in that
the first circle radius R_outer and the second circle radius R_inner are essentially of identical length (R_outer=R_inner)
and what applies for the anti-resonance element preform is:
$\alpha$_outer smaller than 275°, in particular smaller than 260°, in particular smaller than 250°;
$\alpha$_outer larger than 210°, in particular larger than 215°, in particular larger than 220°;
wherein the sum of $\alpha$_outer and $\alpha$_inner has a value of 360°.

By means of a corresponding selection of the first center angle $\alpha$_outer and of the second center angle $\alpha$_inner, a lower attenuation can also be attained in the case of a strong curvature of the anti-resonant hollow-core fiber under the boundary condition that the first circle radius R_outer and the second circle radius R_inner are essentially of identical length.

An embodiment of the anti-resonance element preform is characterized in that
the first circle radius R_outer is larger than the second circle radius R_inner (R_outer>R_inner)
and the anti-resonance element preform has at least one of the following features:
R_outer smaller than 12 mm, in particular smaller than 8 mm, in particular smaller than 5 mm;
R_outer larger than 0.5 mm, in particular larger than 1 mm, in particular larger than 2 mm;
R_inner smaller than 8 mm, in particular smaller than 5 mm, in particular smaller than 3 mm;
and
R_inner larger than 0.5 mm, in particular larger than 0.75 mm, in particular larger than 1 mm.

In this embodiment alternative, the degree of freedom gained according to the invention is used in such a way that the first circle radius R_outer of the ARE outer element is larger than the second circle radius R_inner of the ARE inner element. This results in a low attenuation of the anti-resonant hollow-core fiber, which is created from the preform.

An embodiment of the anti-resonance element preform is characterized in that
the first circle radius R_outer is larger than the second circle radius R_inner (R_outer>R_inner)
and the anti-resonance element preform has at least one of the following features:
$\alpha$_outer smaller than 350°, in particular smaller than 345°, in particular smaller than 340°;
$\alpha$_outer larger than 275°, in particular larger than 295°, in particular larger than 3200;
$\alpha$_inner smaller than 195°, in particular smaller than 180°, in particular smaller than 150°; and
$\alpha$_inner larger than 30°, in particular larger than 40°, in particular larger than 500.

By means of a corresponding selection of the first center angle $\alpha$_outer and of the second center angle $\alpha$_inner, a low attenuation of the anti-resonant hollow-core fiber can be attained under the boundary condition that the first circle radius R_outer is larger than the second circle radius R_inner.

An embodiment of the anti-resonance element preform is characterized in that
the first circle radius R_outer is smaller than the second circle radius R_inner (R_outer<R_inner)
and the anti-resonance element preform has at least one of the following features:
R_outer smaller than 12 mm, in particular smaller than 8 mm, in particular smaller than 5 mm;
R_outer larger than 0.5 mm, in particular larger than 1 mm, in particular larger than 2 mm;
R_inner smaller than 20 mm, in particular smaller than 10 mm, in particular smaller than 8 mm;
and
R_inner larger than 1 mm, in particular larger than 2 mm, in particular larger than 3 mm.

In this embodiment alternative, the degree of freedom, which is gained according to the invention, is used in such a way that the first circle radius R_outer of the ARE outer element is smaller than the second circle radius R_inner of the ARE inner element. This type of design provides for a particularly simple type of mode adaptation.

An embodiment of the anti-resonance element preform is characterized in that
the first circle radius R_outer is smaller than the second circle radius R_inner (R_outer<R_inner)
and the anti-resonance element preform has at least one of the following features:
α_outer smaller than 340°, in particular smaller than 315°, in particular smaller than 305°;
α_outer larger than 200°, in particular larger than 220°, in particular larger than 2500;
α_inner smaller than 195°, in particular smaller than 180°, in particular smaller than 150°; and
α_inner larger than 30°, in particular larger than 40°, in particular larger than 500.

By means of a corresponding selection of the first center angle α_outer and of the second center angle α_inner, a low attenuation of the anti-resonant hollow-core fiber can be attained.

An embodiment of the anti-resonance element preform is characterized in that the first center angle α_outer and/or the second center angle α_inner is smaller than 350°, in particular that the first center angle α_outer and/or the second center angle α_inner is [110°; 310°], in particular [120°; 290° ], in particular [150°; 280°].

An embodiment of the anti-resonance element preform is characterized in that
the first center angle α_outer is larger than 270° and smaller than 350°, and the second center angle α_inner is larger than 160° and smaller than 300°,
in particular the first center angle α_outer is larger than 280° and smaller than 340°, and
the second center angle α_inner is larger than 210° and smaller than 290°.

By means of a corresponding selection of the first center angle α_outer and/or of the second center angle α_inner, a low attenuation of the anti-resonant hollow-core fiber can be attained.

An embodiment of the anti-resonance preform is characterized in that
the first center angle α_outer is smaller than 275°, in particular smaller than 260°, in particular smaller than 250°,
the first center angle α_outer is larger than 210°, in particular larger than 215°, in particular larger than 220°, and
the second center angle α_inner results from a difference of α_outer and 360°,
the sum of α_outer and β_inner has a value of 360°.

An embodiment of the anti-resonance element preform is characterized in that the ARE outer element has a first segment height H_outer and the ARE inner element has a second segment height H_inner, wherein what in particular applies is that:
H_outer/H_inner smaller than 30, in particular smaller than 14, in particular between 1 and 6.

The first segment height H_outer refers to the distance of the apex to the first chord of the ARE outer element. The second segment height H_inner refers to the distance of the apex to the second chord of the ARE inner element. In this embodiment, the risk that the ARE inner element deforms during a collapsing and/or elongating is reduced, which leads to an increased attenuation of the later anti-resonant hollow-core fiber.

An embodiment of the anti-resonance element preform is characterized in that the ARE outer element has a first segment height H_outer and the ARE inner element has a second segment height H_inner, wherein what applies is that:
H_outer/H_inner smaller than 15, in particular smaller than 14, in particular smaller than 10, smaller than 6.5, in particular smaller than 4, in particular smaller than 3.2, and
H_outer/H_inner larger than 1.7, in particular larger than 1.75, in particular larger than 1.85.

The preform bow ratio is defined as follows:

$$\text{preform bow ratio} = \frac{\text{first center angle } \alpha\_\text{outer}}{\text{second center angle } \alpha\_\text{inner}}$$

The preform bow ratio thus specifies the ratio of the two center angles of the ARE elements (thus ARE outer element and ARE inner element) to one another.

An embodiment of the anti-resonance element preform is characterized in that the preform bow ratio is
larger than 1.1, in particular larger than 1.5, in particular larger than 1.6, in particular larger than 1.7; and
smaller than 5.5, in particular smaller than 5, in particular smaller than 4, in particular smaller than 3, in particular smaller than 2.8, in particular smaller than 2.5.

An embodiment of the anti-resonance element preform is characterized in that
the first circle radius R_outer and the second circle radius R_inner are essentially of identical length (R_outer=R_inner)
wherein the anti-resonance element preform has the preform bow ratio
larger than 1.1, in particular larger than 1.5, in particular larger than 1.6, in particular larger than 1.7; and
smaller than 5.5, in particular smaller than 5, in particular smaller than 4, in particular smaller than 3, in particular smaller than 2.8, in particular smaller than 2.5.

In this embodiment, the anti-resonance element preform can be integrated into the preform in a particularly precise manner, in particular into a preform with a length of more than 1 m and an outer diameter of more than 40 mm, in particular more than 90 mm.

An embodiment of the anti-resonance element preform is characterized in that an ARE arc element is arranged in the inner space of the ARE outer element, in particular that the ARE arc element is arranged at the ARE inner element.

The ARE arc element serves to attenuate unwanted modes. By means of a corresponding integration into the anti-resonance element preform, the mode adaptation of the preform and/or of the later anti-resonant hollow-core fiber can further be made easier.

In an embodiment, the ARE arc element comprises or consists of a material, which is transparent for a work light of the optical fiber, for example glass, in particular doped or undoped quartz glass (SiO2), or an amorphous solid body. A doping provides for the adaptation of physical properties, such as, for example, of the thermal expansion coefficient and/or of the viscosity. Fluorine, chlorine and/or hydroxyl groups are preferably used as doping agents which lower the viscosity of quartz glass. The ARE arc element and the ARE outer element can in particular be made of identical material.

An embodiment of the anti-resonance element preform is characterized in that the ARE arc element is designed in a circular arc-shaped manner and has a fifth circle radius R_arc and a fifth center angle α_arc, and the ARE arc element is connected along two contact lines with the ARE outer element and/or the ARE inner element.

An embodiment of the anti-resonance element preform is characterized in that the ARE arc element is designed in a circular manner and has a radius R_circle, and the ARE arc element is connected along a contact line with the ARE inner element.

The above-mentioned objects are also solved by means of a preform of an anti-resonant hollow-core fiber, comprising
a cladding tube, which has a cladding tube inner bore and a cladding tube longitudinal axis, along which a cladding tube wall, which is limited by an inner side and an outer side, extends,
a number of anti-resonance element preforms, wherein the anti-resonance element preforms are arranged spaced apart from one another and in a contact-free manner at target positions on the inner side of the cladding tube wall.

According to the invention, it is provided that at least one of the anti-resonance element preforms is designed according to any one of the described embodiments.

A preform designed in this way provides for a mode adaptation, which is made easier compared to the prior art, and for a more precise production.

All of the properties and features described for the anti-resonance element preforms also apply for the preform and in each case vice versa.

The ratio z/R_preform is defined as follows:

$$\frac{z}{R_{preform}} = \frac{H_{outer} - H_{inner}}{R_{preform}}$$

Thus, z/R_preform results from the difference between the first segment height H_outer and the second segment height H_inner, divided by the preform core radius R_preform.

The preform core radius R_preform thereby identifies the shortest distance of a longitudinal axis of the cladding tube and of an anti-resonance element preform.

An embodiment of the preform is characterized in that the ratio z/R_preform is
larger than 0.1, in particular larger than 0.2, in particular larger than 0.25, and
smaller than 1, in particular smaller than 0.8, in particular smaller than 0.5.

These parameter spaces for z/R_preform provide for a good coupling of higher order mode groups based on an adapted phase propagation speed of the mode groups in the hollow-core fiber produced from the preform. This applies in particular when, in addition to the above-mentioned values z/R_preform, the first circle radius R_outer and the second circle radius R_inner of the anti-resonance element preforms are also essentially of identical length in the preform (R_outer=R_inner), in particular in a preform with a length of more than 1 m and an outer diameter of more than 40 mm, in particular more than 90 mm.

The term "inner bore" in connection with a cladding tube does not mean that the inner bore has been created by means of a drilling process.

The above-mentioned objects are also solved by means of a method for producing a preform of an anti-resonant hollow-core fiber, comprising the steps of:
a) providing a cladding tube, which has a cladding tube inner bore and a cladding tube longitudinal axis, along which a cladding tube wall extends that is limited by an inner side and an outer side,
b) preparing a number of anti-resonance element preforms, each comprising an ARE outer element and an ARE inner element inserted therein,
c) arranging the anti-resonance element preforms at target positions in the cladding tube inner bore,
d) processing an assembly, comprising the cladding tube and the anti-resonance element preforms by means of a hot-forming process selected from at least one of elongating and collapsing.

It is provided thereby that
a relative inner pressure in the range of between −10 to −300 mbar, in particular −50 to −250 mbar, is set in the cladding tube inner bore in step d) "processing",
the ARE outer element and the ARE inner element are designed in a circular arc-like manner in at least one anti-resonance element preform, and
the ARE outer element and the ARE inner element are connected to one another and to the cladding tube inner bore along two connecting lines.

Step a)

The cladding tube is prepared as part of step a) "providing". This cladding tube has a hollow core, which extends along the cladding tube longitudinal axis. In an embodiment, the cladding tube has an outer diameter in the range of 65 to 300 mm, preferably 90 to 250 mm, preferably 120 to 200 mm. In particular, the cladding tube can have a length of at least 1 m. In an embodiment, the cladding tube comprises or consists of a material, which is transparent for a work light of the optical fiber, for example, glass, in particular doped or undoped quartz glass ($SiO_2$). A doping provides for the adaptation of physical properties, such as, for example, the thermal expansion coefficient and/or the viscosity. Fluorine, chlorine and/or hydroxyl groups are preferably used as doping agents which lower the viscosity of quartz glass.

Step b)

A number of anti-resonance element preforms is created as part of step b) "preparing". Components or component parts of the preform, which essentially turn into anti-resonance elements in the hollow-core fiber by means of simple stretching during the fiber drawing process, are referred to as anti-resonance element preforms. The individual anti-resonance element preform is constructed from tubular structural elements, at least a part of which can have a wall thickness in the range of 0.1 mm to 2 mm, preferably 0.2 mm to 1.5 mm. The anti-resonance element preforms can be simple or nested components, wherein the respective anti-resonance element preform comprises an ARE outer tube and an ARE inner tube inserted therein. The anti-resonance element preforms have at least two walls, which have a negative curvature (convex) viewed from the direction of the hollow core. By further processing of the preform, in particular by means of hot-forming steps, intermediate products can be created, in which the original anti-resonance element preforms are present in a shape that is changed compared to the original shape.

In an embodiment, the anti-resonance element preform comprises or consists of a material, which is transparent for a work light of the optical fiber, for example glass, in particular doped or undoped quartz glass ($SiO_2$). A doping makes possible the adaptation of physical properties, such as, for example, the thermal expansion coefficient and/or the viscosity. Fluorine, chlorine and/or hydroxyl groups are preferably used as doping agents, which lower the viscosity of quartz glass.

In an embodiment, the anti-resonance element preforms and the cladding tube are made of identical material. In a further embodiment, the anti-resonance element preforms and the cladding tube consist of the same material, in particular of undoped or doped quartz glass (SiO2), wherein the amount of the doping does not exceed 0.1% by weight.

The term "made of identical material" describes the substance property of two parts. The two parts thereby have essentially the same chemical substance. The total mass of the different chemical elements in both parts can thereby be less than 1% by weight, in particular less than 0.5% by weight, in particular less than 0.1% by weight. The chemical composition of the two parts in particular differs by a content of contaminations of less than 500 ppm by weight, in particular less than 100 ppm by weight, and/or by a content of doping agent of less than 10,000 ppm by weight, in particular less than 5,000 ppm by weight.

Step c)

As part of step c) "arranging", a positioning of the anti-resonance element preforms takes place at target positions in the cladding tube inner bore. After step c) "arranging", a longitudinal axis of the anti-resonance element preforms can be aligned essentially in parallel to the longitudinal axis of the cladding tube longitudinal axis. In an embodiment, the longitudinal axis of the anti-resonance element preforms and the cladding tube longitudinal axis are designed in parallel, so that the longitudinal axis of the anti-resonance element preforms and the cladding tube longitudinal axis have an angle of −1.5 degrees to 1.5 degrees, preferably of −0.85 degrees to 0.85 degrees, preferably of −0.42 degrees to 0.42 degrees to one another. This parallelism ensures that the anti-resonance element preforms are arranged at the target positions in the cladding tube, and thus ensures that the resonance or anti-resonance conditions, respectively, are adhered to in the later hollow-core fiber.

The fulfillment of at least one of the following conditions is essential for the adherence to the resonance or anti-resonance conditions, respectively, in the later hollow-core fiber, or for a further reduction of the attenuation in the later hollow-core fiber, respectively:

The anti-resonance element preforms have to be arranged at the pre-calculated target positions in the cladding tube.

The anti-resonance element preforms have to be arranged at the pre-calculated target positions in the assembly.

The anti-resonance element preforms have to be arranged at the pre-calculated target positions in the preform.

Step d)

As part of step d) "processing", the assembly comprising the cladding tube, the anti-resonance element preforms, and the positioning template is further processed by means of at least one of the hot processes elongating and collapsing.

In the context of the invention, the term for an elongating is understood to be an enlargement of the longitudinal expansion of a body. This enlargement of the longitudinal expansion can be associated with a reduction of the transversal expansion of the body. The elongating can take place to scale, so that, for example, the shape and arrangement as well as the size ratios (e.g. cladding tube to anti-resonance preform) of components or component parts are reflected in the elongated end product.

In the context of the invention, the term for a collapsing is understood to be a reduction of the transversal expansion of a body. This reduction of the transversal expansion of the body can take place as part of an increase of the temperature of the body, and can in particular lead to an enlargement of the longitudinal expansion of the body.

The term "hot process" is understood to be a method step, during which the temperature of an element is increased by means of heat input. Examples for hot processes are:

Flame-based hot processes based on the oxidation of an exothermically reacting gas. One example is the use of hydrogen—also referred to as "H2"—as combustion gas (the flame hydrolysis). It reacts with the oxygen—also referred to as "O2"—which is in the air or is supplied thereto externally.

Flame-free hot processes use other systems, which warm up and do not require an open flame. One example is the use of a resistor, which converts electrical energy into thermal energy (heat).

It is provided that a relative inner pressure in the range of between −10 to −300 mbar, in particular −50 to −250 mbar, is set in the cladding tube inner bore in step d) "processing", the ARE outer element and the ARE inner element are designed in a circular arc-like manner in at least one anti-resonance element preform, and the ARE outer element and the ARE inner element are connected to one another and to the cladding tube inner bore along two connecting lines.

The relative inner pressure (a negative pressure compared to the ambient atmospheric pressure) in the range of between −10 to −300 mbar, in particular −50 to −250 mbar, which is set in the cladding tube inner bore as part of the elongating and/or collapsing, ensures that the OD/ID ratio (ratio of outer diameter to inner diameter of the cladding tube) does not become too small.

In the case of anti-resonant hollow-core fibers from the prior art, the ARE outer element as well as the ARE inner element are designed in a tubular manner. The nested installed ARE outer elements and ARE inner elements are in each case connected to one another and to the cladding tube along a connecting line. Therefore, there is a risk that the ARE elements perform a rotatory movement during the elongating, and the evenly distributed arrangement of the ARE elements at the cladding tube inner wall is thus disturbed, which is reflected in an increased attenuation. This disadvantage is overcome in the method according to the invention.

An embodiment of the method is characterized in that the ARE outer element has an inner space, which is at least partially limited by an ARE outer wall and into which the ARE inner element designed in a circular arc-like manner protrudes. In the case of this embodiment, the risk is reduced that the ARE inner element deforms during a collapsing and/or elongating, and this results in particular in variations in the wall thickness of the ARE inner element, which leads to an increased attenuation in the later anti-resonant hollow-core fiber.

An embodiment of the method is characterized in that the ARE outer element has a first center angle α_outer and the ARE inner element has a second center angle α_inner, wherein in particular the first center angle α_outer and/or the second center angle α_inner are larger than 310°.

An embodiment of the method is characterized in that the anti-resonance element preforms are thermally fixed in a flame-free manner to the cladding tube wall in step d) "processing". The position of the anti-resonance element preforms in the cladding tube can be as follows:

the anti-resonance element preforms can contact the inner side of the cladding tube inner bore after step c) "arranging", or a gap, which is closed in particular during step d) "processing", can still exist between the anti-resonance element preforms and the inner side of the cladding tube inner bore after step c) "arranging".

In the case of known methods, the anti-resonance element preforms are thermally fixed to the cladding tube wall, in particular at the respective ends, through a torch by using a flame. An elongating and/or collapsing takes place only thereafter. Thereby the formation of soot (name for SiO2 particles) and burn-off turned out to be disadvantageous. These byproducts of the combustion can have different starting points: The combustion of the fuel gas in the torch can take place by forming a flame with an excess of combustible material or with an oxidant excess. For instance, the soot is a known byproduct of combustion of this type. Furthermore, the heat input from the torch to the cladding tube can lead to a local evaporation of the quartz glass. The soot created in this way can subsequently get deposited on the individual parts of the preform, in particular on the anti-resonance element preforms. This then leads to a reduction of the quality of the finally produced preform, which becomes apparent in particular in a higher attenuation or fiber breakages.

The deposition of burn-off or soot forms in particular on the front surface of the cladding tube as well as on the inner surface thereof. Furthermore, the surfaces of the anti-resonance element preforms are particularly affected. Due to the complexity of the created geometry, a complete cleaning, for example by means of hydrofluoric acid, is hardly possible. The anti-resonance element preforms can be connected to the cladding tube wall by means of a substance-to-substance bond by the use of a flame-free process as part of step d) "processing", without the deposit of soot or burn-off in the assembly.

An embodiment of the method is characterized in that the cladding tube has an outer diameter in the range of 65 to 300 mm, preferably 90 to 250 mm, preferably 120 to 200. The cladding tube can in particular have a length of at least 1 m.

The accuracy of the positioning of the anti-resonance element preforms in the cladding tube is improved, whereby anti-resonance element preforms are provided, at least a part of which with a wall thickness in the range of 0.2 and 2 mm, preferably a wall thickness in the range of 0.25 and 1 mm, and wherein a cladding tube with an outer diameter in the range of 65 to 300 mm, preferably with an outer diameter in the range of 90 to 250 mm, preferably with an outer diameter in the range of 120 to 200 mm, is provided. Thereby, in addition, these components can each have a length of at least 1 m.

In an embodiment, the cladding tube comprises or consists of a material, which is transparent for a work light of the optical fiber, for example glass, in particular doped or undoped quartz glass (SiO2). A doping makes possible the adaptation of physical properties, such as, for example, the thermal expansion coefficient and/or the viscosity. Fluorine, chlorine and/or hydroxyl groups are preferably used as doping agents which lower the viscosity of quartz glass.

An embodiment of the method for producing a secondary preform, from which an anti-resonant hollow-core fiber can be drawn, from a preform produced according to any one of the preceding embodiments, has the step of
further processing the preform into the secondary preform,
wherein the further processing comprises a one-time or repeated performing one or several of the following hot-forming processes:

i.) elongating,
ii.) collapsing,
iii.) collapsing and simultaneous elongating,
iv.) adding additional cladding material,
v.) adding additional cladding material and subsequent elongating,
vi.) adding additional cladding material and simultaneous elongating.

A preform, in particular a preform according to the described embodiments, in particular a preform having at least one anti-resonance element preform according to the described embodiments, is the starting point for the production of the anti-resonant hollow-core fiber. In the method according to the invention, the preform is further processed into a secondary preform by performing one or several hot-forming processes.

During the elongating, the preform is lengthened. The lengthening can take place without simultaneous collapsing. The elongating can take place to scale, so that, for example, the shape and arrangement as well as the size ratios (e.g. cladding tube to anti-resonance preform) of components or component parts of the preform are reflected in the elongated end product of the secondary preform. However, during the elongating, the primary preform can also be drawn not to scale, and the geometry thereof can be changed. During the collapsing, an inner bore is narrowed or ring gaps are closed or narrowed between tubular components. The collapsing can be associated with an elongating. The secondary preform produced in this way can already be designed and suitable for drawing a hollow-core fiber. The secondary preform can optionally be further processed whereby, for example, elongated, or additional cladding material is added to it.

An embodiment of the method is characterized in that at least one of the anti-resonance element preforms is designed according to any one of the preceding embodiments.

All of the properties and features described for the anti-resonance element preform also apply for the method and vice versa.

The above-mentioned objects are also solved by means of an anti-resonant hollow-core fiber, comprising
a cladding with a cladding inner bore and a cladding longitudinal axis, along which a cladding wall extends that is limited by a cladding inner side and a cladding outer side,
a number of anti-resonance elements, each comprising an ARE outer unit and an ARE inner unit, wherein the ARE outer unit, which is designed in a circular arc-like manner, and the ARE inner unit are connected to one another along two seam lines,
the anti-resonance elements are arranged spaced apart from one another and in a contact-free manner at target positions on the cladding inner side of the cladding wall.

According to the invention, it is provided that the ARE outer unit has an inner space, which is at least partially limited by an ARE outer wall and into which the ARE inner unit designed in a circular arc-like manner protrudes at least partially.

To provide for a monomodal wave in the core of the anti-resonant hollow-core fiber, the higher modes, which are likewise coupled in, have to be attenuated. If possible, this is to take place within the first meters of the optical anti-resonant hollow-core fiber. In the case of NANF fibers, the anti-resonance elements serve to attenuate these higher modes. One aspect thereby is the geometric design of the ARE inner unit and ARE outer unit both alone and to one another. The adaptation of the ARE inner unit and ARE outer unit to one another with the goal of attenuation of the modes of a higher order, is also referred to as mode adaptation. Compared to the anti-resonant hollow-core fibers from the prior art, the anti-resonant hollow-core fiber according to the invention is characterized in that
   ARE outer unit as well as ARE inner unit have a negative curvature, which has a positive impact on the attenuation, and
   virtually any combinations can be used for the radii of the ARE inner unit and the ARE outer unit due to the option according to the invention.

This degree of freedom provides for an improved mode adaptation in the anti-resonant hollow-core fiber.

In an embodiment, at least one seam line and the cladding longitudinal axis are designed in parallel, so that in particular both seam lines and the cladding longitudinal axis have an angle of −1.5 degrees to 1.5 degrees, preferably of −0.85 degrees to 0.85 degrees, preferably of −0.42 degrees to 0.42 degrees to one another. This parallelism ensures an improved mode adaptation in the anti-resonant hollow-core fiber.

An embodiment of the anti-resonant hollow-core fiber is characterized in that the anti-resonant hollow-core fiber has three, four, five, six, seven, or eight anti-resonance elements, in particular that the anti-resonant hollow-core fiber has an odd number of anti-resonance elements. This number has proven to be particularly advantageous in the reduction of the attenuation in the anti-resonant hollow-core fiber.

An embodiment of the anti-resonant hollow-core fiber is characterized in that the anti-resonant hollow-core fiber has at least one of the following features:
   the anti-resonance elements are arranged symmetrically on the cladding inner side of the cladding wall,
   at least one of the ARE outer units and/or ARE inner units is constructed of an amorphous solid body, in particular glass, in particular quartz glass, in particular of glass with a refractive index of at least 1.4, in particular 1.4 to 3, in particular 1.4 to 2.8, and
   a wall thickness of the ARE outer units and the ARE inner units is essentially identical.

The term "essentially identical wall thickness" is to be understood in such a way that under real conditions and manufacturing techniques a mathematically exactly identical wall thickness cannot be attained, but can only be provided within certain manufacturing-related error tolerances. Therefore, the term "essentially identical wall thickness" is understood to be a difference in the wall thickness of the ARE outer units and the ARE inner units of less than 5%, in particular less than 2.5%, in particular less than 1.5%.

An embodiment of the anti-resonant hollow-core fiber is characterized in that the anti-resonant hollow-core fiber has at least one of the following features:
   a fundamental attenuation of less than 0.15 dB/km at a transported wavelength of between 1.0 μm and 2.5 μm, and
   a fundamental attenuation of less than 1 dB/km at a transported wavelength of up to 0.8 μm.

An embodiment of the anti-resonant hollow-core fiber is characterized in that the anti-resonance elements form a core with a core radius, wherein the core radius is smaller than 50 μm, in particular smaller than 40 μm, in particular smaller than 30 μm, in particular smaller than 25 μm, in particular smaller than 20 μm, in particular smaller than 15 μm, in particular smaller than 13 μm. The core radius is thereby the shortest distance between a longitudinal axis of the anti-resonant hollow-core fiber and the ARE outer unit.

The anti-resonant hollow-core fiber has a bolt circle radius, which results from the sum of the core radius and of the third circle radius FB_outer. An embodiment of the anti-resonant hollow-core fiber is characterized in that the bolt circle radius is smaller than 40 μm, in particular smaller than 38 μm, in particular smaller than 33 μm. An embodiment of the anti-resonant hollow-core fiber is characterized in that the bolt circle radius is larger than 20 μm, in particular larger than 25 μm, in particular larger than 29.5 μm.

An embodiment of the anti-resonant hollow-core fiber is characterized in that the anti-resonant hollow-core fiber has at least one of the following features:
   the ARE outer unit has a third circle radius FB_outer,
   the ARE inner unit has a fourth circle radius FB_inner,
   the ARE outer unit has a third center angle β_outer, and
   the ARE inner unit has a fourth center angle β_inner.

An embodiment of the anti-resonant hollow-core fiber is characterized in that
   the third circle radius FB_outer and the fourth circle radius FB_inner are essentially of identical length (FB_outer=FB_inner)
and at least one anti-resonance element has at least one of the following features:
   FB_outer smaller than 30 μm, in particular smaller than 25 μm, in particular smaller than 15 μm;
   FB_outer larger than 5 μm, in particular larger than 10 μm, in particular larger than 12 μm;
   FB_inner smaller than 30 μm, in particular smaller than 25 μm, in particular smaller than 15 μm;
   and
   FB_inner larger than 5 μm, in particular larger than 10 μm, in particular larger than 12 μm.

An embodiment of an anti-resonant hollow-core fiber of this type has a lower attenuation. An optimized mode adaptation can be performed by means of the degree of freedom gained according to the invention.

The term "essentially of identical length" is to be understood so that a mathematically exactly identical length cannot be attained under real conditions and manufacturing techniques but can only be at hand within certain manufacturing-related error tolerances. In this respect, the term "essentially of identical length" is understood to mean that an amount of a deviation of the third circle radius FB_outer from the fourth circle radius is smaller than 5% of the third circle radius FB_outer, in particular smaller than 3%, in particular smaller than 2%, in particular smaller than 1.5%, in particular smaller than 1%.

An embodiment of the anti-resonant hollow-core fiber is characterized in that
   the third circle radius FB_outer and the fourth circle radius FB_inner are essentially of identical length (FB_outer=FB_inner)
   and at least one anti-resonance element has at least one of the following features:
   FB_outer smaller than 25 μm, in particular smaller than 22 μm, in particular smaller than 20, in particular smaller than 17 μm, in particular smaller than 16 μm;
   FB_outer larger than 5 μm, in particular larger than 7 μm, in particular larger than 10 μm, in particular larger than 12 μm;
   FB_inner smaller than 25 μm, in particular smaller than 22 μm, in particular smaller than 20 μm, in particular smaller than 17 μm, in particular smaller than 16 μm; and
   FB_inner larger than 5 μm, in particular larger than 7 μm, in particular larger than 10 μm, in particular larger than 12 μm.

An embodiment of the anti-resonant hollow-core fiber is characterized in that
the third circle radius FB_outer and the fourth circle radius FB_inner are essentially of identical length (FB_outer=FB_inner)
and the anti-resonance elements have the following features:
FB_outer smaller than or equal to 16.5 µm, in particular smaller than or equal to 15.75 µm;
FB_outer larger than or identical to 11.5 µm, in particular larger than or identical to 12.25 µm;
FB_inner smaller than or identical to 16.5 µm, in particular smaller than or identical to 15.75;
FB_inner larger than or identical to 11.5 µm, in particular larger than or identical to 12.25 µm.

An embodiment of an anti-resonant hollow-core fiber of this type has a small attenuation.

An embodiment of the anti-resonant hollow-core fiber is characterized in that
the third circle radius FB_outer and the fourth circle radius FB_inner are essentially of identical length (FB_outer=FB_inner)
and at least one anti-resonance element has at least one of the following features:
β_outer smaller than 350°, in particular smaller than 345°, in particular smaller than 340°;
β_outer larger than 275°, in particular larger than 295°, in particular larger than 320°;
β_inner smaller than 195°, in particular smaller than 180°, in particular smaller than 150°; and
β_inner larger than 30°, in particular larger than 40°, in particular larger than 500.

An embodiment of the anti-resonant hollow-core fiber is characterized in that a confinement loss of the base mode is smaller than 10E-2 db/m, wherein
the third circle radius FB_outer and the fourth circle radius FB_inner are essentially of identical length (FB_outer=FB_inner), wherein an amount of a deviation of the third circle radius FB_outer from the fourth circle radius is smaller than 2% of the third circle radius FB_outer,
the anti-resonant hollow-core fiber has five, six, or seven anti-resonance elements,
and the anti-resonance elements have at least one of the following features:
the bow ratio is larger than 1.6 und smaller than 3.0,
FB_outer and FB_inner are smaller than or equal to 16.5 µm, in particular smaller than or equal to 15.75 µm; and
FB_outer and FB_inner are larger than or equal to 11.5 µm, in particular larger than or identical to 12.25 µm.

This embodiment of the anti-resonant hollow-core fiber has in particular a confinement loss (also referred to as waveguide losses) of the base mode of less than 10E-2 db/m (thus 0.01 db/m), which is highly advantageous.

Hollow-core fibers are generally multi-mode waveguides. In addition to the base mode, the core also guides modes of higher order (hereinafter also "higher order modes" or "HOM"). The HOM have higher waveguide losses than the base mode. In this respect, hollow-core fibers quasi behave in a base-mode manner after a longer run distance. It is advantageous, however, when this run distance is as short as possible.

For an improved base mode behavior of the fiber, an additional loss mechanism can be used, in which case the energy of the HOM couples into the highly lossy modes in the ARE units (ARE outer units and/or ARE inner units) by means of an adapted design of the hollow-core fiber. This coupling requires an adapted phase propagation speed of the two mode groups
HOM in the core of the hollow-core fiber and
ARE modes in the ARE units (ARE outer units and/or ARE inner units).

A good coupling of the phase propagation speed of said two mode groups is present when the effective mode index $n_{eff}$ of both mode groups essentially corresponds.

The coupling of the phase propagation speed can be influenced in particular by means of the geometries of individual components of the hollow core fiber. In particular the parameter "z/R" thereby turned out to be essential, which is defined as follows:

$$\frac{z}{R} = \frac{HF_{outer} - HF_{inner}}{R_{fiber}}$$

In this respect, z/R results from the difference between the third segment height HF_outer (see 2424 in FIG. 20) and the fourth segment height HF_inner (see 2434 in FIG. 20), divided by the core radius R_fiber (see 2405 in FIG. 20). In an embodiment alternative of the hollow-core fiber, z/R is
larger than 0.6, in particular larger than 0.7, in particular larger than 0.8, and
smaller than 1.4, in particular smaller than 1.3, in particular smaller than 1.2.

In particular, z/R lies within the interval [0.8; 1.2]. These parameter spaces for z/R provide for a good coupling of the phase propagation speed of said two mode groups.

In order to attain a small confinement loss of the base mode, in particular a confinement loss of less than 10E-2 db/m, as well as the attaining of a base mode behavior on a short fiber distance, an embodiment of the anti-resonant hollow-core fiber can be characterized in that the ratio z/R is
larger than 0.75, in particular larger than 0.8, and
smaller than 1.25, in particular smaller than 1.2,
the third circle radius FB_outer and the fourth circle radius FB_inner are essentially of identical length (FB_outer=FB_inner), wherein FB_outer and FB_inner is smaller than 17 µm and larger than 12 µm, and the bow ratio is smaller than 2.8 and larger than 1.6.

An embodiment of the anti-resonant hollow-core fiber is characterized in that
the third circle radius FB_outer and the fourth circle radius FB_inner are essentially of identical length (FB_outer=FB_inner)
and the wall thickness of the ARE outer unit and/or ARE inner unit at a signal wavelength of 1550 nm in the first transmission window is between 0.35 µm and 0.65 µm, in particular between 0.4 µm and 0.6 µm, in particular 0.5 µm.

An embodiment of the anti-resonant hollow-core fiber is characterized in that
the third circle radius FB_outer and the fourth circle radius FB_inner are essentially of identical length (FB_outer=FB_inner)
and the wall thickness of the ARE outer unit and/or ARE inner unit at a signal wavelength of 1550 nm in the second transmission window is between 1.25 µm and 0.75 µm, in particular between 1.1 µm and 0.9 µm, in particular 1 µm.

An embodiment of the anti-resonant hollow-core fiber is characterized in that
the third circle radius FB_outer is longer than the fourth circle radius FB_inner (FB_outer>FB_inner)

and at least one anti-resonance element has at least one of the following features:
  FB_outer smaller than 30 μm, in particular smaller than 25 μm, in particular smaller than 15 μm;
  FB_outer larger than 5 μm, in particular larger than 10 μm, in particular larger than 12 μm;
  FB_inner smaller than 20 μm, in particular smaller than 15 μm, in particular smaller than 11 μm; and
  FB_inner larger than 2 μm, in particular larger than 4 μm, in particular larger than 6 μm.

An improved mode adaptation can be performed due to the option that the fourth circle radius FB_inner of the ARE inner unit is larger than the third circle radius FB_outer of the ARE outer unit.

An embodiment of the anti-resonant hollow-core fiber is characterized in that
  the third circle radius FB_outer is longer than the fourth circle radius FB_inner (FB_outer>FB_inner)
and at least one anti-resonance element has at least one of the following features:
  β_outer smaller than 350°, in particular smaller than 345°, in particular smaller than 340°;
  β_outer larger than 275°, in particular larger than 295°, in particular larger than 3200;
  β_inner smaller than 300°, in particular smaller than 285°, in particular smaller than 230°; and
  β_inner larger than 100°, in particular larger than 120°, in particular larger than 1500.

An embodiment of the anti-resonant hollow-core fiber is characterized in that
  the third circle radius FB_outer is shorter than the fourth circle radius FB_inner (FB_outer<FB_inner)
and at least one anti-resonance element has at least one of the following features:
  FB_outer smaller than 30 μm, in particular smaller than 25 μm, in particular smaller than 15 μm;
  FB_outer larger than 5 μm, in particular larger than 10 μm, in particular larger than 12 μm;
  FB_inner smaller than 20 μm, in particular smaller than 15 μm, in particular smaller than 11 μm; and
  FB_inner larger than 2 μm, in particular larger than 4 μm, in particular larger than 6 μm.

A design of an anti-resonant hollow-core fiber of this type has a low attenuation.

An embodiment of the anti-resonant hollow-core fiber is characterized in that
  the third circle radius FB_outer is shorter than the fourth circle radius FB_inner (FB_outer<FB_inner)
and at least one anti-resonance element has at least one of the following features:
  β_outer smaller than 340°, in particular smaller than 315°, in particular smaller than 305°;
  β_outer larger than 200°, in particular larger than 220°, in particular larger than 2500;
  β_inner smaller than 195°, in particular smaller than 180°, in particular smaller than 150°; and
  β_inner larger than 30°, in particular larger than 40°, in particular larger than 50°.

An embodiment of the anti-resonant hollow-core fiber is characterized in that the third center angle β_outer and/or the fourth center angle β_inner is smaller than 350°, in particular that the third center angle β_outer and/or the fourth center angle β_inner is [200°; 340°], in particular [250°; 330°], in particular [300°; 320°].

An embodiment of the anti-resonant hollow-core fiber is characterized in that the ARE outer unit has a third segment height HF_outer and the ARE inner element has a fourth segment height H_inner, wherein what in particular applies is that:
  the ratio of the third segment height HF_outer to the fourth segment height is smaller than thirty (HF_outer/HF_inner<30).

The third segment height HF_outer refers to the distance of the apex to the chord of the ARE outer unit. The fourth segment height HF_inner refers to the distance of the apex to the chord of the ARE inner unit. A low attenuation of the anti-resonant hollow-core fiber can be attained by means of a corresponding selection of the ratio.

This embodiment can further be changed to the effect that at least one anti-resonance element has at least one of the following features:
  HF_outer/HF_inner smaller than 6.5, in particular smaller than 4, in particular smaller than 3.2;
  HF_outer/HF_inner larger than 1.7, in particular larger than 1.75, in particular larger than 1.85.

This embodiment is particularly advantageous in the case of anti-resonant hollow-core fibers, in which case the third circle radius FB_outer and the fourth circle radius FB_inner are essentially of identical length (FB_outer=FB_inner).

An embodiment of the anti-resonant hollow-core fiber is characterized in that an ARE arc unit is arranged in the ARE outer unit. To provide for a monomodal wave in the core, the higher modes have to be attenuated in the anti-resonant hollow-core fiber. To fulfill this object, the ARE outer unit can be supplemented by the ARE arc unit.

An embodiment of the anti-resonant hollow-core fiber is characterized in that the ARE arc unit is designed in a circular arc-like manner and has a sixth circle radius FB_arc and a sixth center angle β_arc, and the ARE arc unit is connected to the ARE outer unit and/or the ARE inner unit along two contact seams.

An embodiment of the anti-resonant hollow-core fiber is characterized in that the ARE arc unit is designed in a circular manner and has a radius FB_circle, and the ARE arc unit is connected with the ARE inner unit along a contact seam.

As part of an elongating and/or collapsing, the ARE arc unit can be created from an ARE arc element. Therefore, with respect to the design, the statements made with regard to the ARE arc element also apply for the ARE arc unit.

An embodiment of the anti-resonant hollow-core fiber is characterized in that a fundamental attenuation difference between a straight anti-resonant hollow-core fiber and an anti-resonant hollow-core fiber, which is wound-up to a diameter of 10 mm, is smaller by two orders of magnitude, in particular smaller by one order of magnitude, in particular smaller than half of an order of magnitude.

An embodiment of the anti-resonant hollow-core fiber is characterized in that the anti-resonant hollow-core fiber is produced from a preform according to any one of the preceding embodiments.

All of the properties and features described for the preform also apply for the anti-resonant hollow-core fiber and in each case vice versa.

An embodiment of the anti-resonant hollow-core fiber is characterized in that the anti-resonant hollow-core fiber is produced by using a method according to any one of the preceding embodiments.

All of the properties and features described for the anti-resonant hollow-core fiber also apply for the preform and/or the anti-resonant hollow-core fiber and/or the method, and in each case vice versa.

The above-mentioned objects are also solved by means of a method for producing an anti-resonant hollow-core fiber from a preform produced according to any one of the preceding embodiments, in particular produced by using a method according to any one of the preceding embodiments, having the step of further processing the preform into the anti-resonant hollow-core fiber,
wherein the further processing comprises a one-time or repeated performance of one or several of the following hot-forming processes:
i.) elongating,
ii.) collapsing,
iii.) collapsing and simultaneous elongating,
iv.) adding additional cladding material,
v.) adding additional cladding material and subsequent elongating,
vi.) adding additional cladding material and simultaneous elongating.

To further process and create the anti-resonant hollow-core fiber from the preform, the preform can be guided perpendicularly through a furnace. Thereby, a lower end of the preform, from which the anti-resonant hollow-core fiber is drawn in the form of a cone, is warmed up to drawing temperature, wherein the drawn anti-resonant hollow-core fiber is subsequently cooled down from the drawing temperature by means of a gas stream, which is directed opposite to the drawing direction.

In an embodiment, the anti-resonant hollow-core fiber is coated with a protective layer, wherein this step is performed during the drawing process in the course of the glass fiber production. The plastic used for the coating can be one or several of the following substances: polyurethane acrylates, acrylates, polyolefins, polyamides (nylon), polyethers, polyurethane monoacrylates, fluoroalkyl methylacrylates, or polyimide.

An embodiment of the method for producing an anti-resonant hollow-core fiber is characterized in that a relative inner pressure in the range of between 0.05 mbar-20 mbar is set in the core region during the "further processing" step as part of the elongating of the preform into an anti-resonant hollow-core fiber.

In the case of a relative inner pressure of less than 0.05 mbar, it can occur that the anti-resonant hollow-core fiber collapses too strongly. Vice versa, a relative inner pressure of more than 20 mbar in the core region can result in that the anti-resonant hollow-core fiber widens too strongly.

The temperature of a heating zone during the hot-forming process should be as constant as possible. Advantageously, a temperature-controlled heating element, whose target temperature is held exactly at +/−0.1°, is thus used during the hot-forming process. The temperature fluctuations in the hot-forming process can thus be limited to less than +/−0.5° C.

In particular at least one of the following transitions can occur during the production of an anti-resonant hollow-core fiber from a preform according to any one of the preceding embodiments, in particular as part of the "further processing" step:

the anti-resonance element is created from the anti-resonance element preform,
at least a part of the cladding is created from the cladding tube,
the ARE outer unit is created from the ARE outer element,
the ARE inner unit is created from the ARE inner element,
the third circle radius FB_outer is created from the first circle radius R_outer,
the fourth circle radius FB_inner is created from the second circle radius R_inner,
the third center angle β_outer is created from the first center angle α_outer,
the fourth center angle β_inner is created from the second center angle α_inner,
the third segment height HF_outer is created from the first segment height H_outer,
the fourth segment height HF_inner is created from the second segment height H_inner,
the seam line is created from the connecting line,
the ARE arc unit is created from the ARE arc element,
the sixth circle radius FB_arc is created from the fifth circle radius R_arc,
the radius FB_circle is created from the radius R_circle,
the sixth center angle β_arc is created from the fifth center angle α_arc,
and
the contact seam is created from the contact line.

Therefore, all of the properties and features described for the anti-resonance element preforms also apply for the preform and/or the anti-resonant hollow-core fiber and/or the method, and in each case vice versa.

The properties and features disclosed in the description can be significant for various embodiments of the claimed invention, both separately and in any combination with one another. The properties and features disclosed for the anti-resonance element preform or the preform or the anti-resonant hollow-core fiber are also disclosed for the method and vice versa.

The invention will be illustrated further below in an exemplary manner by means of figures. The invention is not limited to the figures.

FIGURES

Figure 3:
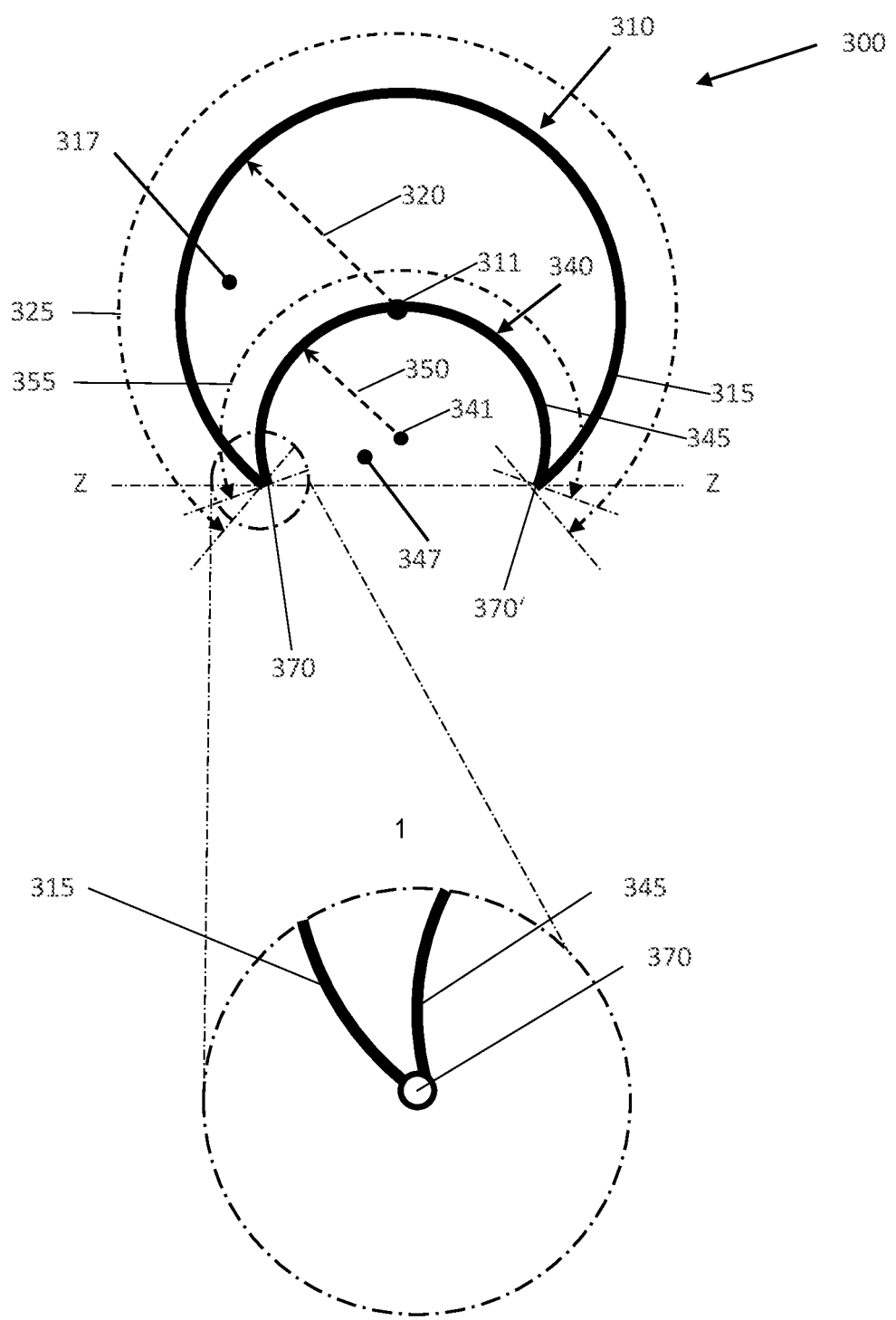
Figure 14:
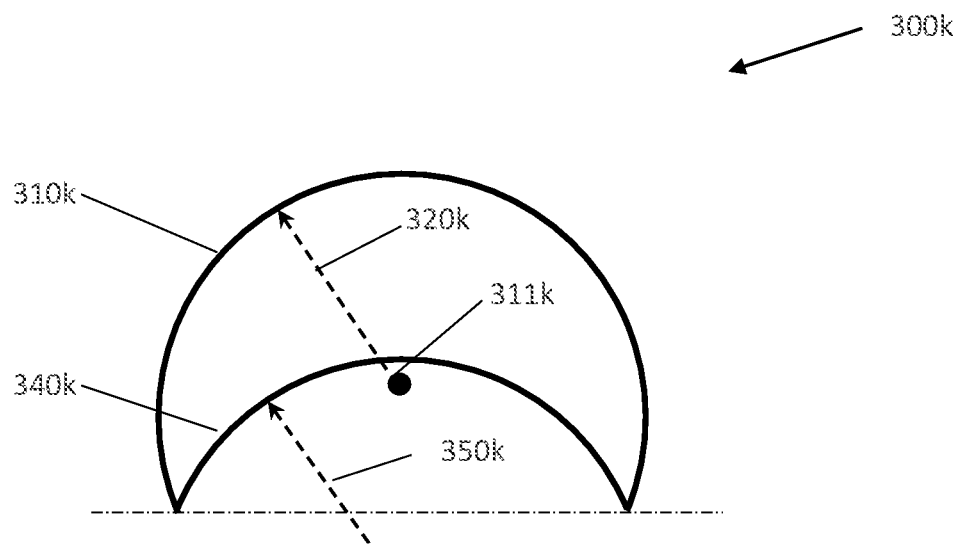
Figure 15:
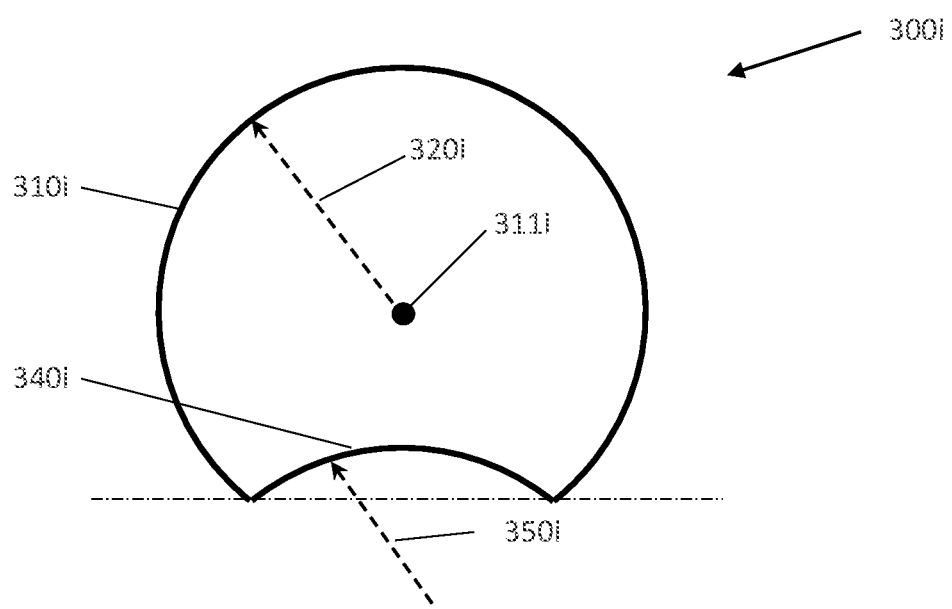
Figure 16:
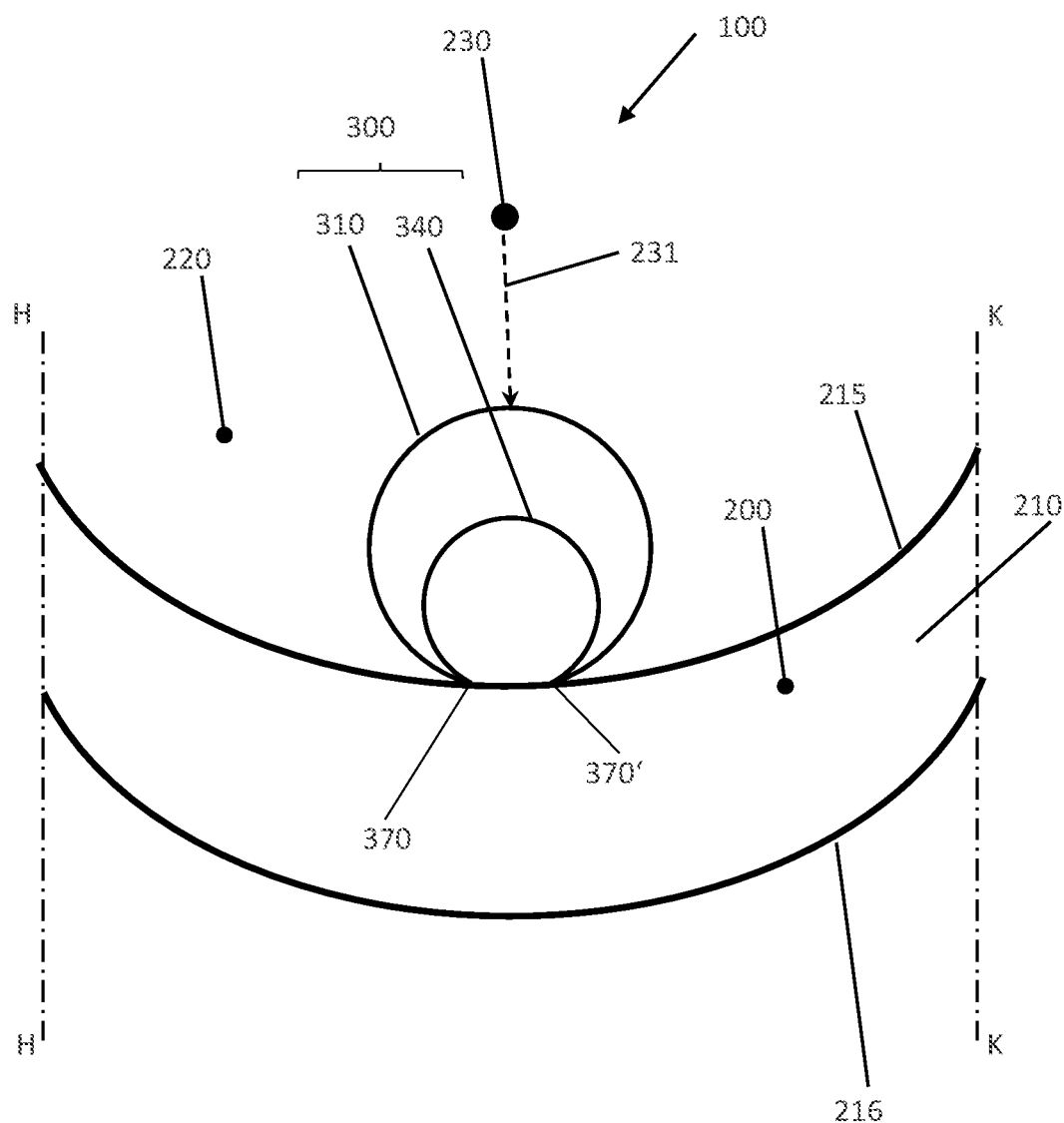
Figure 17:
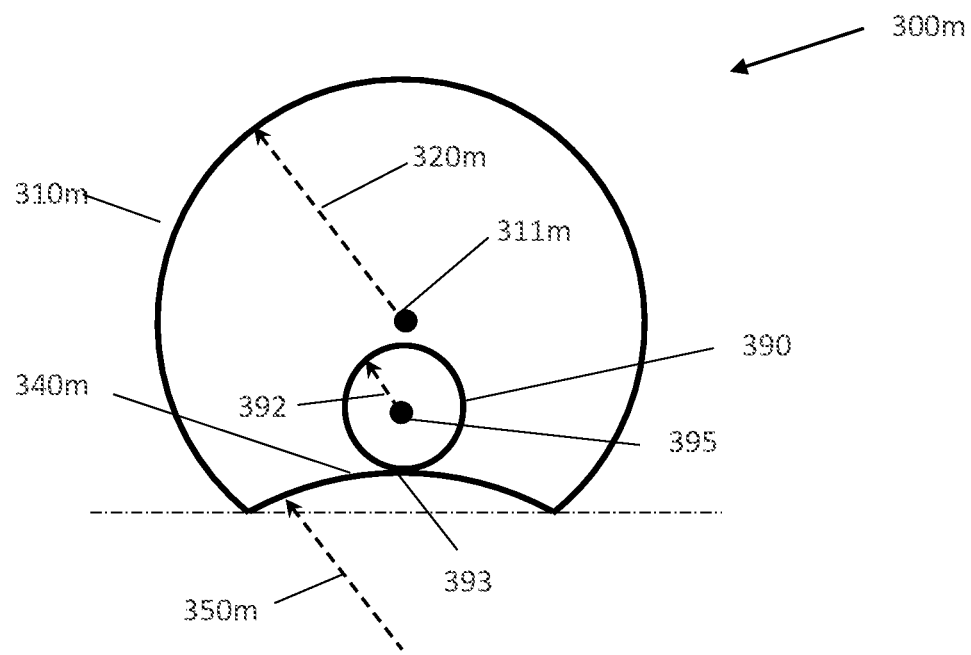
Figure 18:
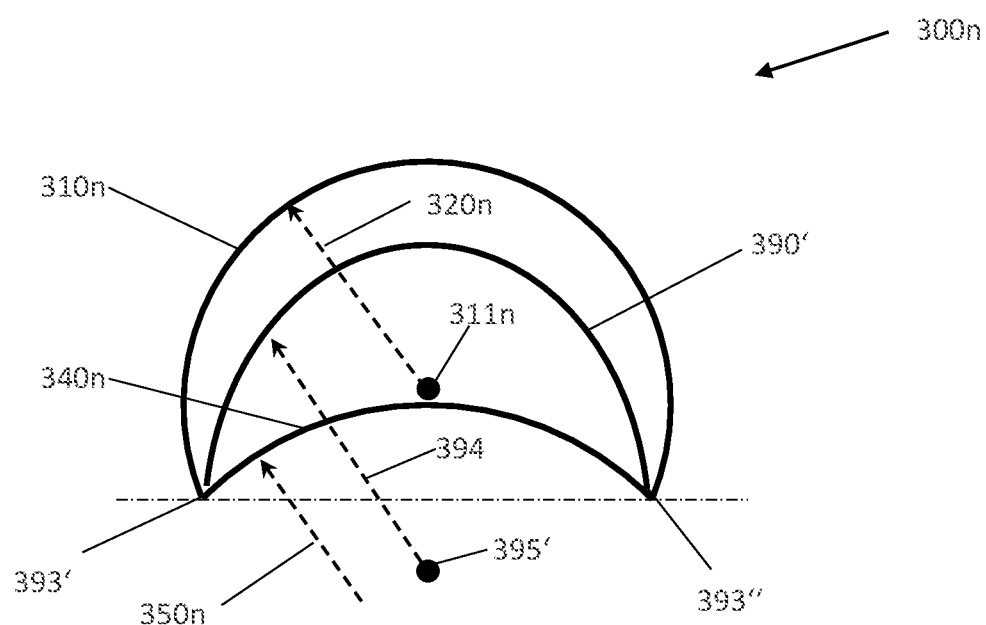
Figure 19:
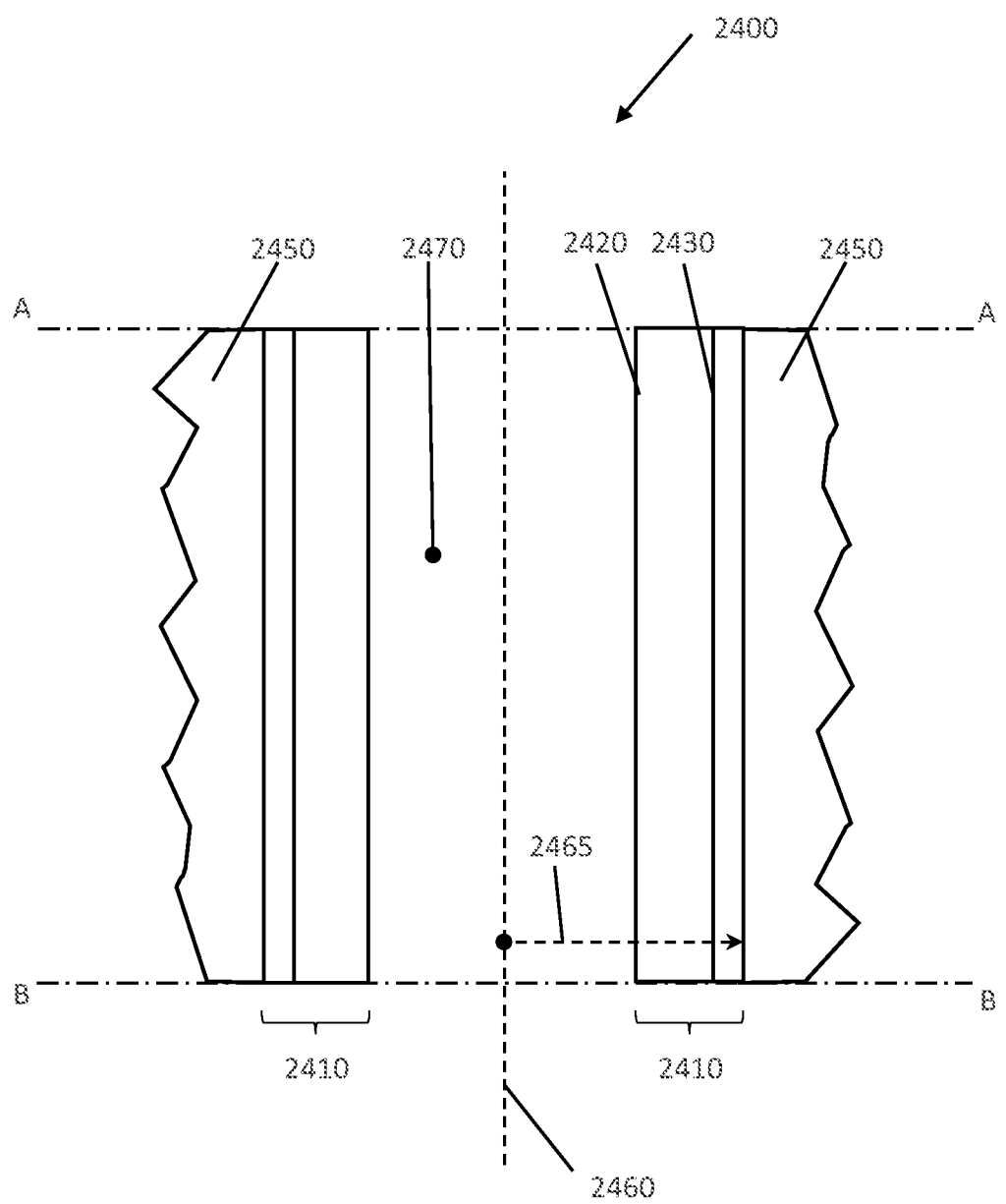
Figure 20:
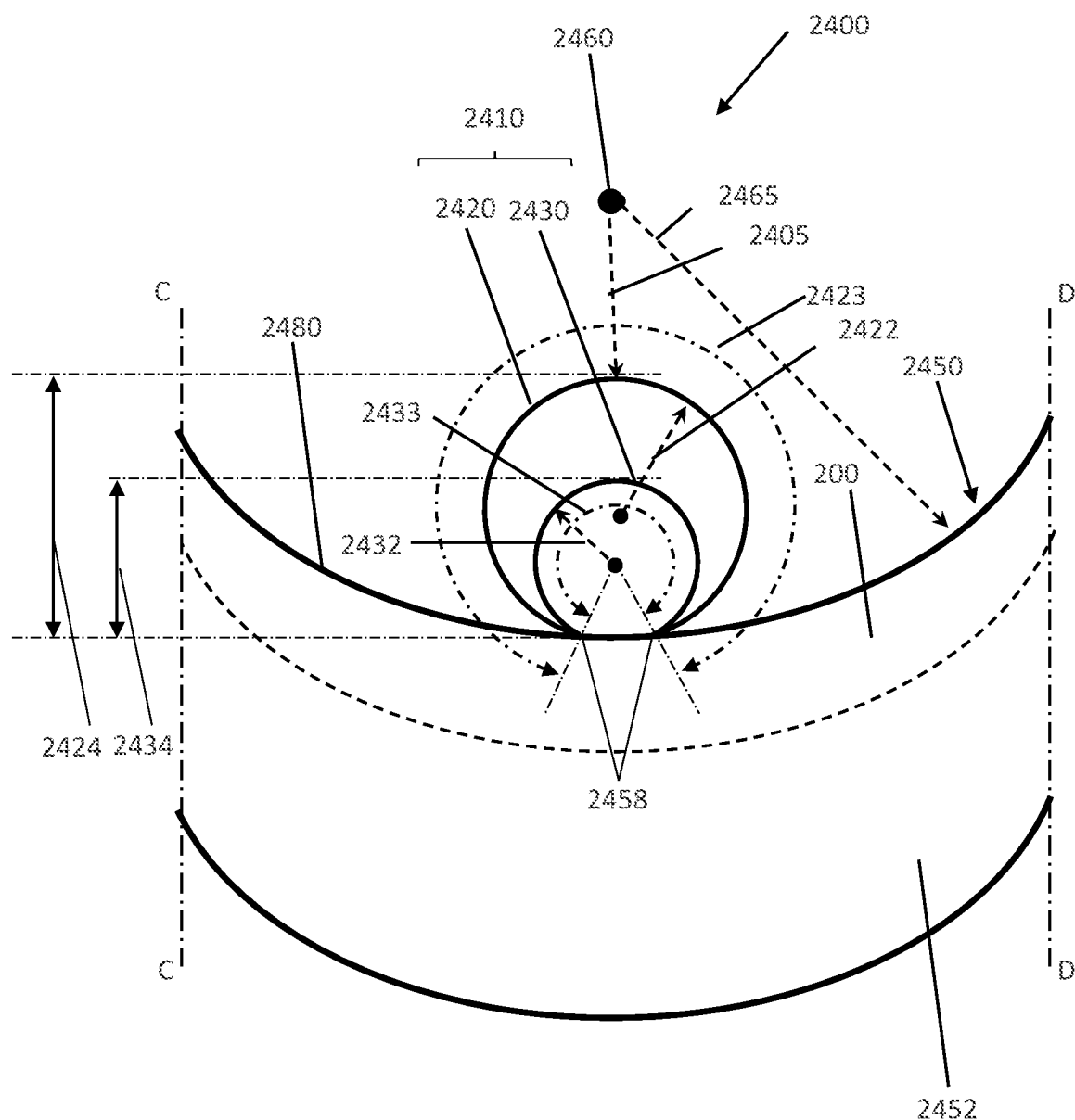
Figure 21:
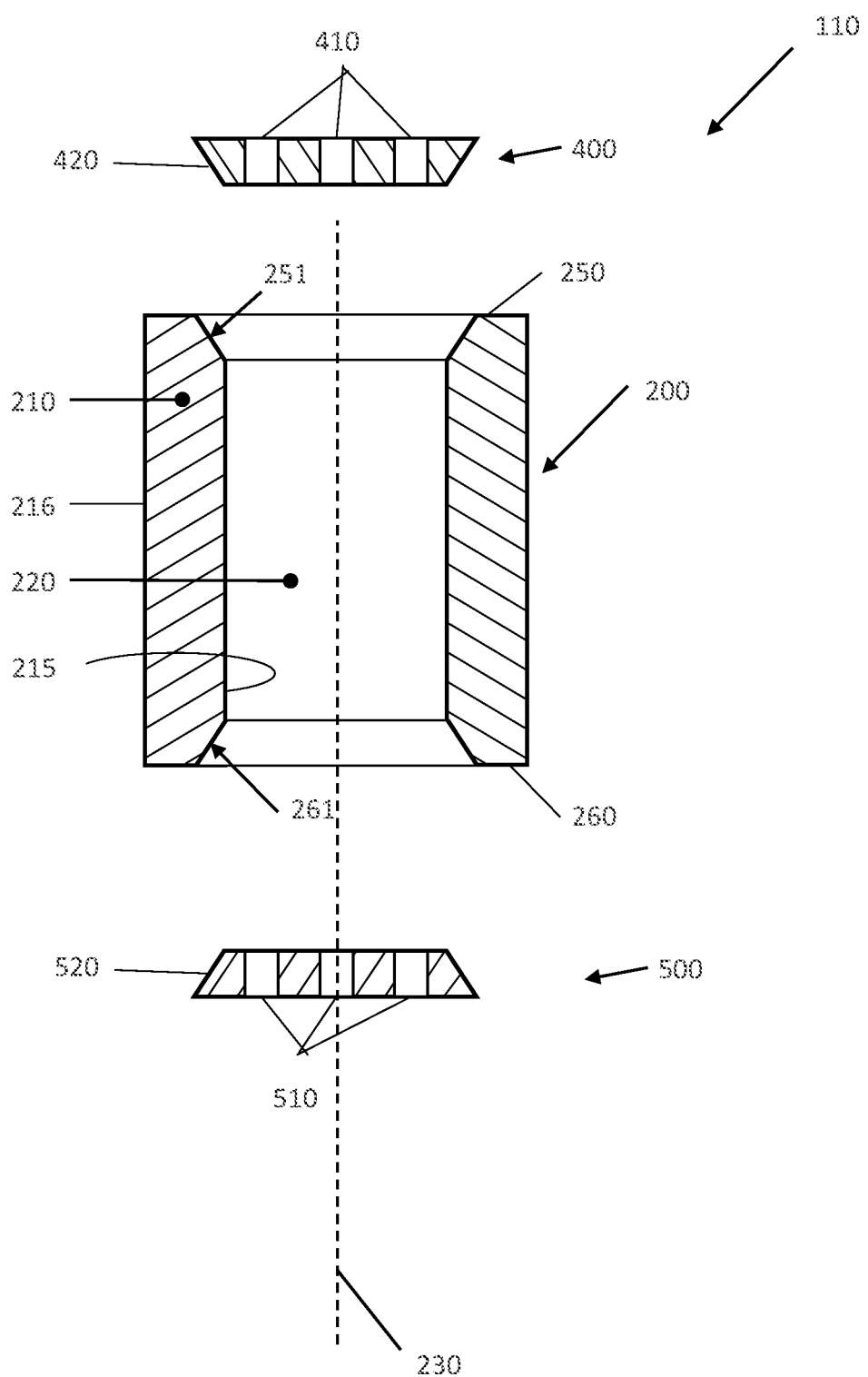
Figure 22:
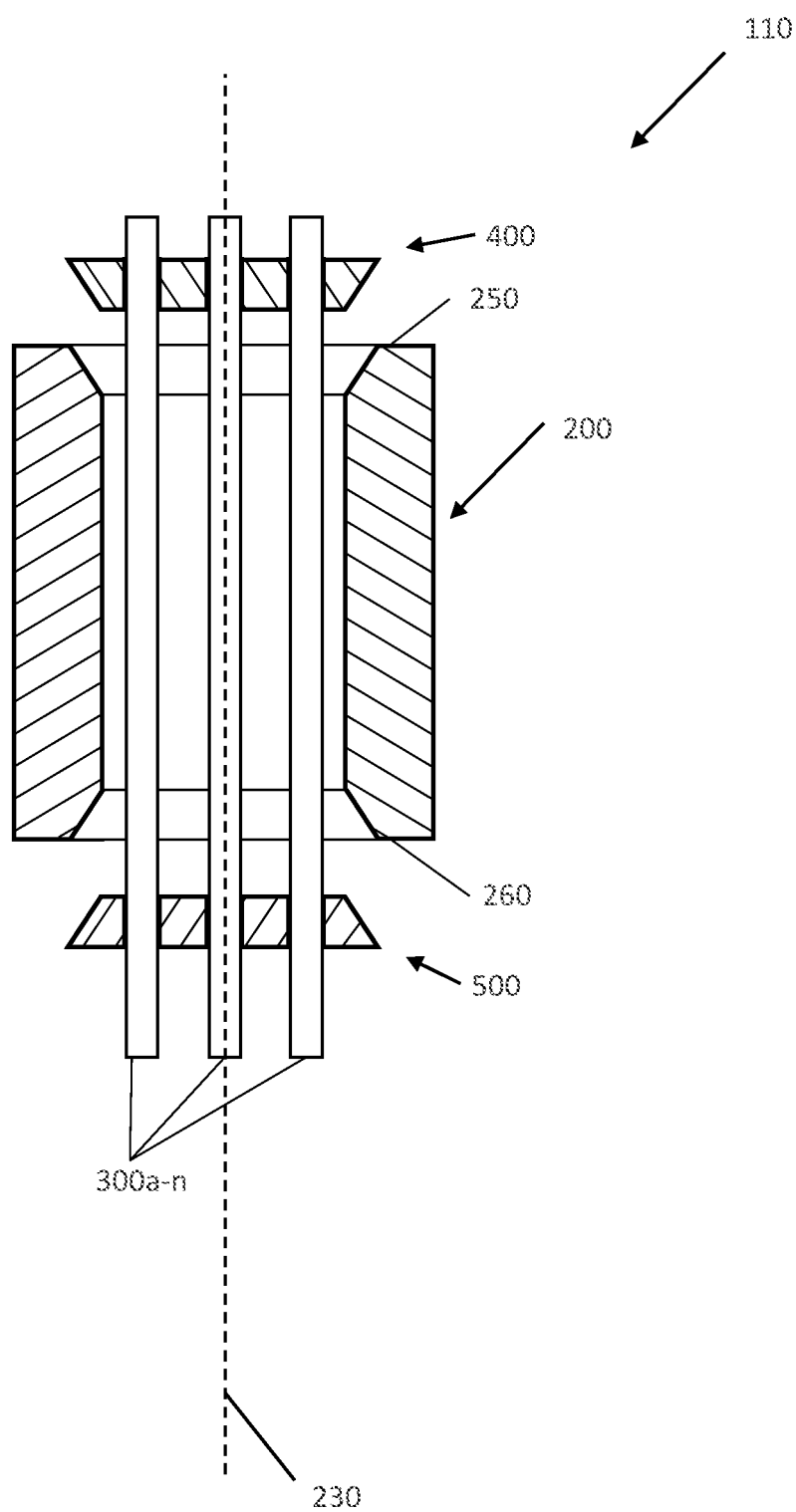
Figure 23:
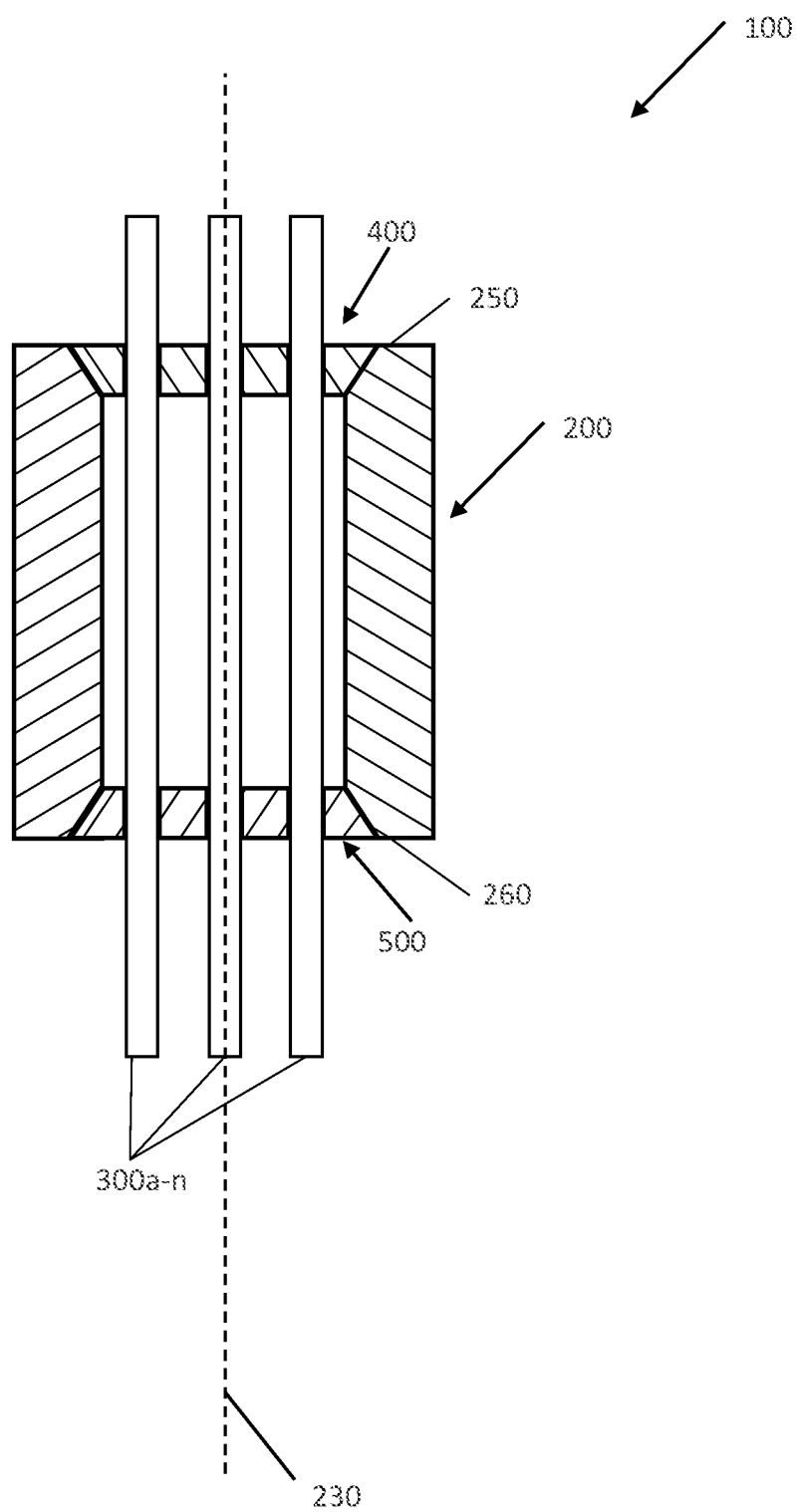

FIG. 3 shows an anti-resonance element preform as well as a section enlargement of a connecting line, FIG. 4-15 show various embodiments of an anti-resonance element preform, FIG. 16 shows a cross section through a preform for producing an anti-resonant hollow-core fiber, FIG. 17 shows a further embodiment of an anti-resonance element preform, FIG. 18 shows a further embodiment of an anti-resonance element preform, FIG. 19 shows a longitudinal section through an anti-resonant hollow-core fiber, FIG. 20 shows a cross section through the anti-resonant hollow-core fiber according to FIG. 19, FIG. 21 shows a longitudinal section through a cladding tube, FIG. 22 shows a longitudinal section through elements of a further embodiment of a preform, FIG. 23 shows a longitudinal section through a preform having the elements from

Figure 24:
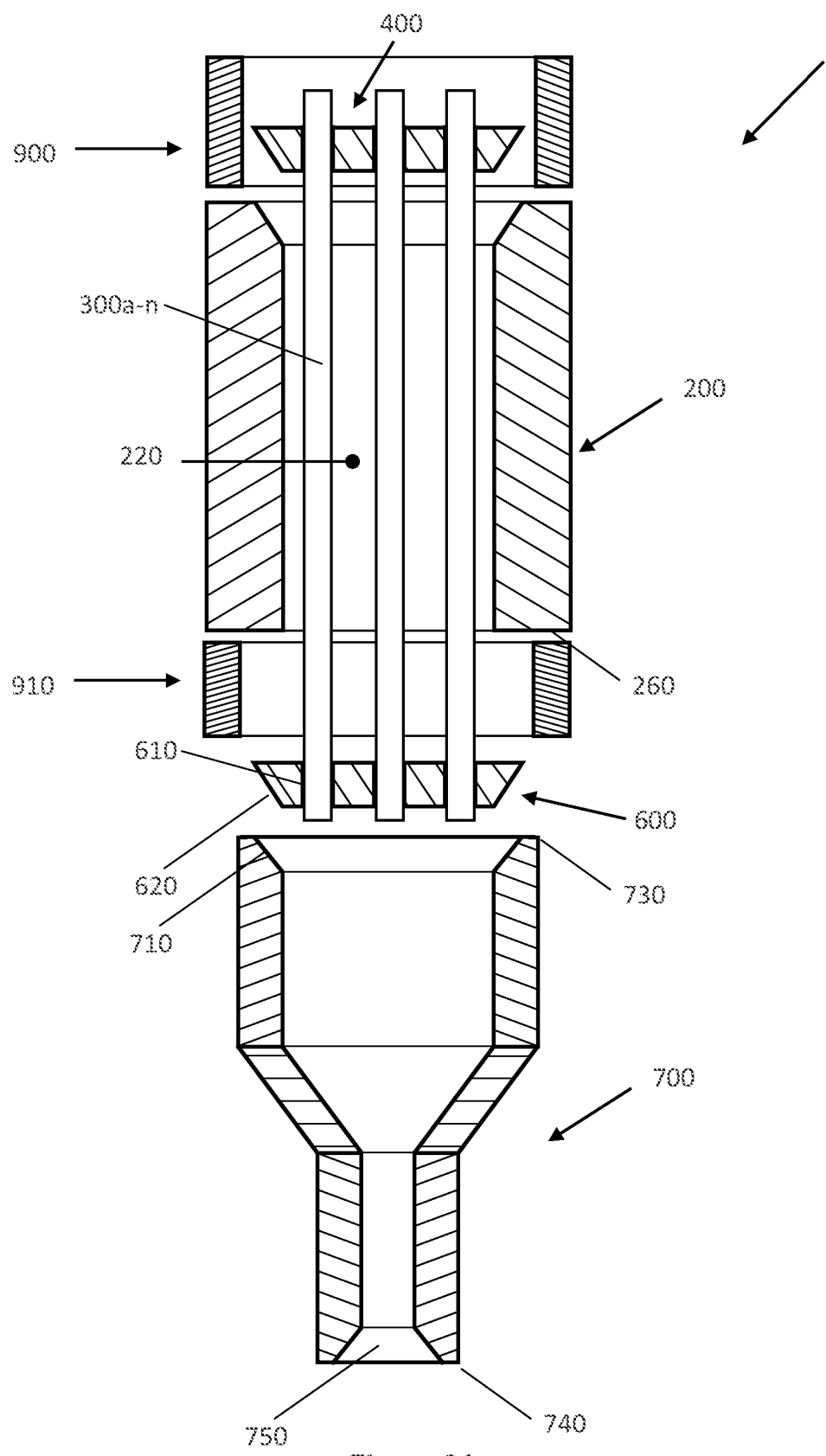
Figure 25:
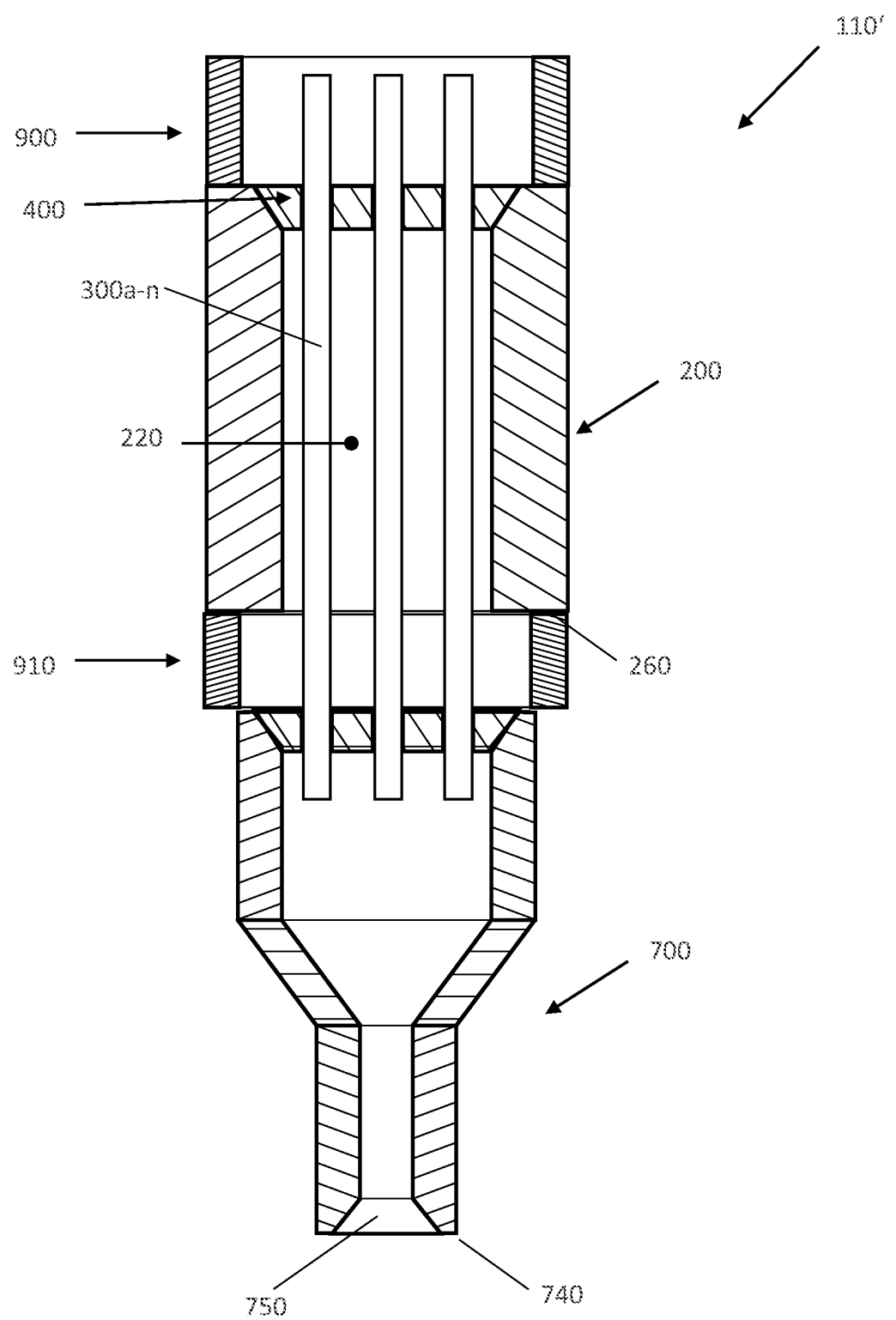
Figure 26:
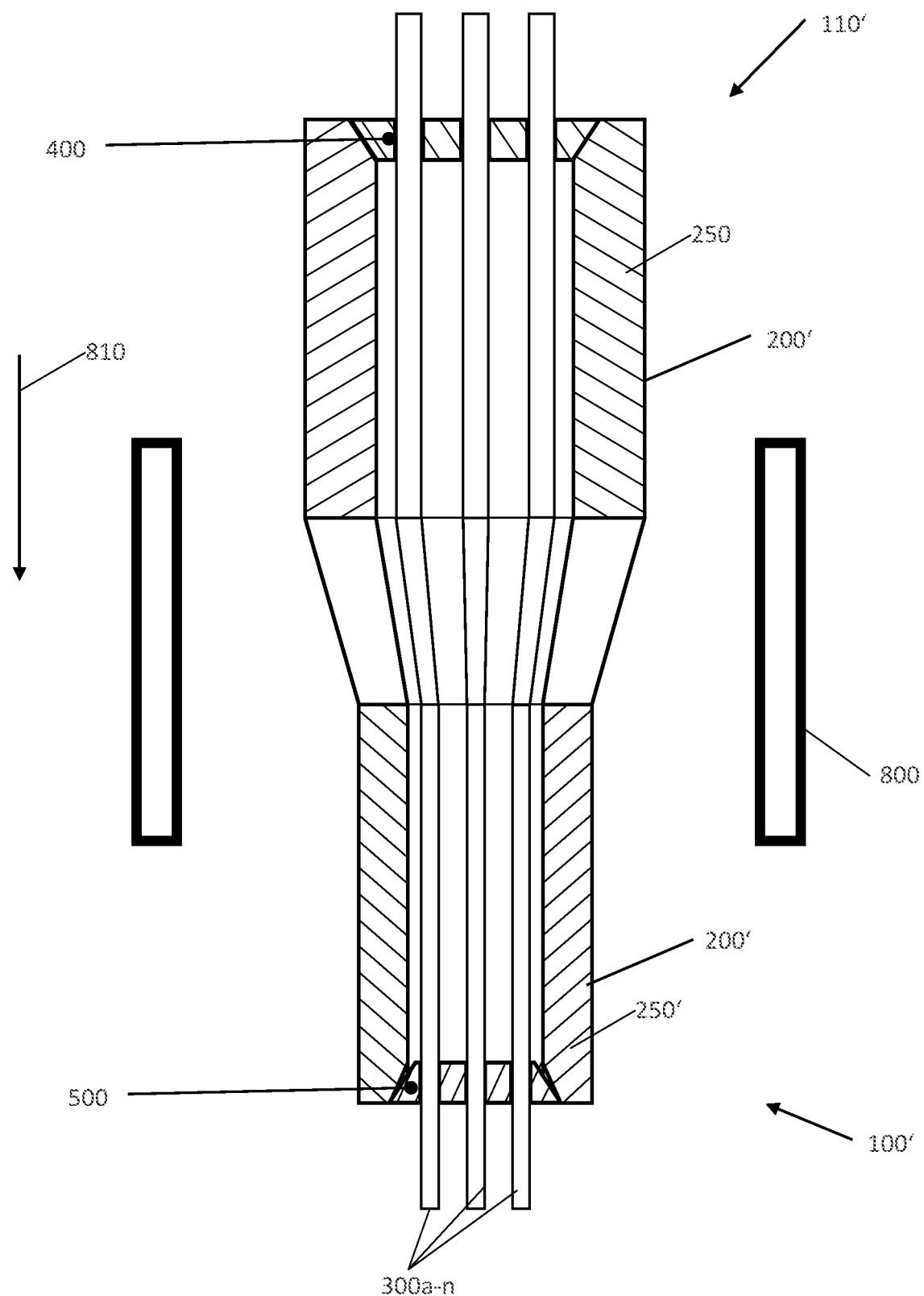
Figure 27:
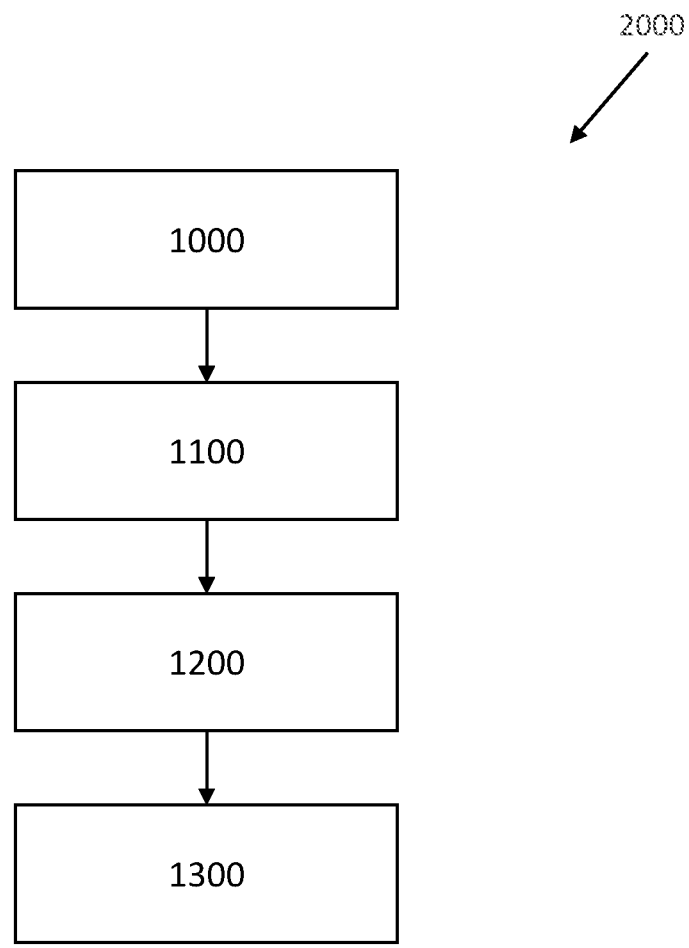
Figure 28:
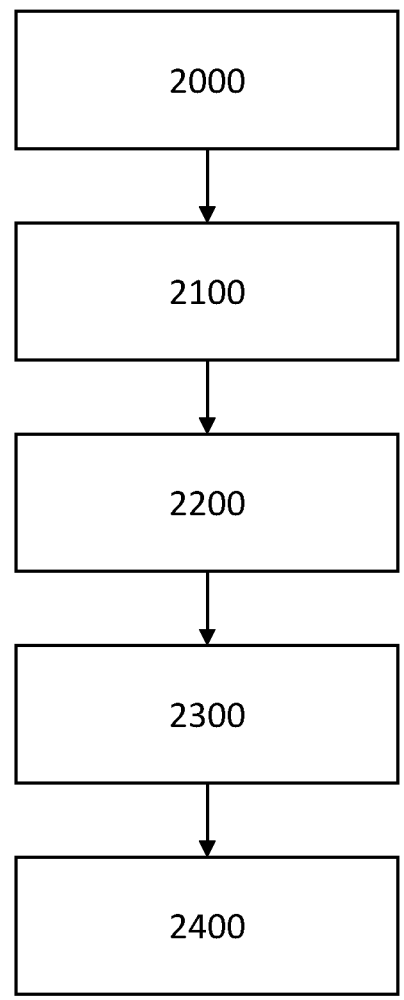

FIG. 22,

FIG. 24 shows a longitudinal section through elements of a further embodiment of a preform, FIG. 25 shows a longitudinal section through a preform having the elements from FIG. 24, FIG. 26 shows an elongating of an assembly into a preform, FIG. 27 shows method steps for producing a preform, FIG. 28 shows method steps for producing an anti-resonant hollow-core fiber, and FIG. 29 shows a diagram with the confinement loss of the base mode, plotted over a bow ratio, and FIG. 30 shows a diagram with the effective mode index, plotted over a ratio z/R.

Figure 1:
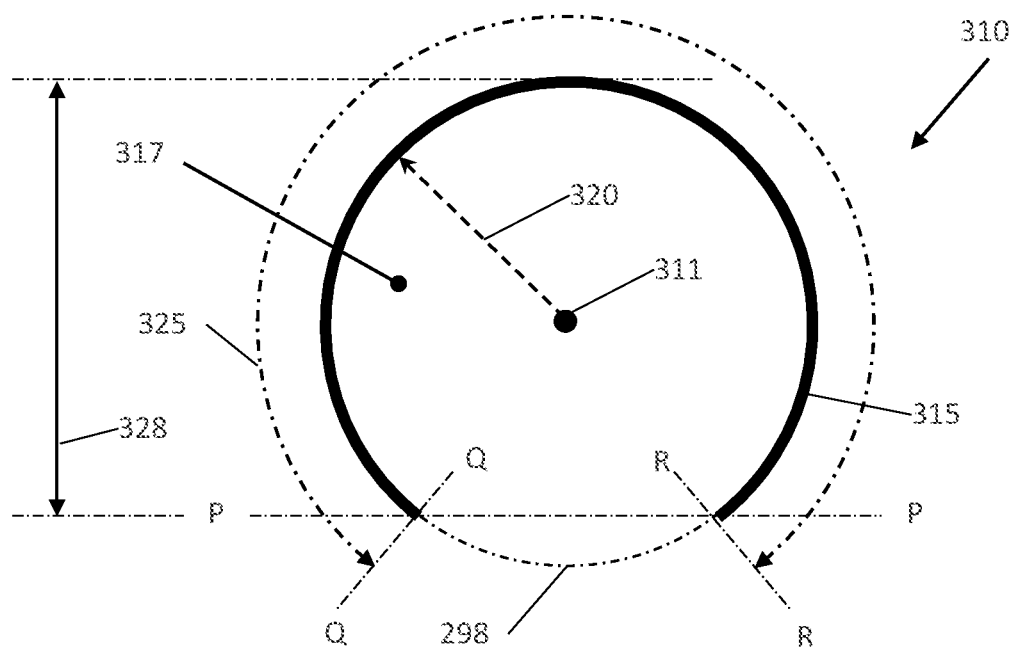
FIG. 1 shows an ARE outer element designed in a circular arc-like manner.

FIG. 1 shows a cross section through an ARE outer element 310. The ARE outer element 310 is a tubular structure, which has a circular arc-like cross section. The ARE outer element 310 extends along a first longitudinal axis 311. In FIG. 1, the ARE outer element 310 thus extends into the drawing plane.

The ARE outer element 310 has an ARE outer wall 315, which comprises a material or consists thereof, which is transparent for a work light of the optical fiber, for example glass, in particular doped or undoped quartz glass (SiO2). In an embodiment, the ARE outer wall 315 has a wall thickness in the range of 0.1 mm to 2 mm, preferably 0.2 mm to 1.5 mm. In an embodiment, the ARE outer element 310 has a length of at least 1 m, in particular a length of 0.2 to 10 m, in particular a length of 1 to 5 m.

The cross section shown in FIG. 1 clarifies that the ARE outer element 310 has a circular arc-like cross section. In the context of the invention, the term "circular arc" is understood to be a partial piece of a circumference. Two points on a circle divide the circumference into two circular arcs. In the framework of this invention, an element is described as "circular arc-like" when its outer shape follows the course of one of the said two circular arcs.

For clarification purposes, a first circle 298 is drawn in FIG. 1. This first circle 298 is divided into two circular arcs by the two sectional lines Q-Q and R-R. The cross section of the ARE outer element 310 follows one of the two circular arcs.

A sectional line P-P is further drawn, which runs through the two points of intersection of the two sectional lines Q-Q and R-R with the first circle 298. That distance, which lies on the sectional line P-P and is limited by the sectional lines Q-Q and R-R, is referred to as first chord of the ARE outer element 310. The length of the first chord is referred to as first chord length.

The ARE outer element 310 has a first circle radius R_outer 320. This first circle radius R_outer 320 describes the distance of the ARE outer wall 315 to the first longitudinal axis 311.

The ARE outer element 310 has a first segment height 328. This first segment height 328 describes the length of a straight line, which is perpendicular to the first chord and runs to the apex of the ARE outer wall 315.

The ARE outer element 310 has a first center angle α_outer 325. This first center angle α_outer 325 describes the angle, whose apex lies in the center of the first circle 298 and whose arms intersect with the limit points of the circular arc (here the points of intersection of the first circle 298 with the sectional lines Q-Q and R-R). A full circle has a number of degrees of 360°. Due to the fact that the ARE outer element 310 is designed in a circular arc-like manner, the first center angle α_outer 325 is smaller than 3600.

The ARE outer element 310 has an inner space 317, which is limited by the ARE outer wall 315 and the first chord.

Figure 2:
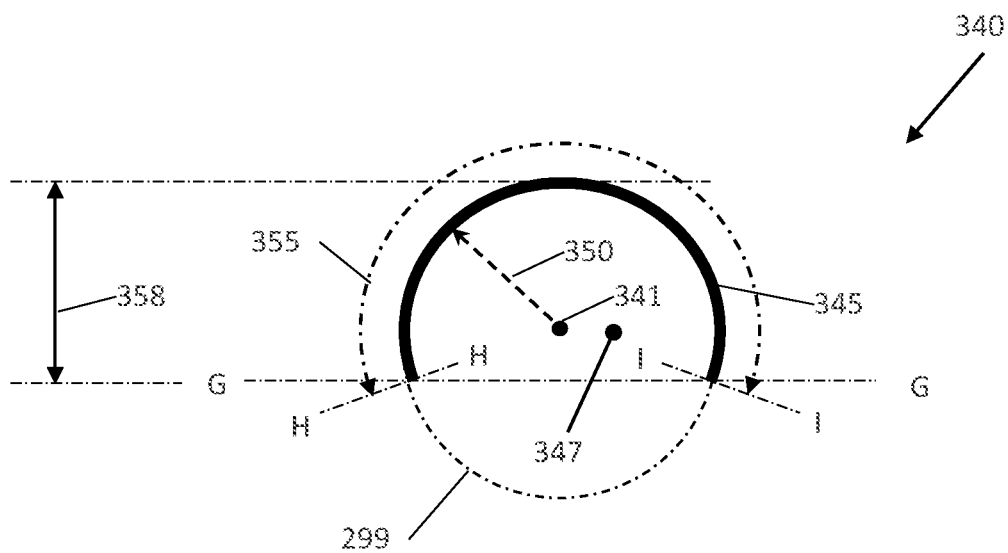
FIG. 2 shows an ARE inner element designed in a circular arc-like manner.

FIG. 2 shows a cross section through an ARE inner element 340. The ARE inner element 340 is a tubular structure, which has a circular arc-like cross section. The ARE inner element 340 extends along a second longitudinal axis 341. Thus in FIG. 2, the ARE inner element 340 extends into the drawing plane.

The ARE inner element 340 has a wall 345 comprising a material or consisting thereof, which is transparent for a work light of the optical fiber, for example glass, in particular doped or undoped quartz glass (SiO2). In an embodiment, the wall 345 has a wall thickness in the range of 0.1 mm to 2 mm, preferably 0.2 mm to 1.5 mm. In an embodiment, the ARE outer element 310 in particular has a length of at least 1 m, in particular a length of 0.2 to 10 m, in particular a length of 1 to 5 m.

The ARE inner element 340 has a circular arc-like cross section. For clarification purposes, a second circle 299 is drawn in FIG. 2. This second circle 299 is divided into two circular arcs by means of the two sectional lines H-H and I-I. The cross section of the ARE inner element 340 follows one of the two circular arcs.

A sectional line G-G is further drawn, which runs through the two points of intersection of the two sectional lines H-H and I-I with the second circle 299. That distance, which lies on the sectional line G-G and is limited by the sectional lines H-H and I-I, is referred to a second chore of the ARE inner element 340. The length of the second chord is referred to as second chord length.

The ARE inner element 340 has a second segment height 358. This second segment height 358 describes the length of a straight line, which is perpendicular to the second chord and runs to the apex of the wall 345.

Furthermore, the ARE inner element 340 has a second circle radius R_inner 350. This second circle radius R_inner 350 describes the distance of the wall 345 to the second longitudinal axis 341.

The ARE inner element 340 has a second center angle α_inner 355. This second center angle α_inner 355 describes the angle, whose apex lies in the center of the second circle 299 and whose legs intersect the limiting points of the circular arc (here the points of intersection of the second circle 299 with the sectional lines H-H and I-I). A full circle has a number of degrees of 360°. Due to the fact that the ARE inner element 340 is designed in a circular arc-like manner, the second center angle α_inner 355 is smaller than 360°.

The ARE inner element 340 has an inner space 347, which is limited by the wall 345 and the second chord.

FIGS. 1 and 2 show a cross section, thus an axial top view onto the ARE outer element 310 and the ARE inner element 340. In the illustrated two-dimensional view onto the respective longitudinal axes 311 and 341, the ARE outer element 310 as well as the ARE inner element 340 have a circular arc-like cross section, which corresponds to a tubular structural element in a three-dimensional view.

The respective circular arc of the ARE outer element 310 and/or of the ARE inner element 340 are designed to be essentially circular, wherein in particular the first circle radius R_outer 320 and/or the second circle radius R_inner 350 at a first point do not deviate by more than 5%, preferably by no more than 3%, more preferably by no more than 1%, most preferably by no more than 0.5%, from the first circle radius R_outer 320 and/or the second circle radius R_inner 350 at a further point.

In the context of the invention, the statement that two lengths—such as, for instance, the first circle radius R_outer 320 and the second circle radius R_inner 350—are of identical length is understood in the sense that the said lengths are identical within the manufacturing-related tolerances, in particular that the said lengths differ by less than 1.5%, in particular by less than 1.0%, in particular by less than 0.5% in length.

FIG. 3 shows an anti-resonance element preform 300, comprising the ARE outer element 310 designed in a circular arc-like manner, and the ARE inner element 340 designed in a circular arc-like manner, as illustrated in FIGS. 1 and 2.

The ARE outer element 310 designed in a circular arc-like manner and the ARE inner element 340 designed in a circular arc-like manner are connected to one another along two connecting lines 370, 370', which are arranged essentially in parallel to the first longitudinal axis 311. This bond can take place in particular by means of a hot process.

For clarification purposes, a part of the anti-resonance element preform 300 is illustrated in FIG. 3 in an enlarged form around the connecting line 370. The bond occurs between
- a first end point of the ARE outer wall 315 of the ARE outer element 310, which follows from the point of intersection of the first circle 298 with the sectional lines Q-Q and R-R, and
- a second end point of the wall 345 of the ARE inner element 340, which follows from the point of intersection of the second circle 299 with the sectional lines H-H and I-I.

Due to the fact that a cross section is illustrated in FIG. 3, the two connecting lines 370, 370' in the three-dimensional anti-resonance element preform 300 run into the drawing plane.

As it is also clarified by FIG. 1, the ARE outer element 310 has an inner space 317, which is at least partially limited by the ARE outer wall 315. Analogously, the ARE inner element 340 has an inner space 347 that is at least partially limited by the wall 345, which is shown in FIG. 2. It is provided that the ARE inner element 340, which is designed in a circular arc-like manner, protrudes at least partially into the inner space 317. In the context of the invention, this is understood in such a way that—in the cross section—the ARE inner element 340 runs essentially above the first chord of the ARE outer element 310. In particular, the deviations from this positioning of the ARE inner element 340 are limited by the manufacturing-related expansions of the two connecting lines 370, 370', which can protrude from the inner space 317. In the cross section, in particular no more than 5%, in particular no more than 2.5%, in particular no more than 1%, of the second center angle $\alpha\_inner$ 355 of the ARE inner element 340 can protrude from the inner space 317.

The anti-resonance element preform 300 illustrated in FIG. 3 can be produced separately from further components for producing an anti-resonant hollow-core fiber.

The precision of the anti-resonance element preform 300 prior to an installation into a preform can thus be examined in order to ensure that only flawless anti-resonance element preforms 300 are used. According to the invention, the illustrated anti-resonance element preform 300 is characterized in that:
- ARE outer element 310 as well as ARE inner element 340 of the anti-resonant hollow-core fiber have a negative curvature, which has a positive impact on the attenuation, and
- virtually any combinations for the radii of the ARE inner element 340 and of the ARE outer element 310 can be used due to the option according to the invention.

FIGS. 4 to 15 show various embodiments of an anti-resonance element preform. The embodiment according to FIGS. 4 to 15 largely corresponds to the embodiment, which is described above and is illustrated in FIGS. 1 to 3, so that reference is made to the above description in order to avoid repetitions. A structure, which is repeated from the description of FIGS. 1 to 3, has the same reference numeral. Modifications of a structure compared to the structure shown in FIGS. 1 to 3 have the same reference numeral with an additional letter.

FIGS. 4 to 8 show various embodiments of an anti-resonance element preform, in which case the first circle radius R_outer of the ARE outer element is larger than the second circle radius R_inner of the ARE inner element.

Figure 4:
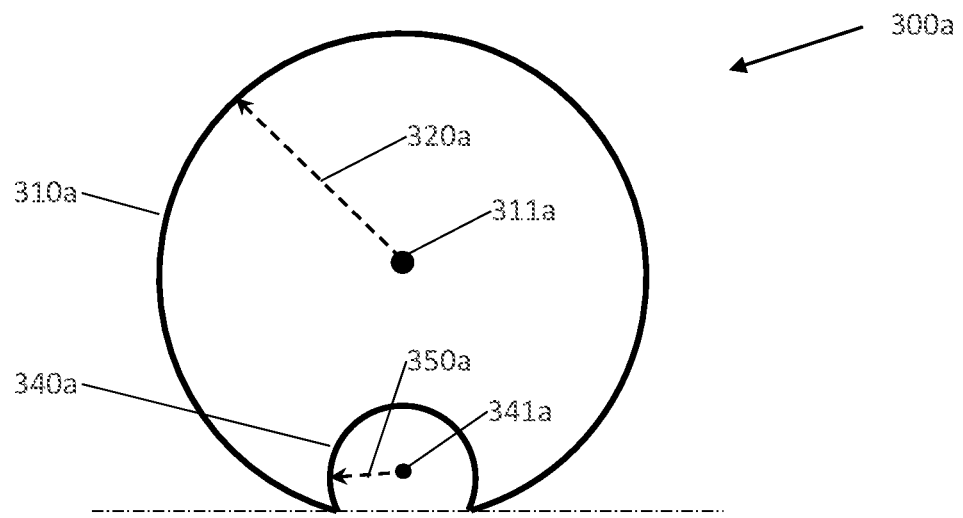

FIG. 4 shows an embodiment of an anti-resonance element preform 300a, in which case the first circle radius R_outer 320a of the ARE outer element 310a is larger than the second circle radius R_inner 350a of the ARE inner element 340a, wherein
- the first circle radius R_outer 320a is larger than 2 mm and smaller than 10 mm,
- the second circle radius R_inner 350a is larger than 1 mm and smaller than 6 mm,
- the first center angle $\alpha\_outer$ is larger than 295° and smaller than 350°; and
- the second center angle $\alpha\_inner$ is larger than 210° and smaller than 260°.

An anti-resonance element preform 300a designed in this way can have at least one of the following features:
- the second longitudinal axis 341a lies above the first chord,
- the first longitudinal axis 311a runs outside of the ARE inner element 340a,
- the angle between the ARE outer wall 315 and the wall 345 is obtuse, in particular within [60°; 130°], in particular within [70°; 120°], and
- the ratio of the first segment height to the second segment height is between 3 and 6.

Figure 5:
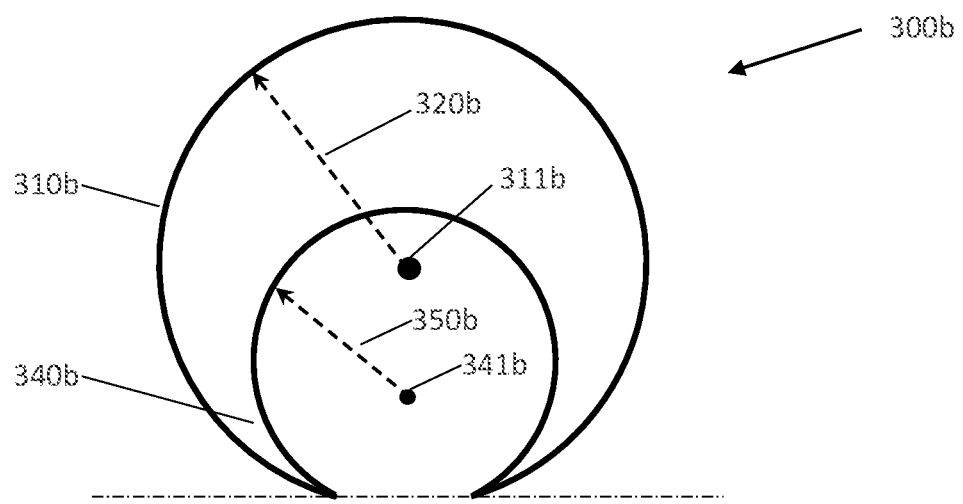

FIG. 5 shows an embodiment of an anti-resonance element preform 300b, in which case the first circle radius R_outer 320b of the ARE outer element 310b is larger than the second circle radius R_inner 350b of the ARE inner element 340b, wherein
- the first circle radius R_outer is larger than 1 mm and smaller than 11 mm,
- the second circle radius R_inner is larger than 5 mm and smaller than 9 mm,
- the first center angle $\alpha\_outer$ is larger than 315° and smaller than 350°; and
- the second center angle $\alpha\_inner$ is larger than 280° and smaller than 315°.

An anti-resonance element preform 300b designed in this way can have at least one of the following features:
- the second longitudinal axis 341b lies above the first chord,
- the first longitudinal axis 311b runs inside the ARE inner element 340b,
- the angle between the ARE outer wall 315 and the wall 345 is within [5°; 40°], in particular within [10°; 30°], and
- the ratio of the first segment height to the second segment height is between 1 and 3.

Figure 6:
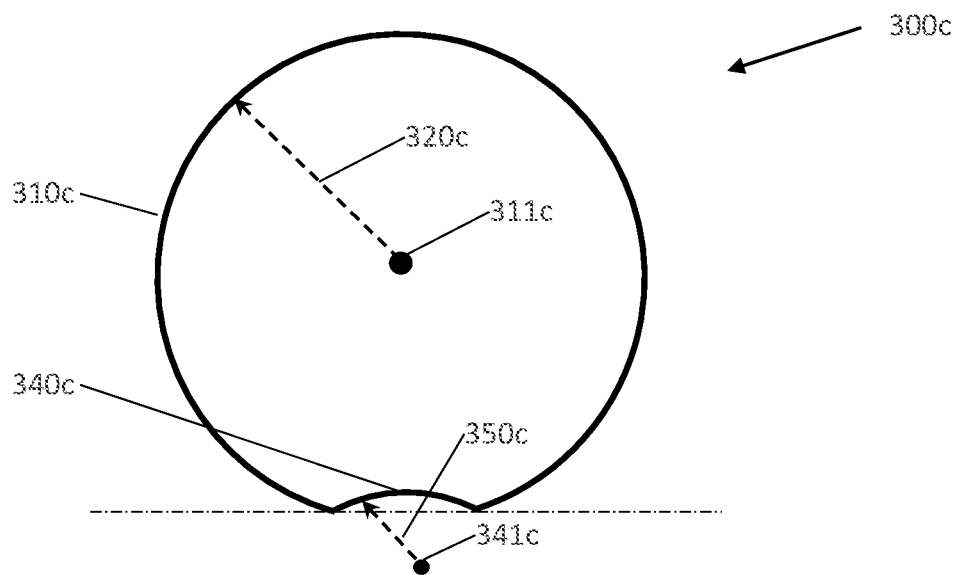

FIG. 6 shows an embodiment of an anti-resonance element preform 300c, in which case the first circle radius R_outer 320c of the ARE outer element 310c is larger than the second circle radius R_inner 350c of the ARE inner element 340c. Some of the geometric values are thereby analogous to those from FIG. 5:

the first circle radius R_outer is larger than 2 mm and smaller than 10 mm, the second circle radius R_inner is larger than 5 mm and smaller than 9 mm, and the first center angle α_outer is larger than 315° and smaller than 350°.

However, here only a small part of the ARE inner element 340c lies inside the ARE outer element 310c, so that the second center angle α_inner is larger than 49° and smaller than 65°.

An anti-resonance element preform 300c designed in this way can have at least one of the following features:

the second longitudinal axis 341c lies above the first chord, the first longitudinal axis 311c runs outside of the ARE inner element 340c, the angle between the ARE outer wall 315 and the wall 345 is within [120°; 170°], in particular within [130°; 150°], and the ratio of the first segment height to the second segment height is between 20 and 30.

Figure 7:
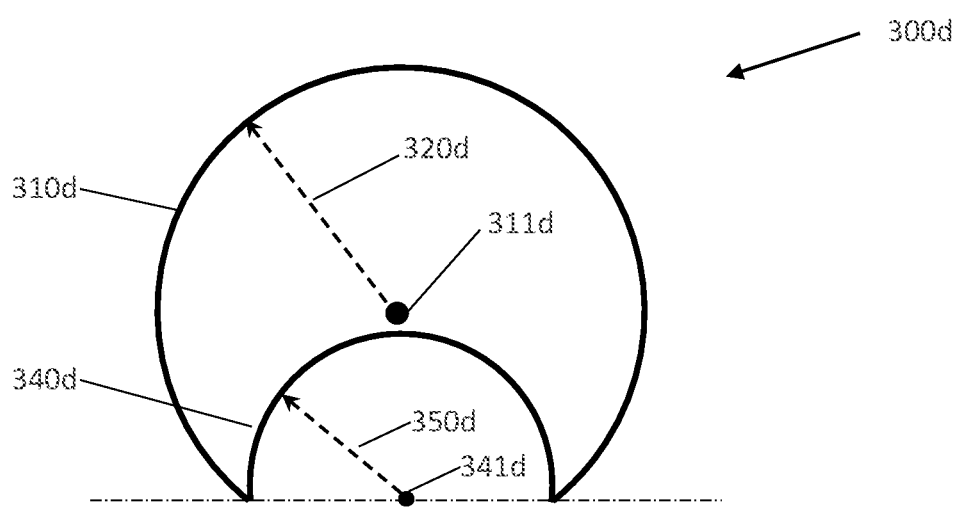

FIG. 7 shows an embodiment of an anti-resonance element preform 300d, in which case the first circle radius R_outer 320d of the ARE outer element 310d is larger than the second circle radius R_inner 350d of the ARE inner element 340d, wherein the first circle radius R_outer is larger than 2 mm and smaller than 10 mm, the second circle radius R_inner is larger than 7 mm and smaller than 12 mm, the first center angle α_outer is larger than 270° and smaller than 310°, and the second center angle α_inner is larger than 200° and smaller than 250°.

An anti-resonance element preform 300d designed in this way can have at least one of the following features:

the second longitudinal axis 341d lies above the first chord, the first longitudinal axis 311d runs outside of the ARE inner element 340d, the angle between the ARE outer wall 315 and the wall 345 is within [35°; 100°], in particular within [45°; 90°], and the ratio of the first segment height to the second segment height is between 1 and 3.

Figure 8:
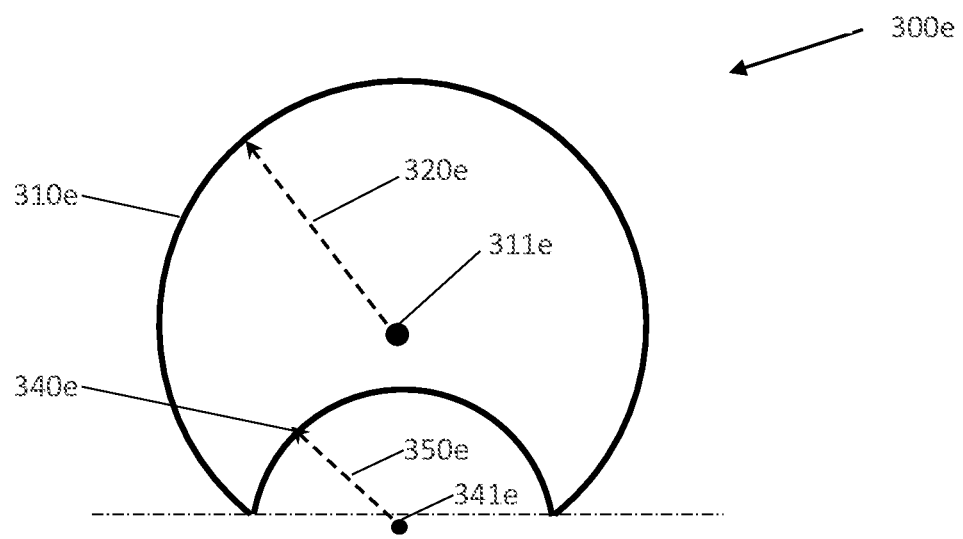

FIG. 8 shows an embodiment of an anti-resonance element preform 300e, in which case the first circle radius R_outer 320e of the ARE outer element 310e is larger than the second circle radius R_inner 350e of the ARE inner element 340e. Some of the geometric values are thereby analogous to those from FIG. 7:

the first circle radius R_outer is smaller than 10 mm and larger than 2 mm, the second circle radius R_inner is smaller than 12 mm and larger than 7 mm, and the first center angle α_outer is smaller than 310° and larger than 270°.

However, here only a small part of the ARE inner element 340e lies inside the ARE outer element 310e, so that the second center angle α_inner is larger than 120° and smaller than 150°.

An anti-resonance element preform 300e designed in this way can have at least one of the following features:

the second longitudinal axis 341e lies below the first chord, the first longitudinal axis 311e runs outside of the ARE inner element 340e, the angle between the ARE outer wall 315 and the wall 345 is within [35°; 100°], in particular within [45°; 90°], and the ratio of the first segment height to the second segment height is between 1 and 6.

FIGS. 9 to 13 show various embodiments of an anti-resonance element preform, in which case the first circle radius R_outer of the ARE outer element is smaller than the second circle radius R_inner of the ARE inner element.

Figure 9:
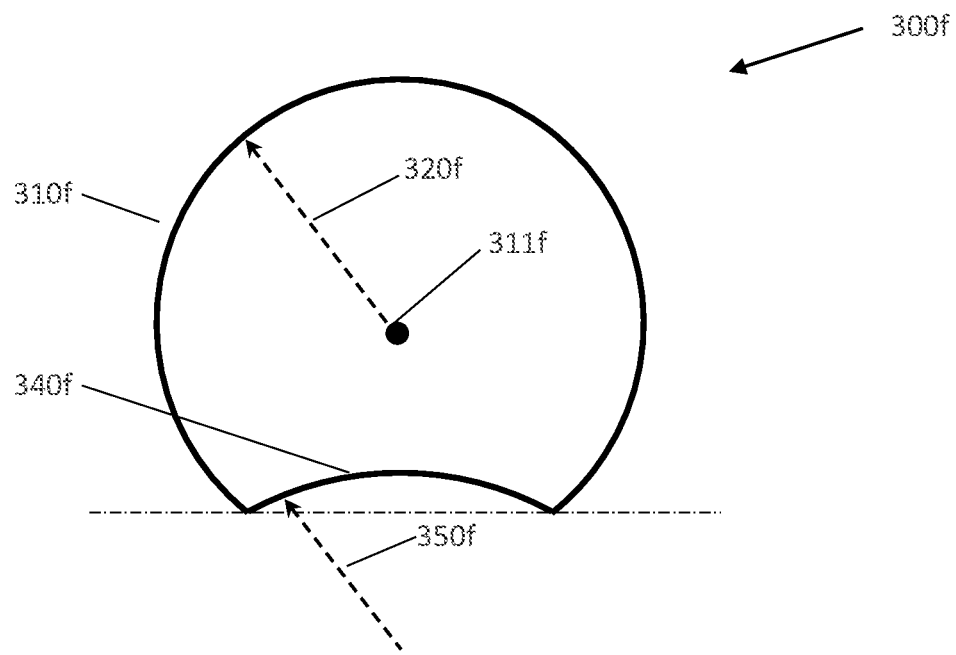

FIG. 9 shows an embodiment of an anti-resonance element preform 300f, in which case the first circle radius R_outer 320f of the ARE outer element 310f is smaller than the second circle radius R_inner 350f of the ARE inner element 340f, wherein the first circle radius R_outer is larger than 2 mm and smaller than 10 mm, the second circle radius R_inner is larger than 1 mm and smaller than 9 mm, the first center angle α_outer is larger than 270° and smaller than 330°, and the second center angle α_inner is larger than 30° and smaller than 70°.

An anti-resonance element preform 300f designed in this way can have at least one of the following features:

the second longitudinal axis 341 lies below the first chord, the first longitudinal axis 311f runs outside of the ARE inner element 340f, the angle between the ARE outer wall 315 and the wall 345 is within [35°; 100°], in particular within [45°; 90°], and the ratio of the first segment height to the second segment height is between 13 and 19.

Due to the size of the second circle radius and of the position resulting therefrom in the drawing, the second longitudinal axis 341 is not drawn in FIG. 9.

Figure 10:
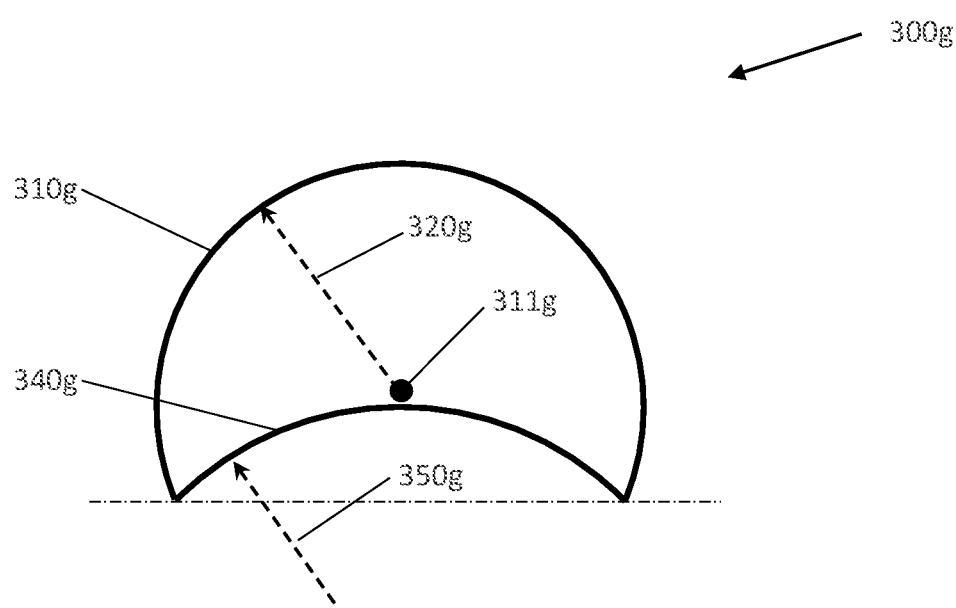

FIG. 10 shows an embodiment of an anti-resonance element preform 300g, in which case the first circle radius R_outer 320g of the ARE outer element 310g is smaller than the second circle radius R_inner 350g of the ARE inner element 340g, wherein the first circle radius R_outer is larger than 2 mm and smaller than 10 mm, the second circle radius R_inner is larger than 1 mm and smaller than 9 mm, the first center angle α_outer is larger than 210° and smaller than 250°, and the second center angle α_inner is larger than 90° and smaller than 115°.

An anti-resonance element preform 300g designed in this way can have at least one of the following features:

the second longitudinal axis 341 lies below the first chord, the first longitudinal axis 311g runs outside of the ARE inner element 340g, the angle between the ARE outer wall 315 and the wall 345 is within [30°; 90°], in particular within [45°; 85°], and the ratio of the first segment height to the second segment height is between 1 and 6.

Due to the size of the second circle radius and of the position resulting therefrom in the drawing, the second longitudinal axis 341 is not drawn in FIG. 10.

Figure 11:
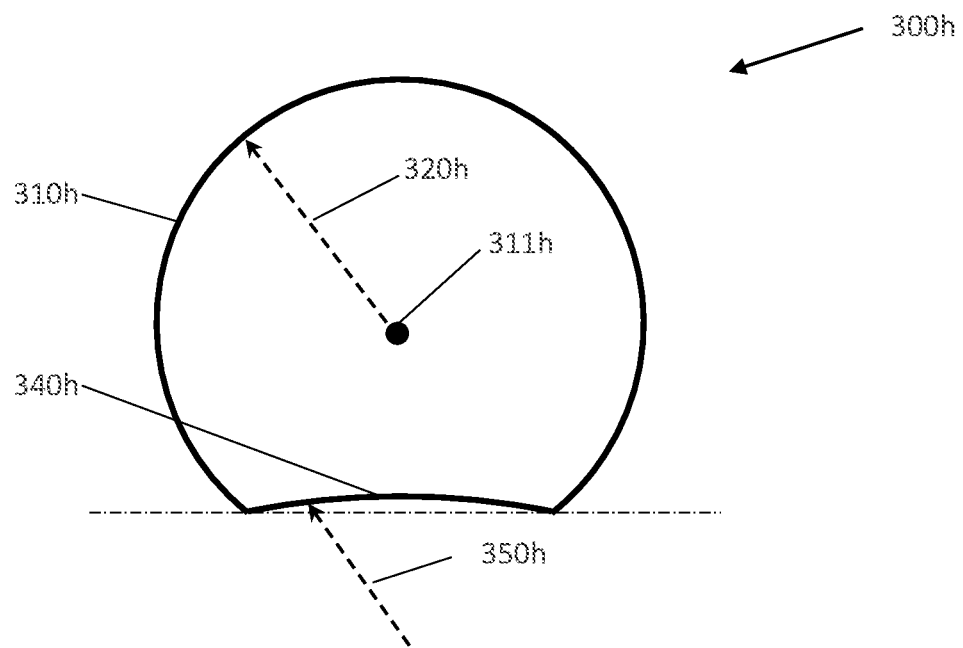

FIG. 11 shows an embodiment of an anti-resonance element preform 300h, in which case the first circle radius R_outer 320h of the ARE outer element 310h is smaller than the second circle radius R_inner 350h of the ARE inner element 340h, wherein
the first circle radius R_outer is larger than 2 mm and smaller than 10 mm,
the second circle radius R_inner is larger than 20 mm and smaller than 30 mm,
the first center angle α_outer is larger than 270° and smaller than 330°, and
the second center angle α_inner is larger than 15° and smaller than 45°.

An anti-resonance element preform 300h designed in this way can have at least one of the following features:
the second longitudinal axis 341 lies below the first chord,
the first longitudinal axis 311h runs outside of the ARE inner element 340h,
the angle between the ARE outer wall 315 and the wall 345 is within [70°; 110°], in particular within [80°; 100°], and
the ratio of the first segment height to the second segment height is between 17 and 35.

Due to the size of the second circle radius and of the position resulting therefrom in the drawing, the second longitudinal axis 341 is not drawn in FIG. 11.

Figure 12:
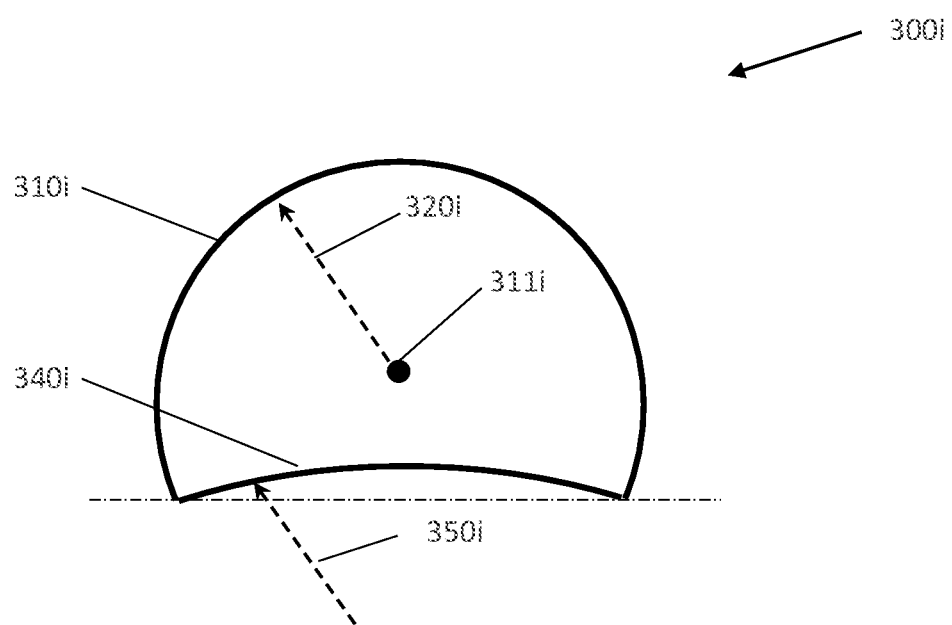

FIG. 12 shows an embodiment of an anti-resonance element preform 300i, in which case the first circle radius R_outer 320i of the ARE outer element 310i is smaller than the second circle radius R_inner 350i of the ARE inner element 340i, wherein
the first circle radius R_outer is larger than 2 mm and smaller than 10 mm,
the second circle radius R_inner is larger than 20 mm and smaller than 30 mm,
the first center angle α_outer is larger than 210° and smaller than 250°, and
the second center angle α_inner is larger than 48° and smaller than 70°.

An anti-resonance element preform 300i designed in this way can have at least one of the following features:
the second longitudinal axis 341 lies below the first chord,
the first longitudinal axis 311i runs outside of the ARE inner element 340i,
the angle between the ARE outer wall 315 and the wall 345 is within [70°; 110°], in particular within [80°; 100°], and
the ratio of the first segment height to the second segment height is between 3 and 10.

Due to the size of the second circle radius and of the position resulting therefrom in the drawing, the second longitudinal axis 341 is not drawn in FIG. 12.

Figure 13:
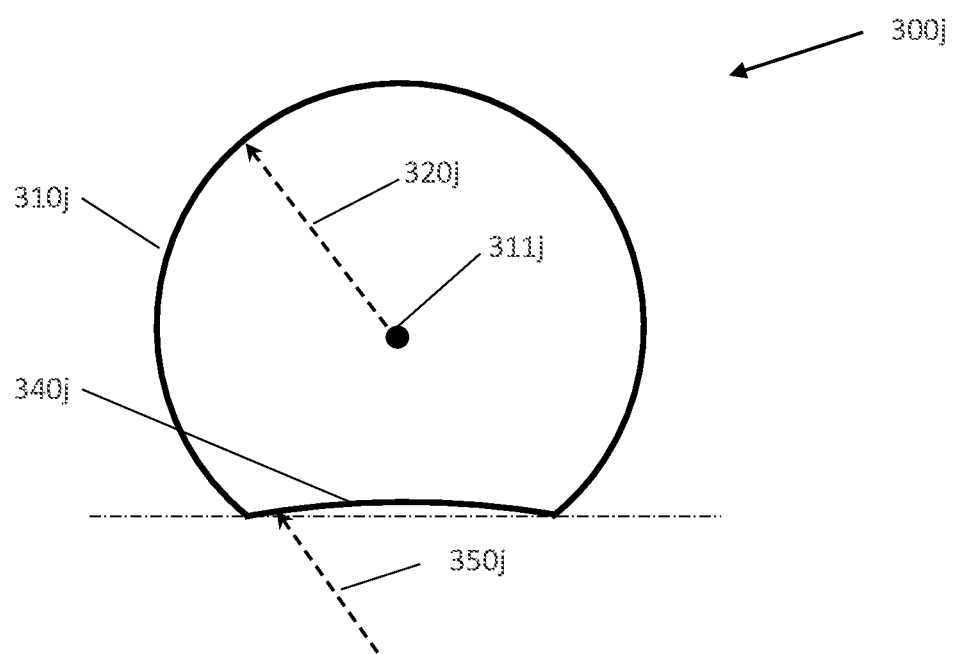

FIG. 13 shows an embodiment of an anti-resonance element preform 300j, in which case the first circle radius R_outer 320j of the ARE outer element 310j is smaller than the second circle radius R_inner 350j of the ARE inner element 340j, wherein
the first circle radius R_outer is larger than 2 mm and smaller than 10 mm,
the second circle radius R_inner is larger than 20 mm and smaller than 30 mm,
the first center angle α_outer is larger than 270° and smaller than 330°, and
the second center angle α_inner is larger than 15° and smaller than 35°.

An anti-resonance element preform 300j designed in this way can have at least one of the following features:
the second longitudinal axis 341 lies below the first chord,
the first longitudinal axis 311j runs outside of the ARE inner element 340j,
the angle between the ARE outer wall 315 and the wall 345 is within [50°; 130°], in particular within [70°; 110°], and
the ratio of the first segment height to the second segment height is between 28 and 44.

Due to the size of the second circle radius and of the position resulting therefrom in the drawing, the second longitudinal axis 341 is not drawn in FIG. 13.

FIGS. 14 and 15 show various embodiments of an anti-resonance element preform, in which case the first circle radius R_outer of the ARE outer element and the second circle radius R_inner of the ARE inner element are essentially of the same size.

FIG. 14 shows an embodiment of an anti-resonance element preform 300k, in which case the first circle radius R_outer 320k of the ARE outer element 310k and the second circle radius R_inner 350k of the ARE inner element 340k are essentially of the same size, wherein
R_outer and R_inner is smaller than 7 mm, in particular smaller than 6 mm; and
R_outer and R_inner larger than 3 mm, in particular larger than 4 mm,
the first center angle α_outer larger than 200° and smaller than 260°, and
the second center angle α_inner larger than 100° and smaller than 160°.

An anti-resonance element preform 300k designed in this way can have at least one of the following features:
the second longitudinal axis 341 lies below the first chord,
the first longitudinal axis 311k runs inside the ARE inner element 340k,
the angle between the ARE outer wall 315 and the wall 345 is within [10°; 30°], in particular within [70°; 120°], and
the ratio of the first segment height to the second segment height is between 1 and 6.

Due to the size of the second circle radius and of the position resulting therefrom in the drawing, the second longitudinal axis 341 is not drawn in FIG. 14.

FIG. 15 shows an embodiment of an anti-resonance element preform 300i, in which case the first circle radius R_outer 320i of the ARE outer element 310i and the second circle radius R_inner 350i of the ARE inner element 340i are essentially identical, wherein
R_outer and R_inner is smaller than 7 mm, in particular smaller than 6 mm; and
R_outer and R_inner larger than 3 mm, in particular larger than 4 mm,
the first center angle α_outer larger than 270° and smaller than 330°, and
the second center angle α_inner larger than 30° and smaller than 90°.

An anti-resonance element preform 300i designed in this way can have at least one of the following features:
the second longitudinal axis 341 lies below the first chord,
the first longitudinal axis 311i runs outside of the ARE inner element 340i,
the angle between the ARE outer wall 315 and the wall 345 is within [60°; 110°], in particular within [70°; 95°], and
the ratio of the first segment height to the second segment height is between 5 and 16.

Due to the size of the second circle radius and of the position resulting therefrom in the drawing, the second longitudinal axis 341 is not drawn in FIG. 15.

FIG. 16 shows a section of a preform 100, from which an anti-resonant hollow-core fiber 2400 can be produced. The preform 100 comprises a cladding tube 200, which has a cladding tube inner bore 220 and a cladding tube longitudinal axis 230, along which a cladding tube wall 210 limited by an inner side 215 and an outer side 216 extends. The anti-resonance element preform 300 is arranged in the cladding tube. The preform 100 has a preform core radius R_preform 231, which results from the shortest distance between the cladding tube longitudinal axis 230 and the anti-resonance element preform 300. In the finished preform, several anti-resonance element preforms 300 are arranged spaced apart from one another and in a contact-free manner at target positions on the inner side 215 of the cladding tube wall 210. It is provided thereby that the preform 100 has at least one anti-resonance element preform 300 according to at least any one of the embodiments listed here of the anti-resonance element preform 300a-n.

FIG. 16 shows a cross section of preform 100 and clarifies the arrangement of an anti-resonance element preform 300 on the cladding tube inner side 215. The anti-resonance element preform 300 is constructed in a tubular manner and thus protrudes into the drawing plane. The ARE outer element 310 designed in a circular arc-like manner and the ARE inner element 340 designed in a circular arc-like manner are connected to one another along two connecting lines 370, 370', which are arranged essentially in parallel to the first longitudinal axis 311. These two connecting lines 370, 370' are also connected to the cladding tube wall 210.

In the case of preforms known from the prior art, the ARE outer element as well as the ARE inner element are designed in a tubular manner. This design has the disadvantage that the nested constructed ARE outer elements and ARE inner elements are in each case connected to one another and to the cladding tube along only one connecting line. Therefore, there is a risk that the anti-resonance element preforms perform a rotatory movement during the elongating and/or collapsing, and the evenly distributed arrangement of the anti-resonance element preforms at the cladding tube inner wall is thus disturbed, which is reflected in an increased attenuation. Compared to those preforms, the preform according to the invention is characterized in that the anti-resonance element preform 300 is connected to the cladding tube wall 210 along the two connecting lines 370, 370'. This prevents a rotatory movement of the anti-resonance element preform 300 in the cladding tube during the elongating and/or collapsing.

FIG. 17 shows a cross section through an embodiment of an anti-resonance element preform 300m, which is characterized in that an ARE arc element 390 is arranged in the inner space 317 of the ARE outer element 310m and at the ARE inner element 340m. The ARE arc element 390 serves as non-resonant element to attenuate modes of a higher order. In the embodiment, the ARE arc element 390 is designed in a circular manner and has a radius R_circle 392 as well as a third longitudinal axis 395. Furthermore, the ARE arc element 390 is connected in particular by means of a substance-to-substance bond to the ARE inner element 340m along a contact line 393. In an embodiment, the contact line 393 is arranged on the circular arc-like ARE inner element 340m in such a way that a distance between contact line 393 and first chord is maximal.

In a design of this embodiment of the anti-resonance element preform 300m, the first circle radius R_outer 320m of the ARE outer element 310m can be smaller than the second circle radius R_inner 350m of the ARE inner element 340f, wherein the first circle radius R_outer is larger than 10 mm and smaller than 15 mm, the second circle radius R_inner is larger than 12 mm and smaller than 18 mm, the first center angle α_outer is larger than 270° and smaller than 330°, and the second center angle α_inner is larger than 30° and smaller than 70°.

Thereby in the case of the ARE arc element 390, a radius R_circle 392 can be larger than 10 mm and smaller than 15 mm.

An anti-resonance element preform 300m designed in this way can have at least one of the following features:

the second longitudinal axis 341 lies below the first chord, the first longitudinal axis 311m runs outside of the ARE inner element 340m, the third longitudinal axis 395 runs outside of the ARE inner element 340m, the angle between the ARE outer wall 315 and the wall 345 is within [35°; 100°], in particular within [45°; 90°], and the ratio of the first segment height to the second segment height is between 13 and 19.

Due to the size of the second circle radius and of the position resulting therefrom in the drawing, the second longitudinal axis 341 is not drawn in FIG. 17.

FIG. 18 shows a cross section through an embodiment of an anti-resonance element preform 300n, characterized in that the ARE arc element 390' is designed in a circular arc-shaped manner and has a fifth circle radius R_arc 394 and a fifth center angle α_arc. Furthermore, the ARE arc element 390' can have a third longitudinal axis 395'. The ARE arc element 390' is connected to the ARE outer element 310n and/or the ARE inner element 340n along two contact lines. In particular, each one of the two contact lines 393', 393" can be connected by means of a substance-to-substance bond to a respective one of the two connecting lines 370, 370'.

In a design of this embodiment of the anti-resonance element preform 300n, the first circle radius R_outer 320n of the ARE outer element 310n can be smaller than the second circle radius R_inner 350n of the ARE inner element 340n, wherein the first circle radius R_outer is larger than 10 mm and smaller than 15 mm, the second circle radius R_inner is larger than 12 mm and smaller than 18 mm, the first center angle α_outer is larger than 210° and smaller than 250°, and the second center angle α_inner is larger than 90° and smaller than 115°.

Thereby, in the case of the ARE arc element 390', a fifth circle radius R_arc 394 can be larger than 2.3 mm and smaller than 4.5 mm, and the fifth center angle α_arc can be larger than 160° and smaller than 230°.

An anti-resonance element preform 300n designed in this way can have at least one of the following features:

the second longitudinal axis 341 lies below the first chord, the first longitudinal axis 311n runs outside of the ARE inner element 340n, the third longitudinal axis 395 runs below the first chord, the angle between the ARE outer wall 315 and the wall 345 is within [30θ; 90°], in particular within [45°; 85°], and the ratio of the first segment height to the second segment height is between 1 and 6.

Due to the size of the second circle radius and of the position resulting therefrom in the drawing, the second longitudinal axis 341 is not drawn in FIG. 18.

In an embodiment, the ARE arc element 390, 390' can comprise an amorphous solid body, in particular a glass, in particular quartz glass, which consists in particular of an amorphous solid body, in particular a glass, in particular quartz glass, the ARE arc element 390, 390' and the ARE outer element 310m,n can in particular be made of identical material.

FIG. 19 shows a longitudinal section, and FIG. 20 shows a cross section through an anti-resonant hollow-core fiber 2400. A section of the anti-resonant hollow-core fiber 2400 between two section lines A-A and B-B is illustrated. The anti-resonant hollow-core fiber 2400 has a cladding 2450. In the illustrated embodiment of the anti-resonant hollow-core fiber 2400, the cladding 2450 is constructed of an elongated cladding tube 200 and an elongated cladding material 2452. Since the cladding material 2452 and the cladding tube material 200 are designed to be made of identical material in the illustrated embodiment, the transition between the two materials is not marked. The cladding 2450 has a cladding inner radius 2465, which results from the distance of the longitudinal axis 2460 of the anti-resonant hollow-core fiber to the inner surface 2480.

The anti-resonant hollow-core fiber 2400 has a hollow core 2470. An electromagnetic wave can propagate through the hollow core 2470. In the embodiment illustrated in FIG. 19, two anti-resonance elements 2410 are arranged inside the hollow core 2470. They are connected by means of a substance-to-substance bond to a cladding inner side 2480 of the cladding 2450. The anti-resonance elements 2410 have an ARE outer unit 2420 and an ARE inner unit 2430. The ARE inner unit 2430 is arranged inside the ARE outer unit 2420. The anti-resonance elements 2410 are arranged in parallel to a longitudinal axis 2460 of the anti-resonant hollow-core fiber 2400. The hollow-core fiber 2400 has a core radius 2405, which results from the shortest distance between the longitudinal axis 2460 of the anti-resonant hollow-core fiber 2400 and the ARE outer unit 2420.

FIG. 20 clarifies the arrangement of an anti-resonance element 2410 on an inner surface 2480, which limits the hollow core 2470. The anti-resonance element 2410 is constructed in a tubular manner. The anti-resonant hollow-core fiber 2400 comprises a cladding 2450, on the cladding inner side 2480 of which an anti-resonance element 2410 according to the invention is arranged. The ARE outer unit 2420 and the ARE inner unit 2430 are thereby designed in a circular arc-like manner. The ARE outer unit 2420 and the ARE inner unit 2430 are connected to one another along two seam lines. These two seam lines are also connected to the cladding inner side 2480. Thereby the ARE inner unit 2430, which is designed in a circular arc-like manner, protrudes into an inner space, which is at least partially limited by an ARE outer wall.

To describe the geometric sizes of the anti-resonant hollow-core fiber 2400:
the ARE outer unit 2420 has a third circle radius FB_outer 2422,
the ARE inner unit 2430 has a fourth circle radius FB_inner 2432,
the ARE outer unit 2420 has a third center angle β_outer 2423, and
the ARE inner unit 2430 has a fourth center angle β_inner 2433.

The illustrated ARE inner unit 2430 and/or ARE outer unit 2420 can partially have a wall thickness in the range of 0.2-2 μm. In an embodiment, the ARE inner unit 2430 and/or ARE outer unit 2420 have a wall thickness of between 0.25 μm 0.75 μm, in particular between 0.35 μm and 0.65 μm, in particular 0.5 μm. The illustrated cladding tube 2450 can have an outer diameter in the range of 190-270 μm at a length of at least 1000 m. The inner diameter of the hollow core 2470 is preferably 50 to 100 μm.

By means of a construction according to one of the embodiments, the anti-resonant hollow-core fiber 2400 can have at least one of the following features:
 a fundamental attenuation of less than 0.15 dB/km at a transported wavelength between 1.0 μm and 2.5 μm, and
 a fundamental attenuation of less than 1 dB/km at a transported wavelength of up to 0.8 μm.

In an embodiment, the anti-resonant hollow-core fiber 2400 can have three, four, five, six, seven, or eight anti-resonance elements 2410. In particular, the anti-resonant hollow-core fiber 2400 can have an odd number of anti-resonance elements 2410. In an embodiment, the anti-resonant hollow-core fiber 2400 has a core radius, wherein the core radius is smaller than 50 μm, in particular smaller than 40 μm, in particular smaller than 30 μm, in particular smaller than 25 μm, in particular smaller than 20 μm, in particular smaller than 15 μm, in particular smaller than 13 μm.

The ARE outer unit 2420 has a third segment height 2424. This third segment height 2424 describes the length of a straight line, which is perpendicular to the chord and which runs to the maximum height of the ARE outer unit 2420.

The ARE inner unit 2430 has a fourth segment height 2434. This fourth segment height 2434 describes the length of a straight line, which is perpendicular to the chord and runs to the maximum height of the ARE inner unit 2430.

The illustrated anti-resonant hollow-core fiber 2400 has a bolt circle radius, which results from the sum of the core radius 2405 and the third circle radius FB_outer 2422.

The illustrated anti-resonant hollow-core fiber 2400 is produced from a preform 100. Thereby the production of the anti-resonant hollow-core fiber 2400 from the preform 100 takes place in particular by means of a one-time or repeated performance of one or several of the following hot-forming processes: elongating 2300, collapsing 2100, adding 2200 additional cladding material.

An embodiment of an anti-resonant hollow-core fiber 2400 is characterized in that an ARE arc unit is arranged in an inner space of the ARE outer unit, in particular that the ARE arc unit is arranged at the ARE inner unit. In particular, the ARE arc unit is produced from an ARE arc element by means of a one-time or repeated performing of one or several of the following hot-forming processes: elongating and/or collapsing.

FIGS. 21 and 22 show the individual parts, which can be used as part of a method in order to produce a preform 100. Thereby the method has the following steps (see also FIG. 27):
 a) providing 1000 a cladding tube 200, which has a cladding tube inner bore 220 and a cladding tube longitudinal axis 230, along which a cladding tube wall 210 limited by an inner side 215 and an outer side 216 extends,
 b) preparing 1100 of a number of anti-resonance element preforms 300a-n, each comprising an ARE outer element 310 and an ARE inner element 340 inserted therein, c) arranging 1200 of the anti-resonance element preforms 300*a-n* at target positions in the cladding tube inner bore 220, d) processing 1300 of an assembly, comprising the cladding tube 200 and the anti-resonance element preforms 300*a-n* by means of a hot-forming process, selected from at least one of elongating and collapsing.

The method is characterized in that a relative inner pressure in the range of between −10 to −300 mbar, in particular −50 to −250 mbar, is set in the cladding tube inner bore 220 in step d) "processing" 1300, the ARE outer element 310 and the ARE inner element 340 are designed in a circular arc-like manner in at least one anti-resonance element preform 300*a-n*, and are connected to one another and to the cladding tube inner bore 220 along two connecting lines 370, 370'.

An anti-resonance element preform of this type has the above-listed advantages.

In the case of known methods, a fixing of the anti-resonance element preforms 300*a-n* takes place at the two front surfaces of the cladding tube 200. This takes place via pointwise melting by means of a manual torch. Soot or burn-off, which deposits on the glass surfaces, is created thereby. This generally affects in particular the front surface of the cladding tube as well as the inner surface thereof and the surfaces of the anti-resonance element preforms. Due to the complexity of the created geometry, a complete cleaning of the assembly is hardly possible.

To overcome these disadvantages, a positioning template 400 can be used, which has at least one centering surface 420, which cooperates with a first end 250 of the cladding tube 200 in a self-centering manner in a way that the anti-resonance element preforms 300*a-n* are arranged at target positions in step c) "arranging" 1200.

FIG. 21 shows individual parts of an embodiment of an assembly 110 of a preform 100 according to the invention of the anti-resonant hollow-core fiber 2400. The assembly 110 has a cladding tube 200. The cladding tube 200 is designed in a tubular manner. At least one anti-resonance element preform 300*a-n* is to be arranged on an inner side 215 of the cladding tube 200. For this purpose, the following takes place preparing of a positioning template 400 with a number of passage openings 410 passing through the positioning template 400, adapted for a longitudinal guidance of an anti-resonance element preform 300*a-n* each, wherein the positioning template 400 and the cladding tube 200 are made of identical material.

As part of the "attaching" step, a connecting of the positioning template 400 to a first end 250 of the cladding tube 200 takes place. It is provided thereby that the positioning template 400 ensures the arrangement of the anti-resonance element preforms 300*a-n* at target positions.

In FIG. 22, parts of the anti-resonance element preforms 300*a-n* are guided through the passage openings 410 and protrude into the cladding tube inner bore 220. The positioning template 400 is lowered in the direction of the cladding tube 200 as part of the "arranging" step. After the non-positive and/or positive attaching of the positioning template 400 to the cladding tube 200, the assembly 110, comprising the cladding tube 200, the anti-resonance element preforms 300, and the positioning template 400 is further processed into the preform 100 by means of the hot-forming process selected from at least one of elongating and collapsing.

The positioning template 400 that is to be used is designed in such a way that the passage openings 410 for the anti-resonance element preforms 300 are always located at the same angular distance from one another and that symmetry is thus automatically at hand. Furthermore, a gas flow element for the gas flow is provided in the center of the disk. For example, in the later process, the rinsing or cleaning with gas, as well as the application of negative pressure is thus possible within the entire tube setup. Due to the size of the bore, the gas flow through the core region and the anti-resonance element preforms can be influenced.

To overcome the mentioned disadvantage, a second positioning template 500 with a number of second passage openings 510 passing through the second positioning template 500, adapted for a longitudinal guidance of an anti-resonance element preform 300*a-n* each, can also be used in addition to the positioning template 400, which is clarified in FIG. 22.

The following steps are provided thereby:

attaching the positioning template 400 to the first end 250 of the cladding tube 200, combining the second positioning template 500 with a second end 260 of the cladding tube 200, and inserting at least parts of the anti-resonance element preforms 300*a-n* through the passage openings 410 and second passage openings 510 in order to arrange the anti-resonance element preforms in the cladding tube inner bore 220.

It is provided thereby that the positioning template 400 has at least one centering surface 420, which cooperates with the first end 250 of the cladding tube 200 in a self-centering manner in such a way that the anti-resonance element preforms 300*a-n* are arranged at target positions in the "arranging" step, and the second positioning template 500 has at least one second centering surface 520, which cooperates with the second end 260 of the cladding tube 200 in a self-centering manner in a way that the anti-resonance element preforms 300*a-n* are arranged at target positions in the "arranging" step, and are arranged at target positions in particular in step d) "processing".

Thereby the cladding tube 200 has a counter centering surface 251 at the first end 250, and a second countering centering surface 261 at a second end 260. In the illustrated embodiment, the positioning template 400 as well as the second positioning template 500 are at least partially shaped in a truncated cone-like manner. The centering surface 420 and the second centering surface 520 are thereby partially formed in a cladding surface-like manner. In FIG. 21, the cladding tube 200 is at least partially cut out in a truncated cone-like manner in the region of the first end 2450 and of the second end 260.

In particular, the positioning template 400 and the cladding tube 200 and/or the second positioning template 500 and the cladding tube 200 are made of identical material.

FIG. 22 shows the step "inserting" of at least parts of the anti-resonance element preforms 300*a-n* through the second passage openings 510 of the second positioning template 500. Step d) "processing" 1300 of the assembly, comprising the cladding tube 200, the anti-resonance element preforms 300*a-n*, the positioning template 400, and the second positioning template 500, takes place subsequently by means of a hot-forming process, selected from at least one of elongating and collapsing.

An embodiment of the method is characterized in that the anti-resonance element preforms 300a-n in step d) "processing" are thermally fixed in a flame-free manner to the cladding tube wall 210. A previous, pointwise melting of the anti-resonance element preforms 300a-n onto the cladding tube 200, in particular the cladding tube wall 210, in particular by means of the manual torch, is eliminated.

FIG. 23 shows the preform 100 comprising the anti-resonance element preforms 300a-n, which was created from the assembly 110 illustrated in FIG. 22.

FIG. 24 shows the assembly 110', which can be reshaped into a preform 100' by elongating and/or collapsing as part of step d) "processing". The method necessary for this purpose comprises the step of:

A/ preparing a third positioning template 600 with a number of third passage openings 610 passing through the third positioning template 600, adapted for a longitudinal guidance of an anti-resonance element preform 300a-n each, wherein the third positioning template 600 has at least one third centering surface 620.

To create the described preform 100', the step of:

B/ producing a tubular closing element 700, wherein the closing element 700 has an active surface 710 in the region of a first end region 730 in order to cooperate with the third centering surface 620, in particular to cooperate in a positive manner, is required.

The illustrated assembly 110' has a funnel-like closing element 700. The outer diameter of the closing element 700 in the first end region 730 corresponds essentially to the outer diameter of the cladding tube 200. On the opposite second end region 740, the diameter of the closing element 700 is reduced in order to form an outlet 750. This outlet 750 can, inter alia, serve to regulate the pressure ratios in the at least one anti-resonance element preform 300a-n and/or inside the cladding tube inner bore 220, respectively.

Furthermore, the assembly 110" has a first connecting element 900 and a second connecting element 910. The first connecting element 900 is thereby arranged at the first end 250 of the cladding tube 200, and the second connecting element 910 is arranged at the second end 260 of the cladding tube.

FIG. 25 shows the assembly 100", which—based on FIG. 24—is created after passing through the following steps C/ linking the third positioning template 600 to the first end region 730, D/ connecting the closing element 700 to the second end 260 of the cladding tube 200, in particular connecting the closing element 700 to the second end 260 of the cladding tube 200 by using a second connecting element 910, E/ pushing through at least parts of the anti-resonance element preforms 300a-n through the third passage openings 610 in order to arrange the anti-resonance element preforms 300a-n in the cladding tube inner bore 220, wherein the third centering surface 620 cooperates with the active surface 710 in a self-centering manner in such a way that the anti-resonance element preforms 300a-n are arranged at target positions.

In the illustrated exemplary embodiment, the anti-resonance element preforms 300a-n are held at two positions on the end side. On the one hand, the anti-resonance element preforms 300a-n are held at the first end 250 of the cladding tube 200 by means of the positioning template 400. In addition, the third positioning template 600 ensures a further end-side holding of the anti-resonance element preforms 300a-n. Together, the positioning template 400 and the third positioning template 600 ensure that the anti-resonance element preforms 300a-n are held at target positions inside the cladding tube inner bore 220.

In step d) "processing", the anti-resonance element preforms 300a-n can be thermally fixed in a flame-free manner to the cladding tube inner bore. In particular FIG. 26, which illustrates the pass-through of the assembly through an electric furnace 800 as part of step d) "processing", clarifies this step. A movement arrow 810 clarifies the direction, from which the assembly 110' is moved into an electric furnace 800—a flame-free heat source—so that the preform 100' is created.

The manual torch process for fixing the anti-resonance element preforms 300a-n can be dispensed with by using an electric furnace 800. In the case of manual torch processes, there are problems with the burn-off and soot associated with the torch use. The condensation cannot be removed completely subsequently, so that the preliminary product is already further processed with contaminations. Inter alia, blistering, inclusions, and later fiber breakage can thus result during the stretching. When using the furnace, the above-mentioned problems are eliminated, so that a clean preform can be produced.

As part of step d) "processing" 1500, the anti-resonance element preform 300a-n can be held in the cladding tube inner bore 220 only by means of the positioning template 400, 400', 400", or the positioning template 400, 400', 400" and the second positioning template 500, or the positioning template 400, 400', 400" and the third positioning template 600, 600' and otherwise without a substance-to-substance bond.

One aspect of the method is that the exact joining of cladding tube 200 and the anti-resonance element preforms 300a-n can take place directly in a processing plant (such as, for instance, a vertical glass lathe) and only one process step is thus necessary for assembly and stretching of the entire preform.

The anti-resonance element preforms 300a-n, which are illustrated only schematically in FIGS. 22 to 26, can be designed according to each of the described embodiments. To this purpose, a reference is made to the corresponding statements.

FIG. 27 shows an embodiment of a method for producing a preform 100, 100' of an anti-resonant hollow-core fiber 2400 with the steps of:

e) providing 1000 a cladding tube 200 with a cladding tube inner bore 220 and a cladding tube longitudinal axis 230, along which a cladding tube wall 210 extends, which is limited by an inner side 215 and an outer side 216, f) preparing 1100 a number of anti-resonance element preforms 300a-n, each comprising an ARE outer element 310 and an ARE inner element 340 inserted therein, g) arranging 1200 the anti-resonance element preforms 300a-n at target positions in the cladding tube inner bore 220, h) processing 1300 an assembly 110, 100', comprising the cladding tube 200 and the anti-resonance element preforms 300a-n, by means of a hot-forming process selected from at least one of elongating and collapsing.

It is provided thereby that a relative inner pressure in the range of between −10 to −300 mbar, in particular −50 to −250 mbar, is set in the cladding tube inner bore in step d) "processing" 1300, the ARE outer element 310 and the ARE inner element 340 are designed in a circular arc-like manner in at least one anti-resonance element preform 300a-n, and are connected to one another and to the cladding tube inner bore 220 along two connecting lines 370, 370'.

FIG. 28 shows an embodiment of a method for producing an anti-resonant hollow-core fiber 2400 from a preform 100, 100', in particular produced according to any one of the preceding method steps 1000 to 1300, having the step of further processing the preform 100, 100' into the anti-resonant hollow-core fiber 2400, wherein the further processing comprises a one-time or repeated performance of one or several of the following hot-forming processes:

collapsing 2100,
adding 2200 additional cladding material, and
elongating 2300.

In particular at least one of the following transitions can occur during the production of an anti-resonant hollow-core fiber 2400 according to any one of the preceding embodiments from a preform 100, 100' according to any one of the preceding embodiments, in particular as part of the "further processing" step:

the anti-resonance element 2410 is created from the anti-resonance element preform 300a-n, at least a part of the cladding 2450 is created from the cladding tube 200, the ARE outer unit 2420 is created from the ARE outer element 310a-n, the ARE inner unit 2430 is created from the ARE inner element 340a-n, the third circle radius FB_outer 2422 is created from the first circle radius R_outer 320a-j,m,n, the fourth circle radius FB_inner 2432 is created from the second circle radius R_inner 350a-j,m,n, the third center angle β_outer 2423 is created from the first center angle α_outer 325, the fourth center angle β_inner 2433 is created from the second center angle α_inner 355, the third segment height HF_outer 2424 is created from the first segment height H_outer 328, the fourth segment height HF_inner 2434 is created from the second segment height H_inner 358, the seam line is created from the connecting line 370, 370', the ARE arc unit is created from the ARE arc element 390, 390', the sixth circle radius FB_arc is created from the fifth circle radius R_arc 394, the radius FB_circle is created from the radius R_circle 392, the sixth center angle β_arc is created from the fifth center angle α_arc, and the contact seam is created from the contact line.

All the properties and features described for the positioning template also apply for the second positioning template and/or the third positioning template and vice versa.

All the properties and features described for the method also apply for the preform and/or the anti-resonant hollow-core fiber and vice versa.

Unless otherwise specified, all of the physical variables specified in the claims, the description, the examples, and in the figures, are determined under normal conditions in accordance with DIN 1343. The statement "under normal conditions" refers to measurements under conditions in accordance with DIN 1343. The features disclosed in the claims, the description, and in the figures, can be significant for various designs of the claimed invention, both separately and in any combination with one another. The features disclosed for the devices, in particular preform, secondary preform, or anti-resonant hollow-core fiber, are also disclosed for the method and vice versa.

EXAMPLES

FIG. 29 to 30 shows the results of simulations of two embodiments of the anti-resonant hollow-core fiber. In the shown embodiments of the anti-resonant hollow-core fiber, the third circle radius FB_outer and the fourth circle radius FB_inner were of identical length (FB_outer=FB_inner). The following values were used for the geometries of the anti-resonance elements of the hollow-core fiber:

fiber 1: third circle radius FB_outer and fourth circle radius FB_inner each 12.25 μm, fiber 2: third circle radius FB_outer and fourth circle radius FB_inner each 15.75 μm.

Both fibers have six ARE outer units, each with an ARE inner unit located therein. A core radius F_fiber is 17.25 μm for both fibers. The core radius R_fiber results from the shortest distance between the longitudinal axis and an ARE outer unit. The bolt circle radius for fiber 1 is 29.5 μm and 2.33 μm for fiber 2. The wall thickness of the respective ARE outer unit and ARE inner unit is 0.5 μm.

A "confinement loss" (also referred to as waveguide losses) of the base mode at a wavelength of 1550 nm for both fibers is plotted in the diagram in FIG. 29 over the "bow ratio". The confinement loss thereby describes the waveguide losses along the hollow-core fiber, based on radially radiated energy. The bow ratio, in contrast, is defined as follows:

$$\text{bow ratio} = \frac{\text{third center angle } \beta\_\text{outer}}{\text{fourth center angle } \beta\_\text{inner}}$$

The bow ratio thus specifies the ratio of the two center angles of the ARE units (thus ARE outer unit and ARE inner unit) to one another.

As part of the simulation, the confinement loss of the base mode was determined for a bow ratio, in which case β_outer moved within an interval from 205° to 310°. The amount of the fourth center angle β_inner resulted from the difference of the third center angle β_inner at 360°. As clarified in FIG. 29, the two fibers (fiber 1 and fiber 2) span a space for the bow ratio, in which the confinement loss is smaller than 10E-2 db/m. The bow ratio for this space is larger than 1.5, in particular larger than 1.6, in particular larger than 1.7; and smaller than 3.2, in particular smaller than 2.8, in particular smaller than 2.5.

Fibers designed in this way and those, which lie within the spanned parameter space, solve the above-mentioned technical problems.

It follows from the listed bow ratio that β_outer can be smaller than 275° and larger than 210°, wherein the sum of β_outer and β_inner has a value of 360°. A parameter space for the third segment height HF_outer and the fourth segment height HF_inner also results based on the given variables for the fiber 1 and fiber 2:

HF_outer/HF_inner smaller than 6.5, in particular smaller than 4, in particular smaller than 3.2;

HF_outer/HF_inner larger than 1.7, in particular larger than 1.75, in particular larger than 1.85.

As specified, it is a goal to keep the run distance of the light as short as possible in order to attain a base mode behavior in the hollow-core fibers described here. For an improved base mode behavior of the hollow-core fiber, an additional loss mechanism can be used for this purpose, in which case the energy of the HOM couples into highly lossy modes in the ARE units (ARE outer units and/or ARE inner units) by means of an adapted design of the hollow-core fiber. This coupling requires an adapted phase propagation speed of the two mode groups
  HOM in the core of the hollow-core fiber and
  ARE modes in the ARE units (ARE outer units and/or ARE inner units).

The coupling of the phase propagation speed can be influenced in particular by means of the geometry of individual components of the hollow core fiber. In particular the parameter "z/R" thereby turned out to be essential, which is defined as follows:

$$\frac{z}{R} = \frac{HF_{outer} - HF_{inner}}{R_{fiber}}$$

As specified, z/R results from the difference between the third segment height HF_outer (see 2424 in FIG. 20) and the fourth segment height HF_inner (see 2434 in FIG. 20), divided by the core radius R_fiber (see 2405 in FIG. 20).

The effective mode index $n_{eff}$ is plotted in the diagram in FIG. 30 via the above-defined ratio z/R for fiber 1 and fiber 2. Graphs are illustrated for fiber 1 as well as for fiber 2 the effective mode index $n_{eff}$ of
  the modes in the ARE outer units ("ARE mode fiber 1" and "ARE mode fiber 2"),
  a first higher order mode in the core (HOM1), and
  a second higher order mode in the core (HOM2).

Particularly effective coupling is at hand in particular close to the points of intersection of the graphs of the ARE mode with the higher order modes (here first and second). The energy of the higher order modes in the core couples into the ARE modes, which are more lossy. The higher order modes are thus attenuated in the core and the hollow-core fiber has a base mode behavior over a shorter run distance.

In an embodiment, an anti-resonant hollow-core fiber thus results, which is characterized in that the ratio z/R
  larger than 0.6, in particular larger than 0.7, in particular larger than 0.8, and
  smaller than 1.4, in particular smaller than 1.3, in particular smaller than 1.2.

In particular, z/R lies within the interval [0.8; 1.2]. These parameter spaces for z/R provide for a good coupling of the phase propagation speed of said two mode groups.

In order to attain a small confinement loss of the base mode, in particular a confinement loss of less than 10E-2 db/m, as well as the attaining of a base mode behavior on a short fiber distance, an embodiment of the anti-resonant hollow-core fiber can be characterized in that the ratio z/R is
  larger than 0.75, in particular larger than 0.8, and
  smaller than 1.25, in particular smaller than 1.2,
the third circle radius FB_outer and the fourth circle radius FB_inner are essentially of identical length (FB_outer=FB_inner), wherein FB_outer and FB_inner is smaller than 17 µm and larger than 12 µm, and the bow ratio is smaller than 2.8 and larger than 1.6.

Further examples for anti-resonance element preforms and preforms according to the invention are as follows:

Dimensions of examples for anti-resonance element preforms and preforms will be listed below. The invention is further illustrated in an exemplary manner by means of these examples. The invention is not limited to the examples. The following abbreviations are used thereby:

|  | ARE outer element | ARE inner element |
|---|---|---|
| r_V [mm] | first circle radius R_outer | second circle radius R_inner |
| b2_V[°] | first center angle α_outer | second center angle α_inner |
| s_V [mm] | first chord length | second chord length |
| h_V [mm] | first segment height | second segment height |

The specified "segment height ratio" of the anti-resonance element preform is calculated as a ratio of the first segment height to the second segment height.

Example V1

In this embodiment alternative of the preform, the boundary condition
  R_outer>R_inner
is fulfilled and the following geometries were used.

|  | ARE outer element | ARE inner element |
|---|---|---|
| r_V [mm] | 3.5 | 1.08 |
| b2_V[°] | 330 | 245.98 |
| s_V [mm] | 1.81 | 1.81 |
| h_V [mm] | 6.88 | 1.67 |
| segment height ratio | 4.13 |  |

The result was a preform, which could be produced in a precise and reproducible manner.

Example V2

In this embodiment alternative of the preform, the boundary condition
  R_outer>R_inner
is fulfilled and the following geometries were used.

|  | ARE outer element | ARE inner element |
|---|---|---|
| r_V [mm] | 3.5 | 1.88 |
| b2_V[°] | 330 | 302.39 |
| s_V [mm] | 1.81 | 1.81 |
| h_V [mm] | 6.88 | 3.53 |
| ratio segment height | 1.95 |  |

The result was a preform, which could be produced in a precise and reproducible manner.

Example V3

In this embodiment alternative of the preform, the boundary condition
  R_outer>R_inner
is fulfilled and the following geometries were used.

|  | ARE outer element | ARE inner element |
|---|---|---|
| r_V [mm] | 3.5 | 1.88 |
| b2_V[°] | 330 | 57.61 |

|  | ARE outer element | ARE inner element |
|---|---|---|
| s_V [mm] | 1.81 | 1.81 |
| h_V [mm] | 6.88 | 0.23 |
| segment height ratio | 29.58 | |

The result was a preform, which could be produced in a precise and reproducible manner.

Example V4

In this embodiment alternative of the preform, the boundary condition

R_outer>R_inner is fulfilled and the following geometries were used.

|  | ARE outer element | ARE inner element |
|---|---|---|
| r_V [mm] | 3.5 | 2.42 |
| b2_V[°] | 280 | 223.24 |
| s_V [mm] | 4.50 | 4.50 |
| h_V [mm] | 6.18 | 3.31 |
| segment height ratio | 1.87 | |

The result was a preform, which could be produced in a precise and reproducible manner.

Example V5

In this embodiment alternative of the preform, the boundary condition

R_outer>R_inner is fulfilled and the following geometries were used.

|  | ARE outer element | ARE inner element |
|---|---|---|
| r_V [mm] | 3.5 | 2.42 |
| b2_V[°] | 280 | 136.76 |
| s_V [mm] | 4.50 | 4.50 |
| h_V [mm] | 6.18 | 1.53 |
| ratio segment height | 4.04 | |

The result was a preform, which could be produced in a precise and reproducible manner.

Example V6

In this embodiment alternative of the preform, the boundary condition

R_outer<R_inner is fulfilled and the following geometries were used.

|  | ARE outer element | ARE inner element |
|---|---|---|
| r_V [mm] | 3.5 | 4 |
| b2_V[°] | 300 | 51.89 |
| s_V [mm] | 3.50 | 3.50 |
| h_V [mm] | 6.53 | 0.40 |
| ratio segment height | 16.20 | |

The result was a preform, which could be produced in a precise and reproducible manner.

Example V7

In this embodiment alternative of the preform, the boundary condition

R_outer<R_inner is fulfilled and the following geometries were used.

|  | ARE outer element | ARE inner element |
|---|---|---|
| r_V [mm] | 3.5 | 4 |
| b2_V[°] | 230 | 104.94 |
| s_V [mm] | 6.34 | 6.34 |
| h_V [mm] | 4.98 | 1.56 |
| segment height ratio | 3.19 | |

The result was a preform, which could be produced in a precise and reproducible manner.

Example V8

In this embodiment alternative of the preform, the boundary condition

R_outer<R_inner is fulfilled and the following geometries were used.

|  | ARE outer element | ARE inner element |
|---|---|---|
| r_V [mm] | 3.5 | 6.73 |
| b2_V[°] | 300 | 30.14 |
| s_V [mm] | 3.50 | 3.50 |
| h_V [mm] | 6.53 | 0.23 |
| segment height ratio | 28.21 | |

The result was a preform, which could be produced in a precise and reproducible manner.

Example V9

In this embodiment alternative of the preform, the boundary condition

R_outer<R_inner is fulfilled and the following geometries were used.

|  | ARE outer element | ARE inner element |
|---|---|---|
| r_V [mm] | 3.5 | 6.73 |
| b2_V[°] | 230 | 56.24 |
| s_V [mm] | 6.34 | 6.34 |
| h_V [mm] | 4.98 | 0.79 |
| segment height ratio | 6.27 | |

The result was a preform, which could be produced in a precise and reproducible manner.

Example V10

In this embodiment alternative of the preform, the boundary condition

R_outer<R_inner is fulfilled and the following geometries were used.

|  | ARE outer element | ARE inner element |
|---|---|---|
| r_V [mm] | 3.5 | 8.08 |
| b2_V[°] | 300 | 25.02 |
| s_V [mm] | 3.50 | 3.50 |

-continued

|                     | ARE outer element | ARE inner element |
|---------------------|-------------------|-------------------|
| h_V [mm]            | 6.53              | 0.19              |
| segment height ratio| 34.05             |                   |

The result was a preform, which could be produced in a precise and reproducible manner.

Example V11

In this embodiment alternative of the preform, the boundary condition
R_outer=R_inner
is fulfilled and the following geometries were used.

|                     | ARE outer element | ARE inner element |
|---------------------|-------------------|-------------------|
| r_V [mm]            | 3.5               | 3.5               |
| b2_V[°]             | 230               | 130.00            |
| s_V [mm]            | 6.34              | 6.34              |
| h_V [mm]            | 4.98              | 2.02              |
| segment height ratio| 2.46              |                   |

The result was a preform, which could be produced in a precise and reproducible manner. In the context of Example V11, the statement that the first circle radius R_outer and the second circle radius R_inner are of identical length is understood that the said lengths differ by less than 1.0%.

Example V12

In this embodiment alternative of the preform, the boundary condition
R_outer=R_inner
is fulfilled and the following geometries were used.

|                     | ARE outer element | ARE inner element |
|---------------------|-------------------|-------------------|
| r_V [mm]            | 3.5               | 3.5               |
| b2_V[°]             | 300               | 60.00             |
| s_V [mm]            | 3.50              | 3.50              |
| h_V [mm]            | 6.53              | 0.47              |
| segment height ratio| 13.93             |                   |

The result was a preform, which could be produced in a precise and reproducible manner. In the context of Example V12, the statement that the first circle radius R_outer and the second circle radius R_inner are of identical length is understood that the said lengths differ by less than 1.0%.

Dimensions of examples for anti-resonant hollow-core fibers according to the invention will be specified below. The invention is further illustrated in an exemplary manner by means of these examples. The invention is not limited to the examples. The following abbreviations are used thereby:

|         | ARE outer unit       | ARE inner unit        |
|---------|----------------------|-----------------------|
| r [μm]  | third circle radius  | fourth circle radius  |
|         | FB_outer             | FB_inner              |
| b2 [°]  | third center angle   | fourth center angle   |
|         | β_outer              | β_inner               |
| s [μm]  | third chord length   | fourth chord length   |
| h [μm]  | third segment height | fourth segment height |

The specified "segment height ratio" of the anti-resonant hollow-core fiber is calculated as a ratio of the third segment height to the fourth segment height.

Example F1

In this embodiment alternative of the anti-resonant hollow-core fiber, the boundary condition
FB_outer>FB_inner
is fulfilled and the following geometries were used.

|                     | ARE outer unit | ARE inner unit |
|---------------------|----------------|----------------|
| r [μm]              | 13             | 4              |
| b2 [°]              | 300            | 245.47         |
| s [μm]              | 6.73           | 6.73           |
| h [μm]              | 25.56          | 6.16           |
| segment height ratio| 4.15           |                |

The result was an anti-resonant hollow-core fiber with a low attenuation.

Example F2

In this embodiment alternative of the anti-resonant hollow-core fiber, the boundary condition
FB_outer>FB_inner
is fulfilled and the following geometries were used.

|                     | ARE outer unit | ARE inner unit |
|---------------------|----------------|----------------|
| r [μm]              | 13             | 7              |
| b2 [°]              | 330            | 302.54         |
| s [μm]              | 6.73           | 6.73           |
| h [μm]              | 25.56          | 13.14          |
| segment height ratio| 1.95           |                |

The result was an anti-resonant hollow-core fiber with a low attenuation.

Example F3

In this embodiment alternative of the anti-resonant hollow-core fiber, the boundary condition
FB_outer>FB_inner
is fulfilled and the following geometries were used.

|                     | ARE outer unit | ARE inner unit |
|---------------------|----------------|----------------|
| r [μm]              | 13             | 7              |
| b2 [°]              | 330            | 57.46          |
| s [μm]              | 6.73           | 6.73           |
| h [μm]              | 25.56          | 0.86           |
| segment height ratio| 29.66          |                |

The result was an anti-resonant hollow-core fiber with a low attenuation.

Example F4

In this embodiment alternative of the anti-resonant hollow-core fiber, the boundary condition
FB_outer>FB_inner
is fulfilled and the following geometries were used.

|  | ARE outer unit | ARE inner unit |
|---|---|---|
| r [μm] | 13 | 9 |
| b2 [°] | 280 | 223.60 |
| s [μm] | 16.71 | 16.71 |
| h [μm] | 22.96 | 12.34 |
| segment height ratio | 1.86 | |

The result was an anti-resonant hollow-core fiber with a low attenuation.

Example F5

In this embodiment alternative of the anti-resonant hollow-core fiber, the boundary condition FB_outer>FB_inner is fulfilled and the following geometries were used.

|  | ARE outer unit | ARE inner unit |
|---|---|---|
| r [μm] | 13 | 9 |
| b2 [°] | 280 | 136.40 |
| s [μm] | 16.71 | 16.71 |
| h [μm] | 22.96 | 5.66 |
| segment height ratio | 4.06 | |

The result was an anti-resonant hollow-core fiber with a low attenuation.

Example F6

In this embodiment alternative of the anti-resonant hollow-core fiber, the boundary condition FB_outer<FB_inner is fulfilled and the following geometries were used.

|  | ARE outer unit | ARE inner unit |
|---|---|---|
| r [μm] | 13 | 15 |
| b2 [°] | 300 | 51.36 |
| s [μm] | 13.00 | 13.00 |
| h [μm] | 24.26 | 1.48 |
| segment height ratio | 16.37 | |

The result was an anti-resonant hollow-core fiber with a low attenuation.

Example F7

In this embodiment alternative of the anti-resonant hollow-core fiber, the boundary condition FB_outer<FB_inner is fulfilled and the following geometries were used.

|  | ARE outer unit | ARE inner unit |
|---|---|---|
| r [μm] | 13 | 15 |
| b2 [°] | 230 | 103.53 |
| s [μm] | 23.56 | 23.56 |
| h [μm] | 18.49 | 5.72 |
| segment height ratio | 3.24 | |

The result was an anti-resonant hollow-core fiber with a low attenuation.

Example F8

In this embodiment alternative of the anti-resonant hollow-core fiber, the boundary condition FB_outer<FB_inner is fulfilled and the following geometries were used.

|  | ARE outer unit | ARE inner unit |
|---|---|---|
| r [μm] | 13 | 25 |
| b2 [°] | 300 | 30.14 |
| s [μm] | 13.00 | 13.00 |
| h [μm] | 24.26 | 0.86 |
| segment height ratio | 28.21 | |

The result was an anti-resonant hollow-core fiber with a low attenuation.

Example F9

In this embodiment alternative of the anti-resonant hollow-core fiber, the boundary condition FB_outer<FB_inner is fulfilled and the following geometries were used.

|  | ARE outer unit | ARE inner unit |
|---|---|---|
| r [μm] | 13 | 25 |
| b2 [°] | 230 | 56.23 |
| s [μm] | 23.56 | 23.56 |
| h [μm] | 18.49 | 2.95 |
| segment height ratio | 6.27 | |

The result was an anti-resonant hollow-core fiber with a low attenuation.

Example F10

In this embodiment alternative of the anti-resonant hollow-core fiber, the boundary condition FB_outer<FB_inner is fulfilled and the following geometries were used.

|  | ARE outer unit | ARE inner unit |
|---|---|---|
| r [μm] | 13 | 30 |
| b2 [°] | 300 | 25.03 |
| s [μm] | 13.00 | 13.00 |
| h [μm] | 24.26 | 0.71 |
| segment height ratio | 34.04 | |

The result was an anti-resonant hollow-core fiber with a low attenuation.

Example F11

In this embodiment alternative of the anti-resonant hollow-core fiber, the boundary condition that
   the third circle radius FB_outer and the fourth circle radius FB_inner are essentially of identical length (FB_outer=FB_inner)

is fulfilled and the following geometries were used.

|  | ARE outer unit | ARE inner unit |
|---|---|---|
| r [µm] | 13 | 13 |
| b2 [°] | 230 | 130.00 |
| s [µm] | 23.56 | 23.56 |
| h [µm] | 18.49 | 7.51 |
| segment height ratio | 2.46 | |

The result was an anti-resonant hollow-core fiber with a low attenuation.

Example F12

In this embodiment alternative of the anti-resonant hollow-core fiber, the boundary condition that
the third circle radius FB_outer and the fourth circle radius FB_inner are essentially of identical length (FB_outer=FB_inner)
is fulfilled and the following geometries were used.

|  | ARE outer unit | ARE inner unit |
|---|---|---|
| r [µm] | 13 | 13 |
| b2 [°] | 300 | 60.00 |
| s [µm] | 13.00 | 13.00 |
| h [µm] | 24.26 | 1.74 |
| segment height ratio | 13.93 | |

The result was an anti-resonant hollow-core fiber with a low attenuation.

Unless otherwise specified, all of the physical variables specified in the claims, the description, the examples, and the figures, are determined under normal conditions in accordance with DIN 1343. The statement "under normal conditions" refers to measurements under conditions in accordance with DIN 1343. The features disclosed in the claims, the description, and the figures, can be significant for various embodiments of the claimed invention, both separately and in any combination with one another. The features disclosed for the devices, in particular preform, secondary preform, or anti-resonant hollow-core fiber, are also disclosed for the methods and vice versa.

| Reference Numerals | |
|---|---|
| 100, 100' | preform of an anti-resonant hollow-core fiber |
| 110, 110' | assembly |
| 200 | cladding tube |
| 210 | cladding tube wall |
| 211 | thickness of the cladding tube wall |
| 215 | inner side of the cladding tube wall |
| 216 | outer side of the cladding tube wall |
| 220 | cladding tube inner bore |
| 230 | cladding tube longitudinal axis |
| 231 | preform core radius R_preform |
| 250 | first end of the cladding tube |
| 251 | counter-centering surface |
| 260 | second end of the cladding tube |
| 261 | second counter-centering surface |
| 298 | first circle |
| 299 | second circle |
| 300a-n | anti-resonance element preform |
| 310a-n | ARE outer element |
| 311a-j, m, n | first longitudinal axis |
| 315 | ARE outer wall |
| 317 | inner space of the ARE outer element |
| 320a-j, m, n | first circle radius R_outer |
| 325 | first center angle α_outer |
| 328 | first segment height |
| 340a-n | ARE inner element |

| Reference Numerals | |
|---|---|
| 341a-e | second longitudinal axis |
| 345 | wall of the ARE inner element |
| 347 | second inner space of the ARE inner element |
| 350a-j, m, n | second circle radius R_inner |
| 355 | second center angle α_inner |
| 358 | second segment height |
| 370, 370' | connecting line |
| 390, 390' | ARE arc element |
| 392 | radius R_circle of the ARE arc element |
| 393, 393', 393" | contact line |
| 394 | fifth circle radius R_arc |
| 395, 395' | third longitudinal axis |
| 400 | positioning template |
| 410 | passage opening |
| 420 | centering surface |
| 500 | second positioning template |
| 510 | second passage opening |
| 520 | second centering surface |
| 600 | third positioning template |
| 610 | third passage opening |
| 620 | third centering surface |
| 700 | closing element |
| 710 | active surface |
| 730 | first end region |
| 740 | second end region |
| 750 | outlet |
| 800 | heat source |
| 810 | movement arrow |
| 900 | first connecting element |
| 910 | second connecting element |
| 1000 | providing a cladding tube |
| 1100 | preparing a number of anti-resonance element preforms |
| 1200 | arranging |
| 1300 | processing |
| 2000 | method steps 1000 to 1300 |
| 2100 | collapsing |
| 2200 | adding additional cladding material |
| 2300 | elongating |
| 2400 | anti-resonant hollow-core fiber |
| 2405 | core radius (R_fiber) |
| 2410 | anti-resonance element |
| 2420 | ARE outer unit of the anti-resonant hollow-core fiber |
| 2422 | third circle radius FB_outer |
| 2423 | third center angle β_outer |
| 2424 | third segment height F_outer |
| 2430 | ARE inner unit of the anti-resonant hollow-core fiber |
| 2432 | fourth circle radius FB_inner |
| 2433 | fourth center angle β_inner |
| 2434 | fourth segment height F_inner |
| 2450 | cladding of the anti-resonant hollow-core fiber |
| 2451 | cladding inner bore |
| 2452 | portion of the former cladding material at the cladding of the anti-resonant hollow-core fiber |
| 2458 | seam lines |
| 2460 | longitudinal axis of the anti-resonant hollow-core fiber |
| 2465 | cladding inner radius |
| 2470 | core of the anti-resonant hollow-core fiber |
| 2480 | inner surface |

The invention claimed is:

1. An anti-resonant hollow-core fiber, comprising
a cladding, which has a cladding inner bore and a cladding longitudinal axis, along which a cladding wall extends, which is limited by a cladding inner side and a cladding outer side,
a number of anti-resonance elements, each comprising an ARE outer unit and an ARE inner unit, wherein the ARE outer unit, which is designed in a circular arc-like manner, and the ARE inner unit are connected to one another along two seam lines, wherein the anti-resonance elements are arranged spaced apart from one another and in a contact-free manner at target positions on the cladding inner side of the cladding wall,
wherein
the ARE outer unit has an inner space, which is at least partially limited by an ARE outer wall and into which the ARE inner unit designed in a circular arc-like manner protrudes at least partially,
wherein,
the ARE outer unit has a third circle radius FB_outer,
the ARE inner unit has a fourth circle radius FB_inner,
the ARE outer unit has a third center angle β_outer, and
the ARE inner unit has a fourth center angle β_inner,
wherein
FB_outer smaller than 30 µm and larger than 5 µm,
FB_inner smaller than 30 µm and larger than 5 µm,
wherein
β_outer smaller than 350° and β_inner larger than 30°.

2. The anti-resonant hollow-core fiber according to claim 1, wherein
an amount of a deviation of the third circle radius FB_outer from the fourth circle radius is smaller than 5% of the third circle radius FB_outer, in particular smaller than 3%, in particular smaller than 2%, in particular smaller than 1.5%, in particular smaller than 1%.

3. The anti-resonant hollow-core fiber according to claim 1, wherein at least one anti-resonance element has at least one of the following features:
FB_outer smaller than 25 µm, in particular smaller than 15 µm;
FB_outer larger than 10 µm, in particular larger than 12 µm;
FB_inner smaller than 25 µm, in particular smaller than 15; and
FB_inner larger than 10 µm, in particular larger than 12 µm.

4. The anti-resonant hollow-core fiber according to claim 1, wherein at least one anti-resonance element has at least one of the following features:
β_outer smaller than 345°, in particular smaller than 340°;
β_outer larger than 275°, in particular larger than 295°, in particular larger than 320°;
β_inner smaller than 195°, in particular smaller than 180°, in particular smaller than 150°; and
β_inner larger than 40°, in particular larger than 50°.

5. The anti-resonant hollow-core fiber according to claim 1, wherein at least one anti-resonance element has at least one of the following features:
β_outer smaller than 275°, in particular smaller than 260°, in particular smaller than 250°;
β_outer larger than 210°, in particular larger than 215°, in particular larger than 220°;
wherein
the sum of β_outer and β_inner has a value of 360°.

6. The anti-resonant hollow-core fiber according to claim 1, wherein
the ARE outer unit has a third segment height HF_outer and the ARE inner unit has a fourth segment height H_inner, wherein what in particular applies is that:
HF_outer/HF_inner <30.

7. The anti-resonant hollow-core fiber according to claim 6, wherein at least one anti-resonance element has at least one of the following features:
HF_outer/HF_inner smaller than 6.5, in particular smaller than 4, in particular smaller than 3.2;
HF_outer/HF_inner larger than 1.7, in particular larger than 1.75, in particular larger than 1.85.

8. The anti-resonant hollow-core fiber according to claim 1, wherein at least one anti-resonance element has at least one of the following features:
a bow ratio larger than 1.5, in particular larger than 1.55, in particular larger than 1.6;
a bow ratio smaller than 3.2, in particular smaller than 2.8, in particular smaller than 2.5,
wherein in particular a confinement loss of the base mode is less than 10E-2 db/m.

9. The anti-resonant hollow-core fiber according to claim 1, wherein a ratio z/R is
larger than 0.6, in particular larger than 0.7, in particular larger than 0.8, and
smaller than 1.4, in particular smaller than 1.3, in particular smaller than 1.2.

10. The anti-resonant hollow-core fiber according to claim 1, wherein the anti-resonant hollow-core fiber is produced from a preform.

* * * * *